(12) United States Patent
Sen et al.

(10) Patent No.: US 12,086,446 B2
(45) Date of Patent: Sep. 10, 2024

(54) MEMORY AND STORAGE POOL INTERFACES

(71) Applicant: Intel Corporation, Santa Clara, CA (US)

(72) Inventors: Sujoy Sen, Beaverton, OR (US); Thomas E. Willis, Redwood City, CA (US); Durgesh Srivastava, Cupertino, CA (US); Marcelo Cintra, Braunschweig (DE); Bassam N. Coury, Portland, OR (US); Donald L. Faw, Hillsboro, OR (US); Francois Dugast, Karlsruhe (DE)

(73) Assignee: Intel Corporation, Santa Clara, CA (US)

( * ) Notice: Subject to any disclaimer, the term of this patent is extended or adjusted under 35 U.S.C. 154(b) by 37 days.

(21) Appl. No.: 17/031,721

(22) Filed: Sep. 24, 2020

(65) Prior Publication Data

US 2021/0019069 A1     Jan. 21, 2021

Related U.S. Application Data

(60) Provisional application No. 62/924,121, filed on Oct. 21, 2019.

(51) Int. Cl.
*G06F 3/06*     (2006.01)
(52) U.S. Cl.
CPC .......... *G06F 3/0644* (2013.01); *G06F 3/0604* (2013.01); *G06F 3/0659* (2013.01); *G06F 3/067* (2013.01)
(58) Field of Classification Search
CPC .. G06F 13/1668; G06F 3/0644; G06F 3/0604; G06F 3/0659; G06F 3/067; H05K 5/0204
See application file for complete search history.

(56) References Cited

U.S. PATENT DOCUMENTS 7,289,441 B1 * 10/2007 Barach ................. H04L 47/724
                                                               370/231
10,268,395 B1 * 4/2019 Joshua .................. G06F 3/0659
(Continued)

OTHER PUBLICATIONS

International Search Report and Written Opinion for PCT Patent Application No. PCT/US20/52894, Mailed Jan. 12, 2021, 9 pages.
(Continued)

*Primary Examiner* — Nanci N Wong
(74) *Attorney, Agent, or Firm* — Compass IP Law PC

(57) ABSTRACT

Examples herein relate to a system capable of coupling to a remote memory pool, the system comprising: a memory controller and an interface to a connection, the interface coupled to the memory controller. In some examples, the interface is to translate a format of a memory access request to a format accepted by the memory controller and the memory controller is to provide the translated memory access request in a format accepted by a media. In some examples, a controller is to measure a number of addressable regions that are least accessed and cause at least one of the least accessed regions to be evicted to a local or remote memory device with relatively higher latency. In some examples, a remote access manager is to: determine if a region of addressable memory associated with a memory address for an access request is stored in the memory; based on the region of addressable memory associated with the memory address being stored in the memory, determine if a sub-region of addressable memory associated with the memory address is available for access from the memory, wherein the sub-region comprises less than an entirety of the region; and based on the sub-region of addressable memory being available for access from the memory, provide a physical address for use to access data from the sub-region in the memory and copy the data to the cache.

21 Claims, 29 Drawing Sheets

(56) References Cited

U.S. PATENT DOCUMENTS

Figure 1:
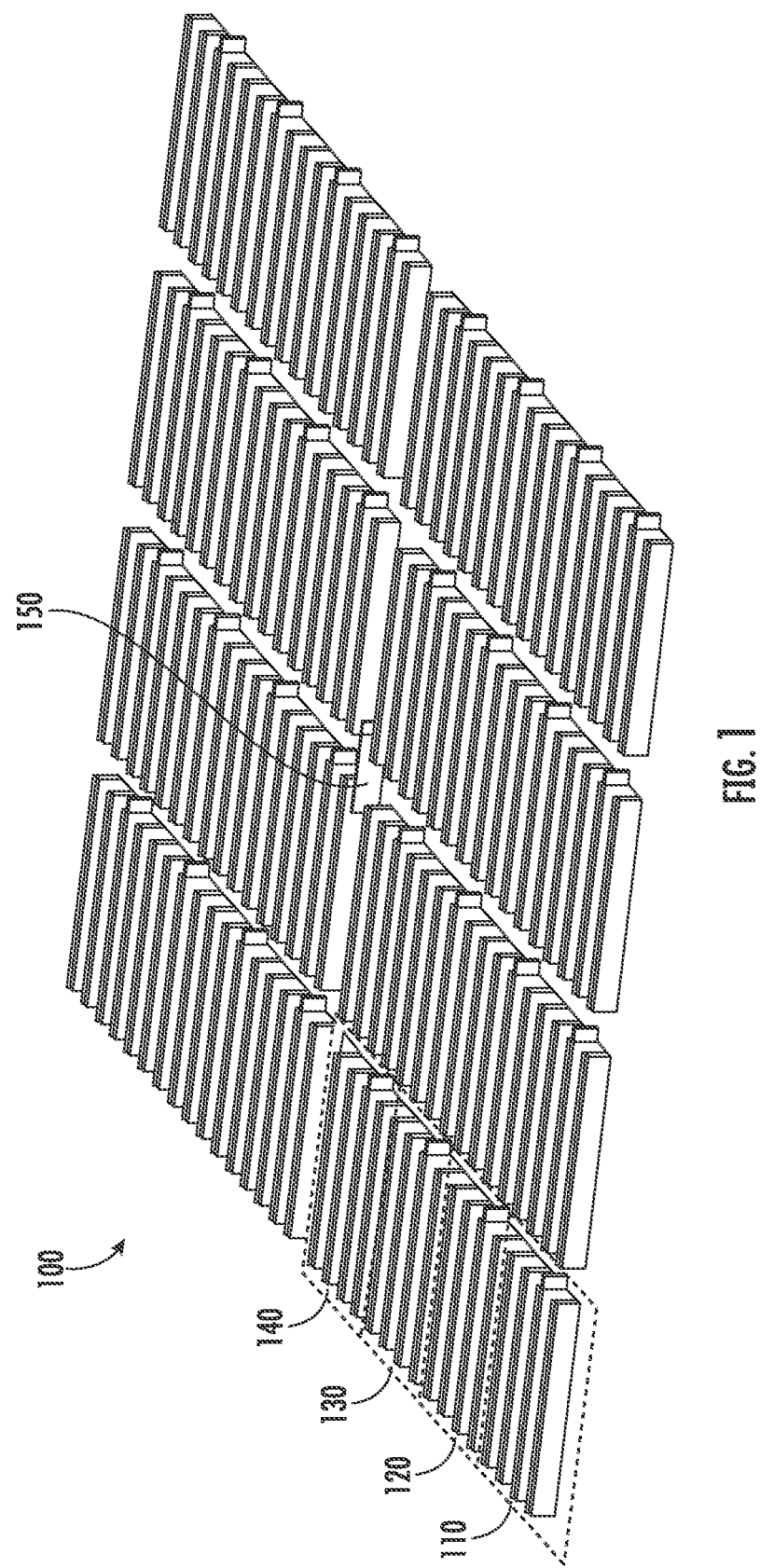

| | | | |
|---|---|---|---|
| 10,459,852 B1* | 10/2019 | Michaud | G06F 13/161 |
| 2002/0032823 A1 | 3/2002 | Scardamalia et al. | |
| 2002/0065924 A1* | 5/2002 | Barrall | H04L 69/12 |
| | | | 709/227 |
| 2004/0267982 A1* | 12/2004 | Jackson | G06F 13/385 |
| | | | 710/52 |
| 2008/0005384 A1* | 1/2008 | Mead | G06F 13/28 |
| | | | 710/22 |
| 2008/0229027 A1* | 9/2008 | Shioya | G06F 12/0862 |
| | | | 711/137 |
| 2009/0113143 A1* | 4/2009 | Domsch | G06F 12/1009 |
| | | | 711/E12.001 |
| 2011/0072204 A1 | 3/2011 | Chang et al. | |
| 2013/0166834 A1 | 6/2013 | Mayhew et al. | |
| 2014/0359050 A1* | 12/2014 | Butt | G06F 3/0631 |
| | | | 709/214 |
| 2015/0242124 A1* | 8/2015 | Law | G06F 3/0659 |
| | | | 711/103 |
| 2016/0092362 A1 | 3/2016 | Barron et al. | |
| 2017/0177500 A1 | 6/2017 | Shanbhogue et al. | |
| 2018/0081816 A1 | 3/2018 | Coburn et al. | |
| 2018/0336142 A1* | 11/2018 | Pellegrini | G06F 12/1009 |
| 2019/0004736 A1* | 1/2019 | Lee | G06F 12/0607 |
| 2019/0018813 A1 | 1/2019 | Sharma | |
| 2019/0034383 A1 | 1/2019 | Schmisseur et al. | |
| 2019/0146682 A1* | 5/2019 | Subramanian | G06F 3/0661 |
| | | | 711/103 |
| 2019/0243570 A1 | 8/2019 | Mittal et al. | |
| 2019/0320020 A1 | 10/2019 | Lee et al. | |
| 2020/0012601 A1* | 1/2020 | Jeong | G06F 3/0679 |
| 2020/0137161 A1* | 4/2020 | Chintada | H04L 49/356 |
| 2020/0371692 A1* | 11/2020 | Van Doorn | G06F 3/0631 |

OTHER PUBLICATIONS

"Compute Express Link" Specification, Revision: 2.0, Version 0.9, Jul. 2020, 660 pages.

Lu, Kai, et al., "Flexible Page-level Memory Access Monitoring Based on Virtualization Hardware", VEE '17: Proceedings of the 13th ACM SIGPLAN/SIGOPS International Conference on Virtual Execution Environments, https://doi.org/10.1145/3050748.3050751, Apr. 2017, 13 pages.

Rothman, Jeffrey B., et al., "Sector Cache Design and Performance", Computer Science Division, University of California Berkeley, Jan. 1999, 63 pages.

Freitas, Richard and Chiu, Lawrence, "Solid-State Storage: Technology, Design and Applications", IBM Almaden Research center, FAST Feb. 2010, 64 pages.

Meswani Mitesh R et al: "Heterogeneous memory architectures: A HW/SW approach for mixing die-stacked and off-package memories", 2015 IEEE 21st International Symposium on High Performance Computer Architecture, (HPCA), IEEE, Feb. 7, 2015 (Feb. 7, 2015), pp. 126-136, XP032744065, DOI: 10.1109/HPCA.2015.7056027 retrieved on Mar. 6, 2015], p. 130, left-hand column, line 17—p. 131, right-hand column, line 14.

Partial European Search Report for Patent Application No. 20878684.8, Mailed Nov. 7, 2023, 20 pages.

Extended European Search Report for Patent Application No. 20878684.8, Mailed Feb. 29, 2024, 17 pages.

\* cited by examiner

MEMORY AND STORAGE POOL INTERFACES

RELATED APPLICATION

The present application claims the benefit of a priority date of U.S. provisional patent application Ser. No. 62/924,121, filed Oct. 21, 2019, the entire disclosure of which is incorporated herein by reference.

BACKGROUND

Scale-out and distributed architectures increase computing resources or available memory or storage by adding processors, memory, and storage for access using a fabric or network. Disaggregated memory architectures rely on pools of memory, located remotely from the compute nodes in the system. A memory pool can be shared across a rack or set of racks in a data center.

BRIEF DESCRIPTION OF THE DRAWINGS

FIG. 1 is a simplified diagram of at least one embodiment of a data center for executing workloads with disaggregated resources.

FIG. 2 is a simplified diagram of at least one embodiment of a pod that may be included in a data center.

FIG. 3 is a perspective view of at least one embodiment of a rack that may be included in a pod.

FIG. 4 is a side elevation view of a rack.

FIG. 5 is a perspective view of a rack having a sled mounted therein.

FIG. 6 is a simplified block diagram of at least one embodiment of a top side of a sled.

FIG. 7 is a simplified block diagram of at least one embodiment of a bottom side of a sled.

FIG. 8 is a simplified block diagram of at least one embodiment of a compute sled.

FIG. 9 is a top perspective view of at least one embodiment of a compute sled.

FIG. 10 is a simplified block diagram of at least one embodiment of an accelerator sled usable in a data center.

FIG. 11 is a top perspective view of at least one embodiment of an accelerator sled.

FIG. 12 is a simplified block diagram of at least one embodiment of a storage sled usable in a data center.

FIG. 13 is a top perspective view of at least one embodiment of a storage sled.

FIG. 14 is a simplified block diagram of at least one embodiment of a memory sled usable in a data center.

FIG. 15 depicts a system for executing one or more workloads.

FIG. 16 depicts an example system.

FIG. 17 depicts an example system.

FIG. 18 depicts a memory pool node system.

FIG. 19 depicts an example process that can be used by a memory pool to respond to memory access requests.

FIG. 20A depicts an example memory node system.

FIG. 20B depicts an example pattern of memory accesses.

FIG. 21 depicts an example process.

FIG. 22 shows a system that can be used to manage data or content movement or copying between different tiers of memory or storage based on temperature.

FIG. 23 depicts an example process.

FIG. 24 depicts an example system.

FIG. 25A depicts an example process.

FIG. 25B depicts an example process

FIG. 26 depicts a system.

FIG. 27 depicts an example environment.

DETAILED DESCRIPTION

FIG. 1 depicts a data center in which disaggregated resources may cooperatively execute one or more workloads (e.g., applications on behalf of customers) includes multiple pods 110, 120, 130, 140, a pod being or including one or more rows of racks. Of course, although data center 100 is shown with multiple pods, in some embodiments, the data center 100 may be embodied as a single pod. As described in more detail herein, each rack houses multiple sleds, each of which may be primarily equipped with a particular type of resource (e.g., memory devices, data storage devices, accelerator devices, general purpose processors), e.g., resources that can be logically coupled to form a composed node, which can act as, for example, a server. In the illustrative embodiment, the sleds in each pod 110, 120, 130, 140 are connected to multiple pod switches (e.g., switches that route data communications to and from sleds within the pod). The pod switches, in turn, connect with spine switches 150 that switch communications among pods (e.g., the pods 110, 120, 130, 140) in the data center 100. In some embodiments, the sleds may be connected with a fabric using Intel® Omni-Path technology. In other embodiments, the sleds may be connected with other fabrics, such as InfiniB and or Ethernet. As described in more detail herein, resources within sleds in the data center 100 may be allocated to a group (referred to herein as a "managed node") containing resources from one or more sleds to be collectively utilized in the execution of a workload. The workload can execute as if the resources belonging to the managed node were located on the same sled. The resources in a managed node may belong to sleds belonging to different racks, and even to different pods 110, 120, 130, 140. As such, some resources of a single sled may be allocated to one managed node while other resources of the same sled are allocated to a different managed node (e.g., one processor assigned to one managed node and another processor of the same sled assigned to a different managed node).

A data center comprising disaggregated resources, such as data center 100, can be used in a wide variety of contexts, such as enterprise, government, cloud service provider, and communications service provider (e.g., Telco's), as well in a wide variety of sizes, from cloud service provider mega-data centers that consume over 100,000 sq. ft. to single- or multi-rack installations for use in base stations.

The disaggregation of resources to sleds comprised predominantly of a single type of resource (e.g., compute sleds comprising primarily compute resources, memory sleds containing primarily memory resources), and the selective allocation and deallocation of the disaggregated resources to form a managed node assigned to execute a workload improves the operation and resource usage of the data center 100 relative to typical data centers comprised of hyperconverged servers containing compute, memory, storage and perhaps additional resources in a single chassis. For example, because sleds predominantly contain resources of a particular type, resources of a given type can be upgraded independently of other resources. Additionally, because different resources types (processors, storage, accelerators, etc.) typically have different refresh rates, greater resource utilization and reduced total cost of ownership may be achieved. For example, a data center operator can upgrade the processors throughout their facility by only swapping out the compute sleds. In such a case, accelerator and storage resources may not be contemporaneously upgraded and, rather, may be allowed to continue operating until those resources are scheduled for their own refresh. Resource utilization may also increase. For example, if managed nodes are composed based on requirements of the workloads that will be running on them, resources within a node are more likely to be fully utilized. Such utilization may allow for more managed nodes to run in a data center with a given set of resources, or for a data center expected to run a given set of workloads, to be built using fewer resources.

Figure 2:
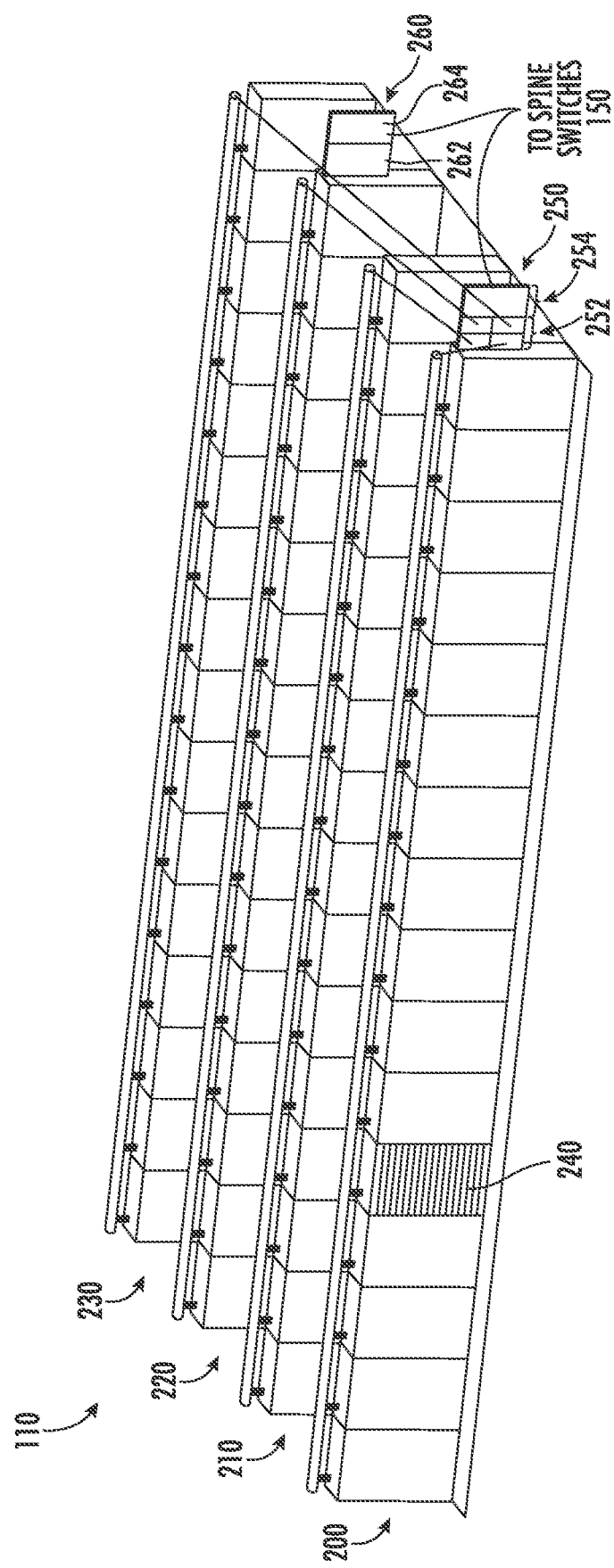

FIG. 2 depicts a pod. A pod can include a set of rows 200, 210, 220, 230 of racks 240. Each rack 240 may house multiple sleds (e.g., sixteen sleds) and provide power and data connections to the housed sleds, as described in more detail herein. In the illustrative embodiment, the racks in each row 200, 210, 220, 230 are connected to multiple pod switches 250, 260. The pod switch 250 includes a set of ports 252 to which the sleds of the racks of the pod 110 are connected and another set of ports 254 that connect the pod 110 to the spine switches 150 to provide connectivity to other pods in the data center 100. Similarly, the pod switch 260 includes a set of ports 262 to which the sleds of the racks of the pod 110 are connected and a set of ports 264 that connect the pod 110 to the spine switches 150. As such, the use of the pair of switches 250, 260 provides an amount of redundancy to the pod 110. For example, if either of the switches 250, 260 fails, the sleds in the pod 110 may still maintain data communication with the remainder of the data center 100 (e.g., sleds of other pods) through the other switch 250, 260. Furthermore, in the illustrative embodiment, the switches 150, 250, 260 may be embodied as dual-mode optical switches, capable of routing both Ethernet protocol communications carrying Internet Protocol (IP) packets and communications according to a second, high-performance link-layer protocol (e.g., PCI Express) via optical signaling media of an optical fabric.

It should be appreciated that each of the other pods 120, 130, 140 (as well as any additional pods of the data center 100) may be similarly structured as, and have components similar to, the pod 110 shown in and described in regard to FIG. 2 (e.g., each pod may have rows of racks housing multiple sleds as described above). Additionally, while two pod switches 250, 260 are shown, it should be understood that in other embodiments, each pod 110, 120, 130, 140 may be connected to a different number of pod switches, providing even more failover capacity. Of course, in other embodiments, pods may be arranged differently than the rows-of-racks configuration shown in FIGS. 1-2. For example, a pod may be embodied as multiple sets of racks in which each set of racks is arranged radially, e.g., the racks are equidistant from a center switch.

Figure 3:
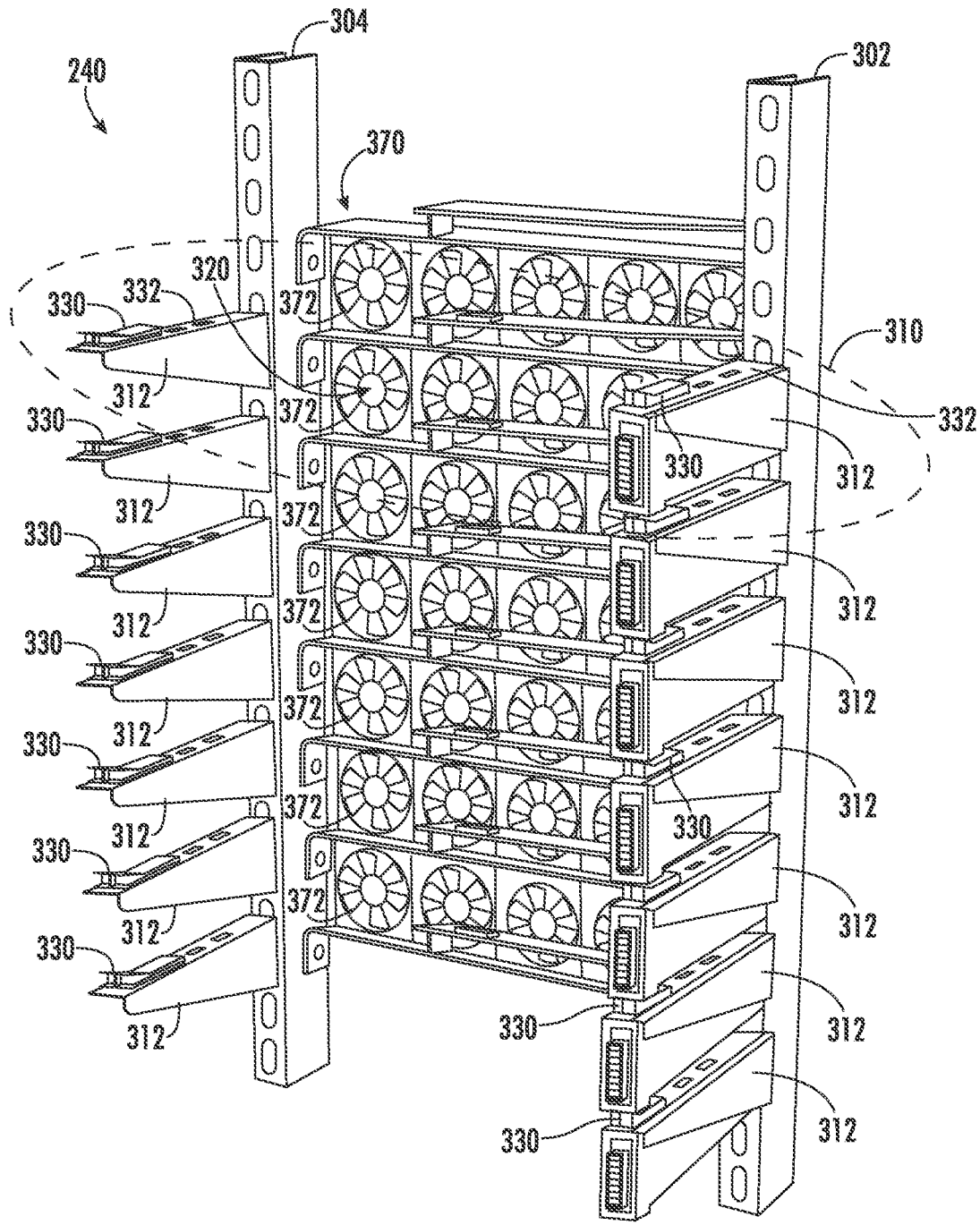
Figure 4:
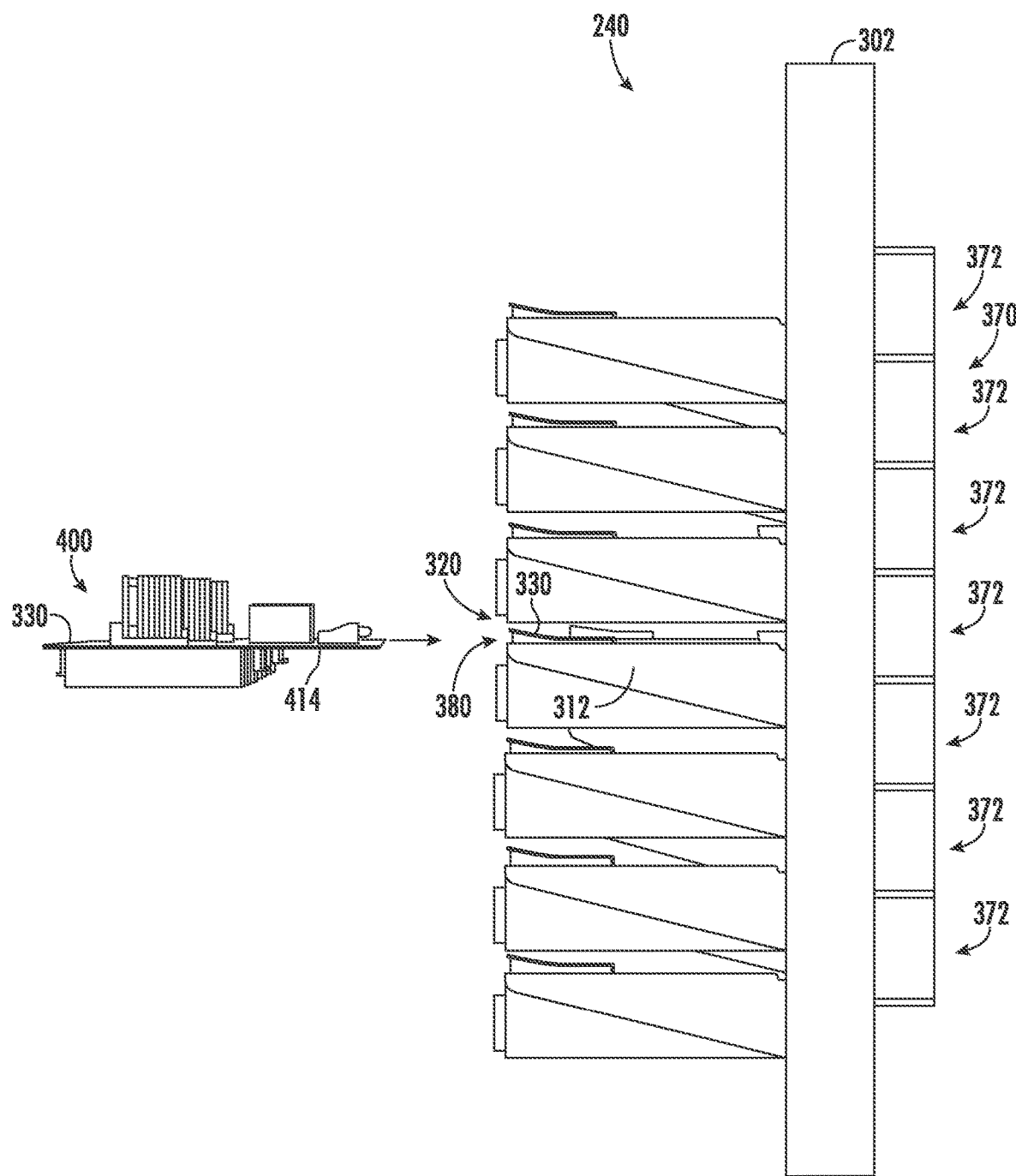
Figure 5:
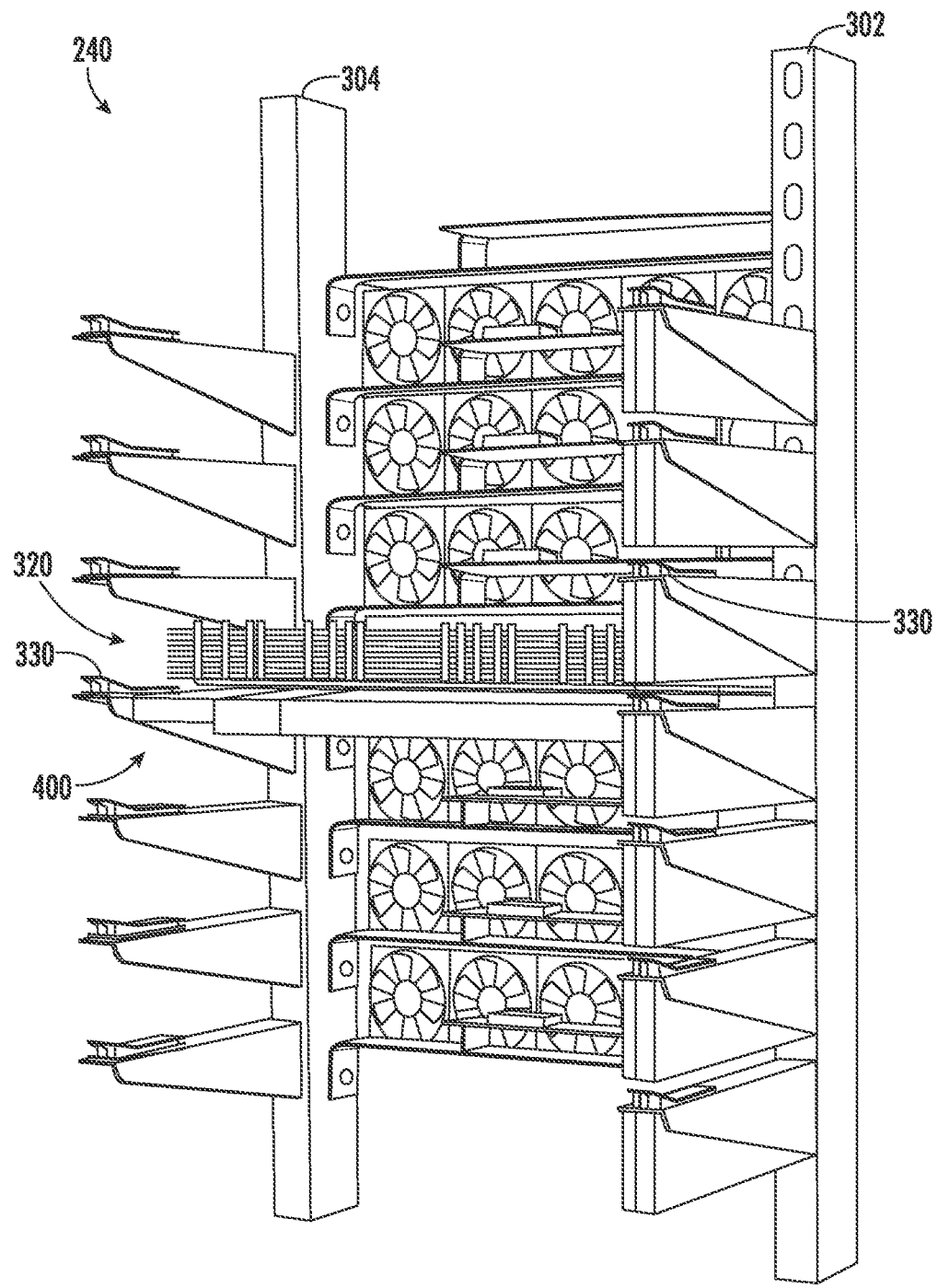

Referring now to FIGS. 3-5, each illustrative rack 240 of the data center 100 includes two elongated support posts 302, 304, which are arranged vertically. For example, the elongated support posts 302, 304 may extend upwardly from a floor of the data center 100 when deployed. The rack 240 also includes one or more horizontal pairs 310 of elongated support arms 312 (identified in FIG. 3 via a dashed ellipse) configured to support a sled of the data center 100 as discussed below. One elongated support arm 312 of the pair of elongated support arms 312 extends outwardly from the elongated support post 302 and the other elongated support arm 312 extends outwardly from the elongated support post 304.

In the illustrative embodiments, each sled of the data center 100 is embodied as a chassis-less sled. That is, each sled has a chassis-less circuit board substrate on which physical resources (e.g., processors, memory, accelerators, storage, etc.) are mounted as discussed in more detail below. As such, the rack 240 is configured to receive the chassis-less sleds. For example, each pair 310 of elongated support arms 312 defines a sled slot 320 of the rack 240, which is configured to receive a corresponding chassis-less sled. To do so, each illustrative elongated support arm 312 includes a circuit board guide 330 configured to receive the chassis-less circuit board substrate of the sled. Each circuit board guide 330 is secured to, or otherwise mounted to, a top side 332 of the corresponding elongated support arm 312. For example, in the illustrative embodiment, each circuit board guide 330 is mounted at a distal end of the corresponding elongated support arm 312 relative to the corresponding elongated support post 302, 304. For clarity of the Figures, not every circuit board guide 330 may be referenced in each Figure.

Each circuit board guide 330 includes an inner wall that defines a circuit board slot 380 configured to receive the chassis-less circuit board substrate of a sled 400 when the sled 400 is received in the corresponding sled slot 320 of the rack 240. To do so, as shown in FIG. 4, a user (or robot) aligns the chassis-less circuit board substrate of an illustrative chassis-less sled 400 to a sled slot 320. The user, or robot, may then slide the chassis-less circuit board substrate forward into the sled slot 320 such that each side edge 414 of the chassis-less circuit board substrate is received in a corresponding circuit board slot 380 of the circuit board guides 330 of the pair 310 of elongated support arms 312 that define the corresponding sled slot 320 as shown in FIG. 4. By having robotically accessible and robotically manipulatable sleds comprising disaggregated resources, each type of resource can be upgraded independently of each other and at their own optimized refresh rate. Furthermore, the sleds are configured to blindly mate with power and data communication cables in each rack 240, enhancing their ability to be quickly removed, upgraded, reinstalled, and/or replaced. As such, in some embodiments, the data center 100 may operate (e.g., execute workloads, undergo maintenance and/or upgrades, etc.) without human involvement on the data center floor. In other embodiments, a human may facilitate one or more maintenance or upgrade operations in the data center 100.

It should be appreciated that each circuit board guide 330 is dual sided. That is, each circuit board guide 330 includes an inner wall that defines a circuit board slot 380 on each side of the circuit board guide 330. In this way, each circuit board guide 330 can support a chassis-less circuit board substrate on either side. As such, a single additional elongated support post may be added to the rack 240 to turn the rack 240 into a two-rack solution that can hold twice as many sled slots 320 as shown in FIG. 3. The illustrative rack 240 includes seven pairs 310 of elongated support arms 312 that define a corresponding seven sled slots 320, each configured to receive and support a corresponding sled 400 as discussed above. Of course, in other embodiments, the rack 240 may include additional or fewer pairs 310 of elongated support arms 312 (e.g., additional or fewer sled slots 320). It should be appreciated that because the sled 400 is chassis-less, the sled 400 may have an overall height that is different than typical servers. As such, in some embodiments, the height of each sled slot 320 may be shorter than the height of a typical server (e.g., shorter than a single rank unit, "1U"). That is, the vertical distance between each pair 310 of elongated support arms 312 may be less than a standard rack unit "1U." Additionally, due to the relative decrease in height of the sled slots 320, the overall height of the rack 240 in some embodiments may be shorter than the height of traditional rack enclosures. For example, in some embodiments, each of the elongated support posts 302, 304 may have a length of six feet or less. Again, in other embodiments, the rack 240 may have different dimensions. For example, in some embodiments, the vertical distance between each pair 310 of elongated support arms 312 may be greater than a standard rack until "1U". In such embodiments, the increased vertical distance between the sleds allows for larger heat sinks to be attached to the physical resources and for larger fans to be used (e.g., in the fan array 370 described below) for cooling each sled, which in turn can allow the physical resources to operate at increased power levels. Further, it should be appreciated that the rack 240 does not include any walls, enclosures, or the like. Rather, the rack 240 is an enclosure-less rack that is opened to the local environment. Of course, in some cases, an end plate may be attached to one of the elongated support posts 302, 304 in those situations in which the rack 240 forms an end-of-row rack in the data center 100.

In some embodiments, various interconnects may be routed upwardly or downwardly through the elongated support posts 302, 304. To facilitate such routing, each elongated support post 302, 304 includes an inner wall that defines an inner chamber in which interconnects may be located. The interconnects routed through the elongated support posts 302, 304 may be embodied as any type of interconnects including, but not limited to, data or communication interconnects to provide communication connections to each sled slot 320, power interconnects to provide power to each sled slot 320, and/or other types of interconnects.

The rack 240, in the illustrative embodiment, includes a support platform on which a corresponding optical data connector (not shown) is mounted. Each optical data connector is associated with a corresponding sled slot 320 and is configured to mate with an optical data connector of a corresponding sled 400 when the sled 400 is received in the corresponding sled slot 320. In some embodiments, optical connections between components (e.g., sleds, racks, and switches) in the data center 100 are made with a blind mate optical connection. For example, a door on each cable may prevent dust from contaminating the fiber inside the cable. In the process of connecting to a blind mate optical connector mechanism, the door is pushed open when the end of the cable approaches or enters the connector mechanism. Subsequently, the optical fiber inside the cable may enter a gel within the connector mechanism and the optical fiber of one cable comes into contact with the optical fiber of another cable within the gel inside the connector mechanism.

The illustrative rack 240 also includes a fan array 370 coupled to the cross-support arms of the rack 240. The fan array 370 includes one or more rows of cooling fans 372, which are aligned in a horizontal line between the elongated support posts 302, 304. In the illustrative embodiment, the fan array 370 includes a row of cooling fans 372 for each sled slot 320 of the rack 240. As discussed above, each sled 400 does not include any on-board cooling system in the illustrative embodiment and, as such, the fan array 370 provides cooling for each sled 400 received in the rack 240. Each rack 240, in the illustrative embodiment, also includes a power supply associated with each sled slot 320. Each power supply is secured to one of the elongated support arms 312 of the pair 310 of elongated support arms 312 that define the corresponding sled slot 320. For example, the rack 240 may include a power supply coupled or secured to each elongated support arm 312 extending from the elongated support post 302. Each power supply includes a power connector configured to mate with a power connector of the sled 400 when the sled 400 is received in the corresponding sled slot 320. In the illustrative embodiment, the sled 400 does not include any on-board power supply and, as such, the power supplies provided in the rack 240 supply power to corresponding sleds 400 when mounted to the rack 240. Each power supply is configured to satisfy the power requirements for its associated sled, which can vary from sled to sled. Additionally, the power supplies provided in the rack 240 can operate independent of each other. That is, within a single rack, a first power supply providing power to a compute sled can provide power levels that are different than power levels supplied by a second power supply providing power to an accelerator sled. The power supplies may be controllable at the sled level or rack level, and may be controlled locally by components on the associated sled or remotely, such as by another sled or an orchestrator.

Figure 6:
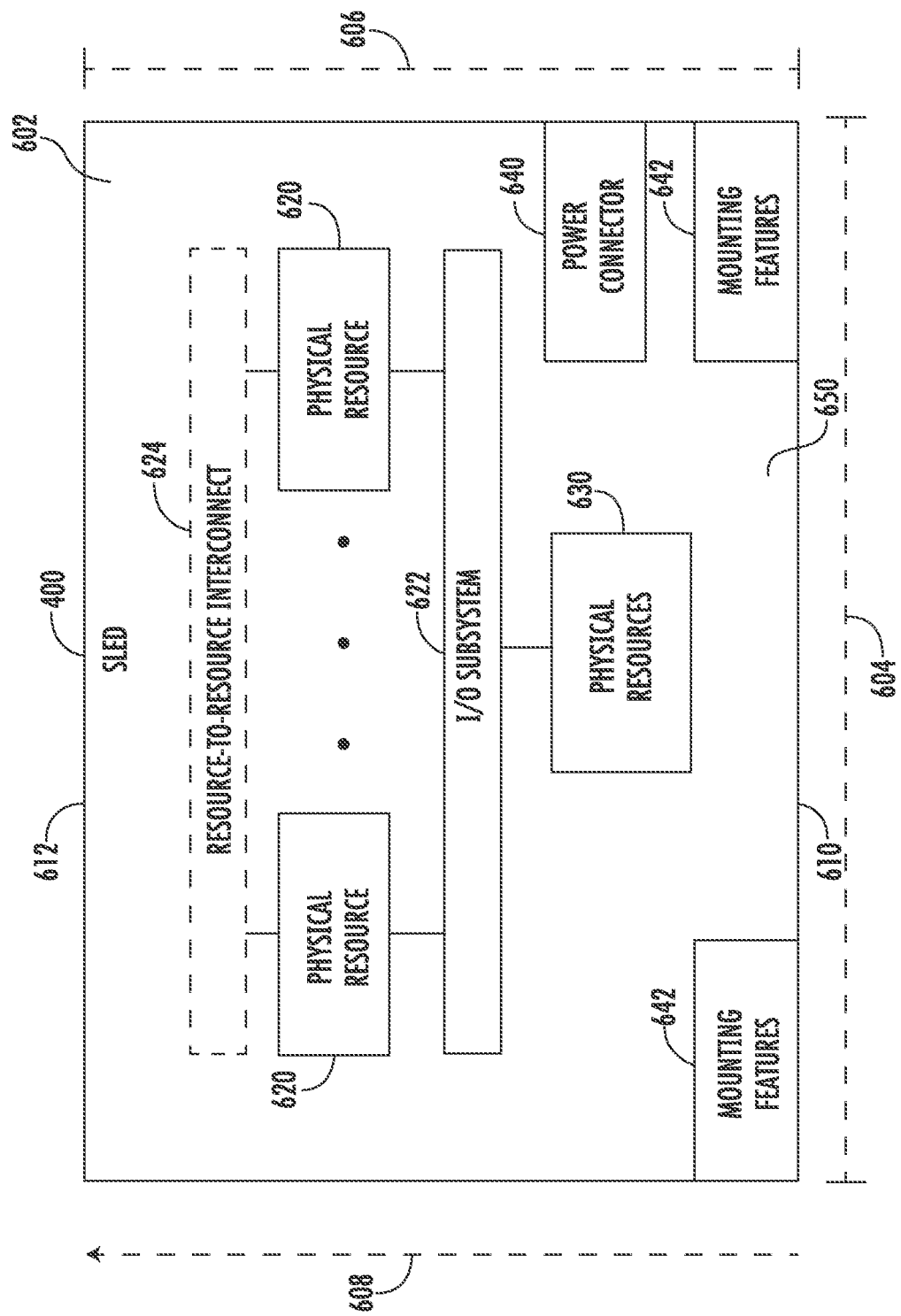

Referring now to FIG. 6, the sled 400, in the illustrative embodiment, is configured to be mounted in a corresponding rack 240 of the data center 100 as discussed above. In some embodiments, each sled 400 may be optimized or otherwise configured for performing particular tasks, such as compute tasks, acceleration tasks, data storage tasks, etc. For example, the sled 400 may be embodied as a compute sled 800 as discussed below in regard to FIGS. 8-9, an accelerator sled 1000 as discussed below in regard to FIGS. 10-11, a storage sled 1200 as discussed below in regard to FIG. 12-13, or as a sled optimized or otherwise configured to perform other specialized tasks, such as a memory sled 1400, discussed below in regard to FIG. 14.

As discussed above, the illustrative sled 400 includes a chassis-less circuit board substrate 602, which supports various physical resources (e.g., electrical components) mounted thereon. It should be appreciated that the circuit board substrate 602 is "chassis-less" in that the sled 400 does not include a housing or enclosure. Rather, the chassis-less circuit board substrate 602 is open to the local environment. The chassis-less circuit board substrate 602 may be formed from any material capable of supporting the various electrical components mounted thereon. For example, in an illustrative embodiment, the chassis-less circuit board substrate 602 is formed from an FR-4 glass-reinforced epoxy laminate material. Of course, other materials may be used to form the chassis-less circuit board substrate 602 in other embodiments.

As discussed in more detail below, the chassis-less circuit board substrate 602 includes multiple features that improve the thermal cooling characteristics of the various electrical components mounted on the chassis-less circuit board substrate 602. As discussed, the chassis-less circuit board substrate 602 does not include a housing or enclosure, which may improve the airflow over the electrical components of the sled 400 by reducing those structures that may inhibit air flow. For example, because the chassis-less circuit board substrate 602 is not positioned in an individual housing or enclosure, there is no vertically-arranged backplane (e.g., a backplate of the chassis) attached to the chassis-less circuit board substrate 602, which could inhibit air flow across the electrical components. Additionally, the chassis-less circuit board substrate 602 has a geometric shape configured to reduce the length of the airflow path across the electrical components mounted to the chassis-less circuit board substrate 602. For example, the illustrative chassis-less circuit board substrate 602 has a width 604 that is greater than a depth 606 of the chassis-less circuit board substrate 602. In one particular embodiment, for example, the chassis-less circuit board substrate 602 has a width of about 21 inches and a depth of about 9 inches, compared to a typical server that has a width of about 17 inches and a depth of about 39 inches. As such, an airflow path 608 that extends from a front edge 610 of the chassis-less circuit board substrate 602 toward a rear edge 612 has a shorter distance relative to typical servers, which may improve the thermal cooling characteristics of the sled 400. Furthermore, although not illustrated in FIG. 6, the various physical resources mounted to the chassis-less circuit board substrate 602 are mounted in corresponding locations such that no two substantively heat-producing electrical components shadow each other as discussed in more detail below. That is, no two electrical components, which produce appreciable heat during operation (e.g., greater than a nominal heat sufficient enough to adversely impact the cooling of another electrical component), are mounted to the chassis-less circuit board substrate 602 linearly in-line with each other along the direction of the airflow path 608 (e.g., along a direction extending from the front edge 610 toward the rear edge 612 of the chassis-less circuit board substrate 602).

As discussed above, the illustrative sled 400 includes one or more physical resources 620 mounted to a top side 650 of the chassis-less circuit board substrate 602. Although two physical resources 620 are shown in FIG. 6, it should be appreciated that the sled 400 may include one, two, or more physical resources 620 in other embodiments. The physical resources 620 may be embodied as any type of processor, controller, or other compute circuit capable of performing various tasks such as compute functions and/or controlling the functions of the sled 400 depending on, for example, the type or intended functionality of the sled 400. For example, as discussed in more detail below, the physical resources 620 may be embodied as high-performance processors in embodiments in which the sled 400 is embodied as a compute sled, as accelerator co-processors or circuits in embodiments in which the sled 400 is embodied as an accelerator sled, storage controllers in embodiments in which the sled 400 is embodied as a storage sled, or a set of memory devices in embodiments in which the sled 400 is embodied as a memory sled.

The sled 400 also includes one or more additional physical resources 630 mounted to the top side 650 of the chassis-less circuit board substrate 602. In the illustrative embodiment, the additional physical resources include a network interface controller (NIC) as discussed in more detail below. Of course, depending on the type and functionality of the sled 400, the physical resources 630 may include additional or other electrical components, circuits, and/or devices in other embodiments.

The physical resources 620 are communicatively coupled to the physical resources 630 via an input/output (I/O) subsystem 622. The I/O subsystem 622 may be embodied as circuitry and/or components to facilitate input/output operations with the physical resources 620, the physical resources 630, and/or other components of the sled 400. For example, the I/O subsystem 622 may be embodied as, or otherwise include, memory controller hubs, input/output control hubs, integrated sensor hubs, firmware devices, communication links (e.g., point-to-point links, bus links, wires, cables, waveguides, light guides, printed circuit board traces, etc.), and/or other components and subsystems to facilitate the input/output operations. In the illustrative embodiment, the I/O subsystem 622 is embodied as, or otherwise includes, a double data rate 4 (DDR4) data bus or a DDR5 data bus.

In some embodiments, the sled 400 may also include a resource-to-resource interconnect 624. The resource-to-resource interconnect 624 may be embodied as any type of communication interconnect capable of facilitating resource-to-resource communications. In the illustrative embodiment, the resource-to-resource interconnect 624 is embodied as a high-speed point-to-point interconnect (e.g., faster than the I/O subsystem 622). For example, the resource-to-resource interconnect 624 may be embodied as a QuickPath Interconnect (QPI), an UltraPath Interconnect (UPI), PCI express (PCIe), or other high-speed point-to-point interconnect dedicated to resource-to-resource communications.

The sled 400 also includes a power connector 640 configured to mate with a corresponding power connector of the rack 240 when the sled 400 is mounted in the corresponding rack 240. The sled 400 receives power from a power supply of the rack 240 via the power connector 640 to supply power to the various electrical components of the sled 400. That is, the sled 400 does not include any local power supply (e.g., an on-board power supply) to provide power to the electrical components of the sled 400. The exclusion of a local or on-board power supply facilitates the reduction in the overall footprint of the chassis-less circuit board substrate 602, which may increase the thermal cooling characteristics of the various electrical components mounted on the chassis-less circuit board substrate 602 as discussed above. In some embodiments, voltage regulators are placed on a bottom side 750 (see FIG. 7) of the chassis-less circuit board substrate 602 directly opposite of the processors 820 (see FIG. 8), and power is routed from the voltage regulators to the processors 820 by vias extending through the circuit board substrate 602. Such a configuration provides an increased thermal budget, additional current and/or voltage, and better voltage control relative to typical printed circuit boards in which processor power is delivered from a voltage regulator, in part, by printed circuit traces.

In some embodiments, the sled 400 may also include mounting features 642 configured to mate with a mounting arm, or other structure, of a robot to facilitate the placement of the sled 600 in a rack 240 by the robot. The mounting features 642 may be embodied as any type of physical structures that allow the robot to grasp the sled 400 without damaging the chassis-less circuit board substrate 602 or the electrical components mounted thereto. For example, in some embodiments, the mounting features 642 may be embodied as non-conductive pads attached to the chassis-less circuit board substrate 602. In other embodiments, the mounting features may be embodied as brackets, braces, or other similar structures attached to the chassis-less circuit board substrate 602. The particular number, shape, size, and/or make-up of the mounting feature 642 may depend on the design of the robot configured to manage the sled 400.

Figure 7:
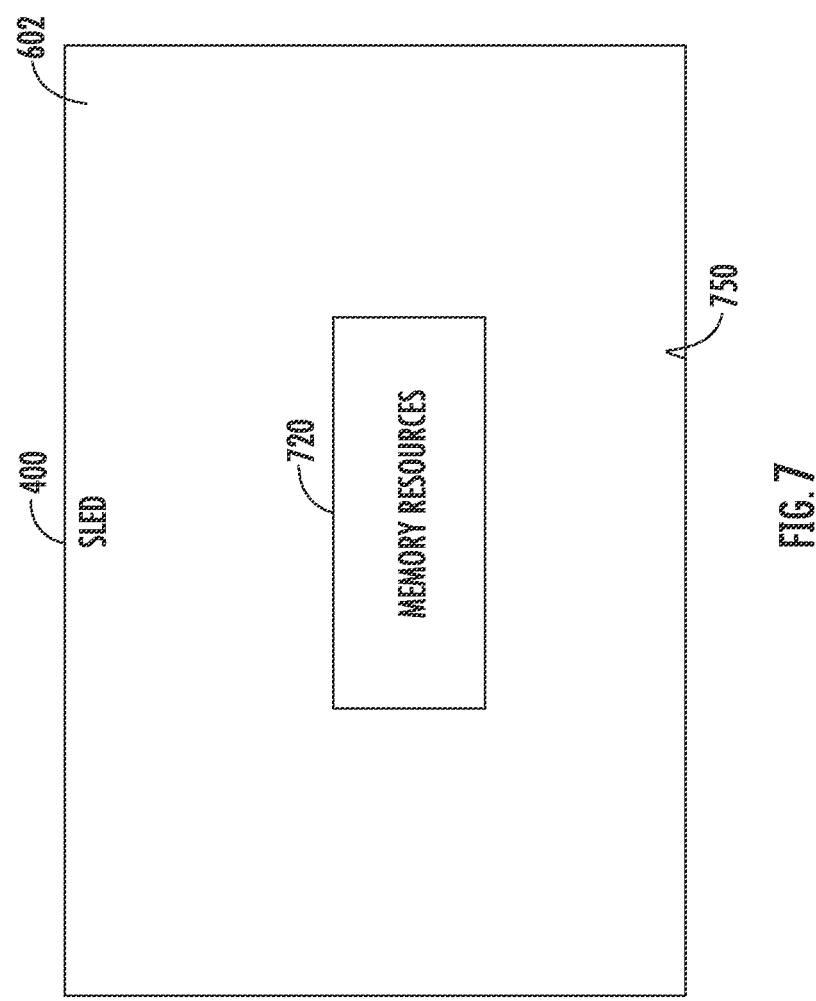

Referring now to FIG. 7, in addition to the physical resources 630 mounted on the top side 650 of the chassis-less circuit board substrate 602, the sled 400 also includes one or more memory devices 720 mounted to a bottom side 750 of the chassis-less circuit board substrate 602. That is, the chassis-less circuit board substrate 602 is embodied as a double-sided circuit board. The physical resources 620 are communicatively coupled to the memory devices 720 via the I/O subsystem 622. For example, the physical resources 620 and the memory devices 720 may be communicatively coupled by one or more vias extending through the chassis-less circuit board substrate 602. Each physical resource 620 may be communicatively coupled to a different set of one or more memory devices 720 in some embodiments. Alternatively, in other embodiments, each physical resource 620 may be communicatively coupled to each memory device 720.

The memory devices 720 may be embodied as any type of memory device capable of storing data for the physical resources 620 during operation of the sled 400, such as any type of volatile (e.g., dynamic random access memory (DRAM), etc.) or non-volatile memory. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A block can be any size such as but not limited to 2 KB, 4 KB, 8 KB, and so forth. A memory device may also include next-generation nonvolatile devices, such as Intel® Optane® memory or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In some embodiments, the memory device may comprise a transistor-less stackable cross point architecture in which memory cells sit at the intersection of word lines and bit lines and are individually addressable and in which bit storage is based on a change in bulk resistance.

Figure 8:
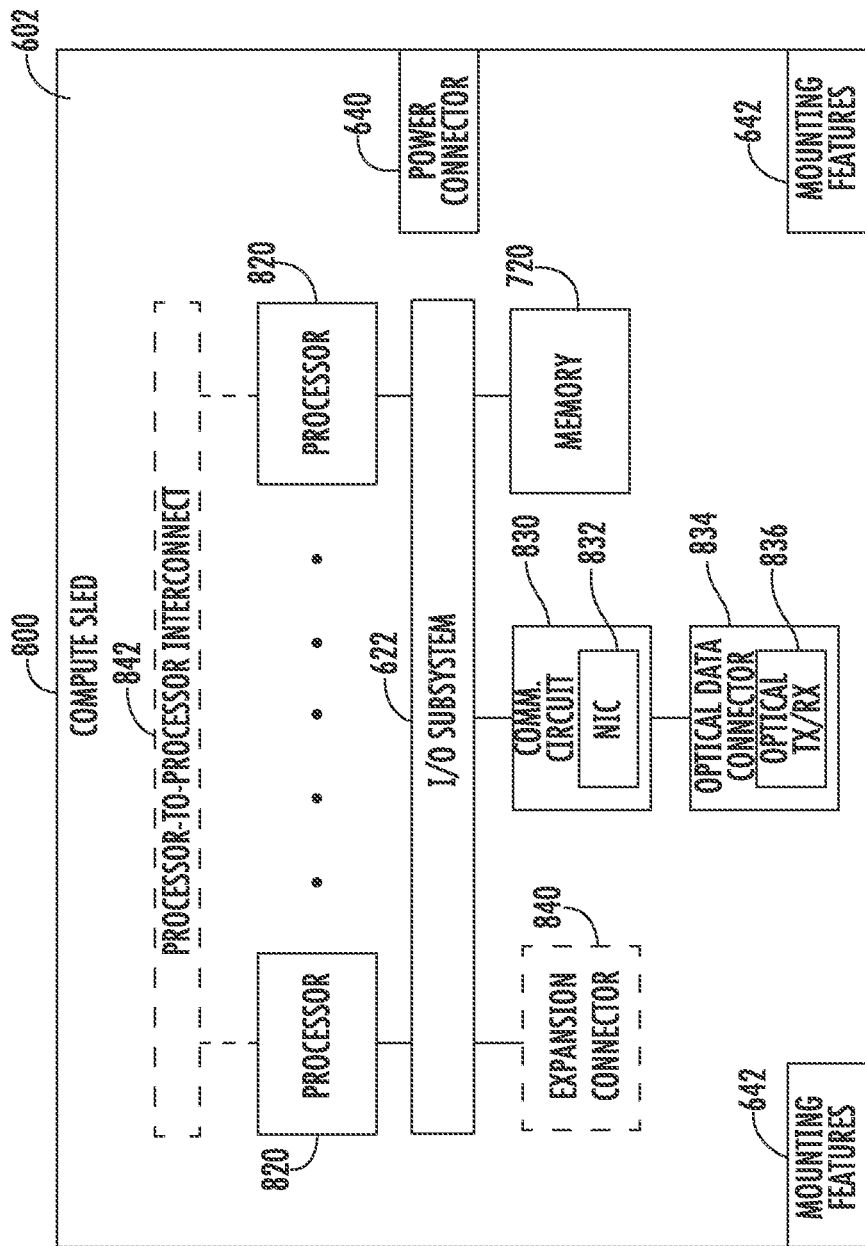

Referring now to FIG. 8, in some embodiments, the sled 400 may be embodied as a compute sled 800. The compute sled 800 is optimized, or otherwise configured, to perform compute tasks. Of course, as discussed above, the compute sled 800 may rely on other sleds, such as acceleration sleds and/or storage sleds, to perform such compute tasks. The compute sled 800 includes various physical resources (e.g., electrical components) similar to the physical resources of the sled 400, which have been identified in FIG. 8 using the same reference numbers. The description of such components provided above in regard to FIGS. 6 and 7 applies to the corresponding components of the compute sled 800 and is not repeated herein for clarity of the description of the compute sled 800.

In the illustrative compute sled 800, the physical resources 620 are embodied as processors 820. Although only two processors 820 are shown in FIG. 8, it should be appreciated that the compute sled 800 may include additional processors 820 in other embodiments. Illustratively, the processors 820 are embodied as high-performance processors 820 and may be configured to operate at a relatively high power rating. Although the processors 820 generate additional heat operating at power ratings greater than typical processors (which operate at around 155-230 W), the enhanced thermal cooling characteristics of the chassis-less circuit board substrate 602 discussed above facilitate the higher power operation. For example, in the illustrative embodiment, the processors 820 are configured to operate at a power rating of at least 250 W. In some embodiments, the processors 820 may be configured to operate at a power rating of at least 350 W.

In some embodiments, the compute sled 800 may also include a processor-to-processor interconnect 842. Similar to the resource-to-resource interconnect 624 of the sled 400 discussed above, the processor-to-processor interconnect 842 may be embodied as any type of communication interconnect capable of facilitating processor-to-processor interconnect 842 communications. In the illustrative embodiment, the processor-to-processor interconnect 842 is embodied as a high-speed point-to-point interconnect (e.g., faster than the I/O subsystem 622). For example, the processor-to-processor interconnect 842 may be embodied as a QuickPath Interconnect (QPI), an UltraPath Interconnect (UPI), or other high-speed point-to-point interconnect dedicated to processor-to-processor communications (e.g., PCIe).

The compute sled 800 also includes a communication circuit 830. The illustrative communication circuit 830 includes a network interface controller (NIC) 832, which may also be referred to as a host fabric interface (HFI). The NIC 832 may be embodied as, or otherwise include, any type of integrated circuit, discrete circuits, controller chips, chipsets, add-in-boards, daughtercards, network interface cards, or other devices that may be used by the compute sled 800 to connect with another compute device (e.g., with other sleds 400). In some embodiments, the NIC 832 may be embodied as part of a system-on-a-chip (SoC) that includes one or more processors, or included on a multichip package that also contains one or more processors. In some embodiments, the NIC 832 may include a local processor (not shown) and/or a local memory (not shown) that are both local to the NIC 832. In such embodiments, the local processor of the NIC 832 may be capable of performing one or more of the functions of the processors 820. Additionally or alternatively, in such embodiments, the local memory of the NIC 832 may be integrated into one or more components of the compute sled at the board level, socket level, chip level, and/or other levels.

The communication circuit 830 is communicatively coupled to an optical data connector 834. The optical data connector 834 is configured to mate with a corresponding optical data connector of the rack 240 when the compute sled 800 is mounted in the rack 240. Illustratively, the optical data connector 834 includes a plurality of optical fibers which lead from a mating surface of the optical data connector 834 to an optical transceiver 836. The optical transceiver 836 is configured to convert incoming optical signals from the rack-side optical data connector to electrical signals and to convert electrical signals to outgoing optical signals to the rack-side optical data connector. Although shown as forming part of the optical data connector 834 in the illustrative embodiment, the optical transceiver 836 may form a portion of the communication circuit 830 in other embodiments.

In some embodiments, the compute sled 800 may also include an expansion connector 840. In such embodiments, the expansion connector 840 is configured to mate with a corresponding connector of an expansion chassis-less circuit board substrate to provide additional physical resources to the compute sled 800. The additional physical resources may be used, for example, by the processors 820 during operation of the compute sled 800. The expansion chassis-less circuit board substrate may be substantially similar to the chassis-less circuit board substrate 602 discussed above and may include various electrical components mounted thereto. The particular electrical components mounted to the expansion chassis-less circuit board substrate may depend on the intended functionality of the expansion chassis-less circuit board substrate. For example, the expansion chassis-less circuit board substrate may provide additional compute resources, memory resources, and/or storage resources. As such, the additional physical resources of the expansion chassis-less circuit board substrate may include, but is not limited to, processors, memory devices, storage devices, and/or accelerator circuits including, for example, field programmable gate arrays (FPGA), application-specific integrated circuits (ASICs), security co-processors, graphics processing units (GPUs), machine learning circuits, or other specialized processors, controllers, devices, and/or circuits.

Figure 9:
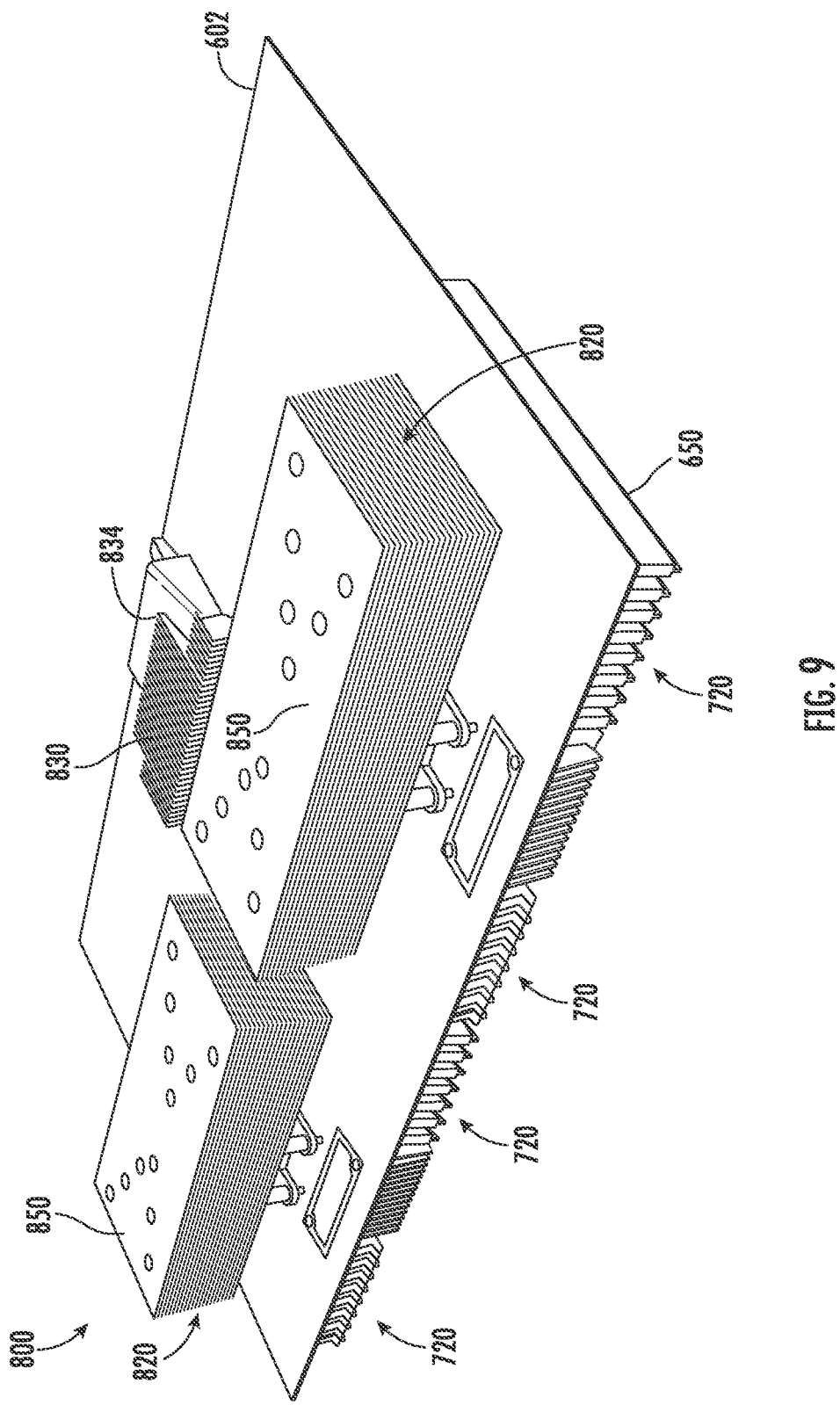

Referring now to FIG. 9, an illustrative embodiment of the compute sled 800 is shown. As shown, the processors 820, communication circuit 830, and optical data connector 834 are mounted to the top side 650 of the chassis-less circuit board substrate 602. Any suitable attachment or mounting technology may be used to mount the physical resources of the compute sled 800 to the chassis-less circuit board substrate 602. For example, the various physical resources may be mounted in corresponding sockets (e.g., a processor socket), holders, or brackets. In some cases, some of the electrical components may be directly mounted to the chassis-less circuit board substrate 602 via soldering or similar techniques.

As discussed above, the individual processors 820 and communication circuit 830 are mounted to the top side 650 of the chassis-less circuit board substrate 602 such that no two heat-producing, electrical components shadow each other. In the illustrative embodiment, the processors 820 and communication circuit 830 are mounted in corresponding locations on the top side 650 of the chassis-less circuit board substrate 602 such that no two of those physical resources are linearly in-line with others along the direction of the airflow path 608. It should be appreciated that, although the optical data connector 834 is in-line with the communication circuit 830, the optical data connector 834 produces no or nominal heat during operation.

The memory devices 720 of the compute sled 800 are mounted to the bottom side 750 of the of the chassis-less circuit board substrate 602 as discussed above in regard to the sled 400. Although mounted to the bottom side 750, the memory devices 720 are communicatively coupled to the processors 820 located on the top side 650 via the I/O subsystem 622. Because the chassis-less circuit board substrate 602 is embodied as a double-sided circuit board, the memory devices 720 and the processors 820 may be communicatively coupled by one or more vias, connectors, or other mechanisms extending through the chassis-less circuit board substrate 602. Of course, each processor 820 may be communicatively coupled to a different set of one or more memory devices 720 in some embodiments. Alternatively, in other embodiments, each processor 820 may be communicatively coupled to each memory device 720. In some embodiments, the memory devices 720 may be mounted to one or more memory mezzanines on the bottom side of the chassis-less circuit board substrate 602 and may interconnect with a corresponding processor 820 through a ball-grid array.

Each of the processors 820 includes a heatsink 850 secured thereto. Due to the mounting of the memory devices 720 to the bottom side 750 of the chassis-less circuit board substrate 602 (as well as the vertical spacing of the sleds 400 in the corresponding rack 240), the top side 650 of the chassis-less circuit board substrate 602 includes additional "free" area or space that facilitates the use of heatsinks 850 having a larger size relative to traditional heatsinks used in typical servers. Additionally, due to the improved thermal cooling characteristics of the chassis-less circuit board substrate 602, none of the processor heatsinks 850 include cooling fans attached thereto. That is, each of the heatsinks 850 is embodied as a fan-less heatsink. In some embodiments, the heat sinks 850 mounted atop the processors 820 may overlap with the heat sink attached to the communication circuit 830 in the direction of the airflow path 608 due to their increased size, as illustratively suggested by FIG. 9.

Figure 10:
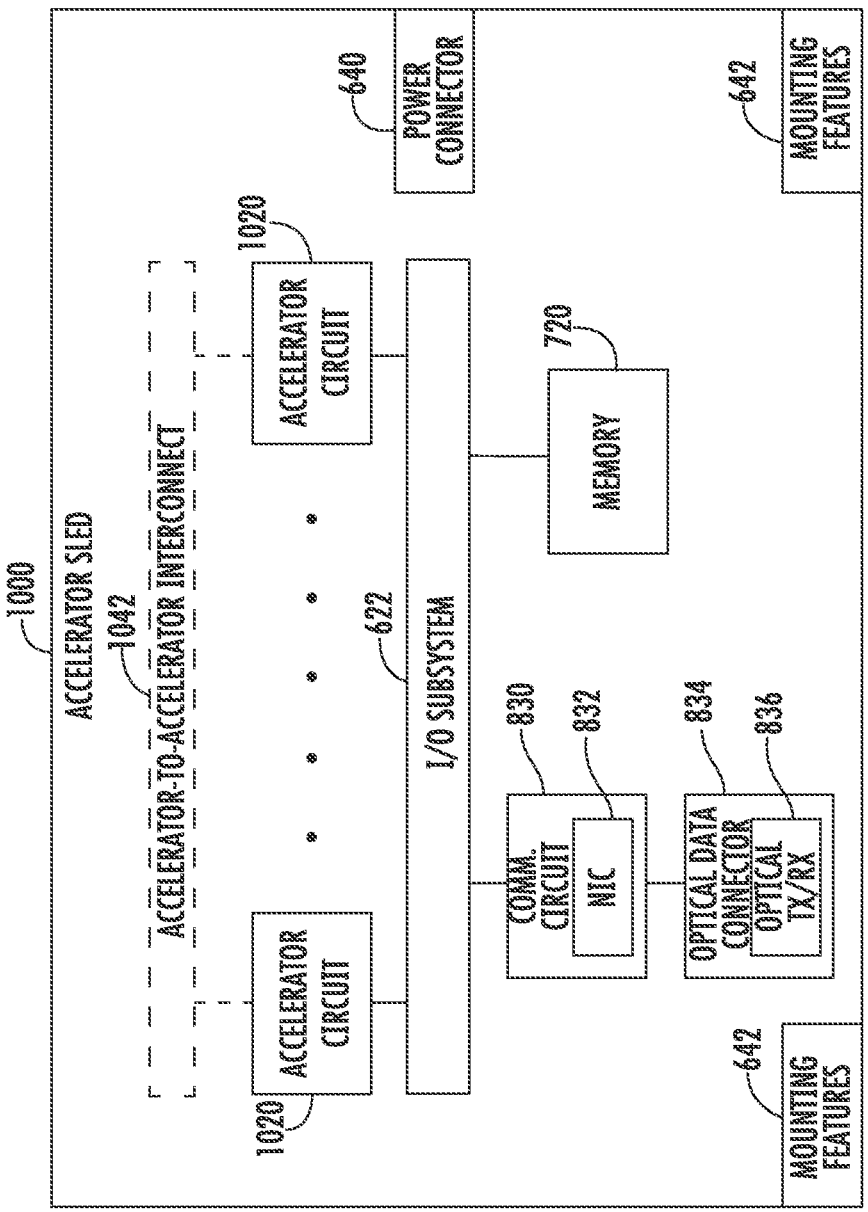

Referring now to FIG. 10, in some embodiments, the sled 400 may be embodied as an accelerator sled 1000. The accelerator sled 1000 is configured, to perform specialized compute tasks, such as machine learning, encryption, hashing, or other computational-intensive task. In some embodiments, for example, a compute sled 800 may offload tasks to the accelerator sled 1000 during operation. The accelerator sled 1000 includes various components similar to components of the sled 400 and/or compute sled 800, which have been identified in FIG. 10 using the same reference numbers. The description of such components provided above in regard to FIGS. 6, 7, and 8 apply to the corresponding components of the accelerator sled 1000 and is not repeated herein for clarity of the description of the accelerator sled 1000.

Figure 11:
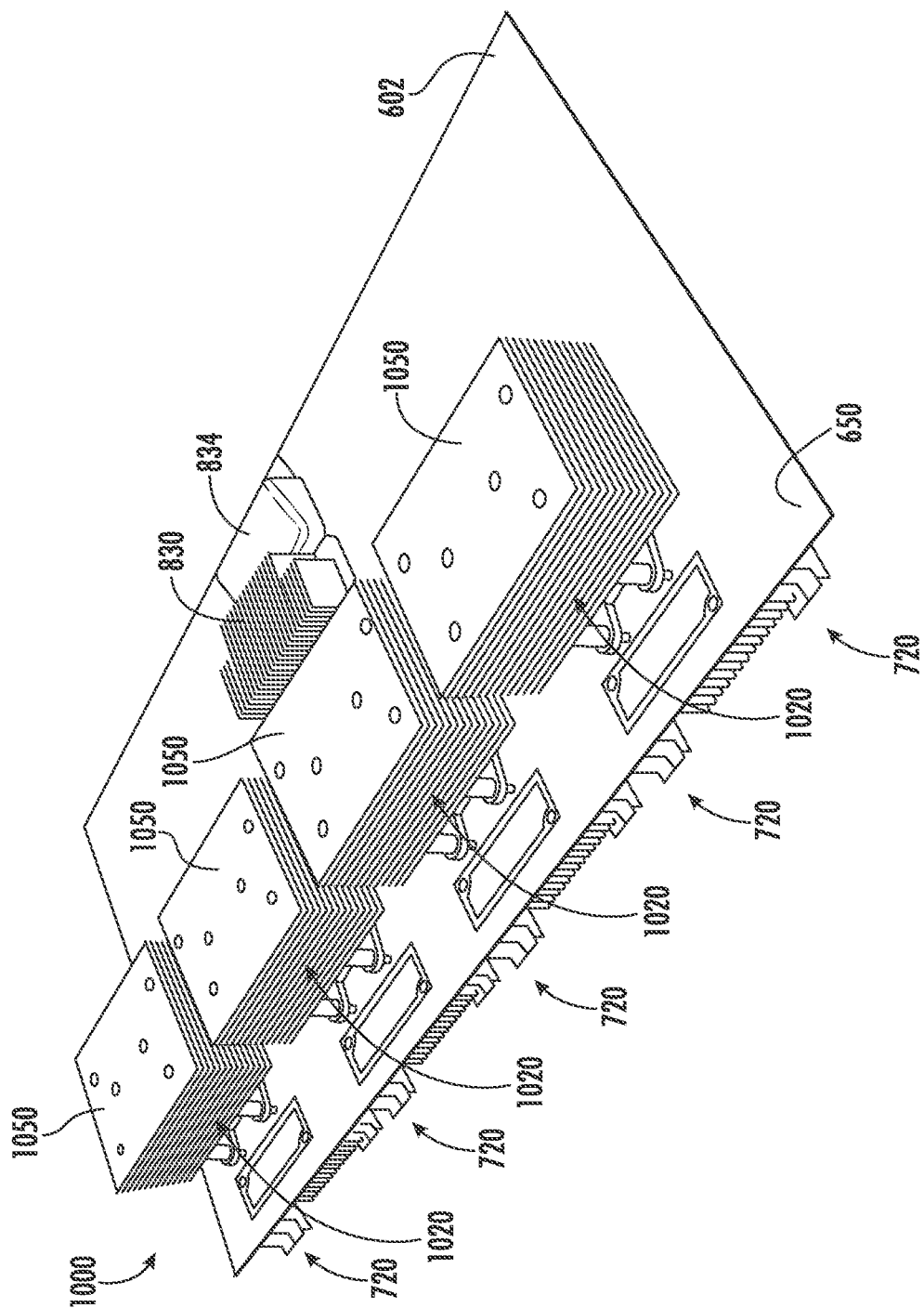

In the illustrative accelerator sled 1000, the physical resources 620 are embodied as accelerator circuits 1020. Although only two accelerator circuits 1020 are shown in FIG. 10, it should be appreciated that the accelerator sled 1000 may include additional accelerator circuits 1020 in other embodiments. For example, as shown in FIG. 11, the accelerator sled 1000 may include four accelerator circuits 1020 in some embodiments. The accelerator circuits 1020 may be embodied as any type of processor, co-processor, compute circuit, or other device capable of performing compute or processing operations. For example, the accelerator circuits 1020 may be embodied as, for example, central processing units, cores, field programmable gate arrays (FPGA), application-specific integrated circuits (ASICs), programmable control logic (PCL), security co-processors, graphics processing units (GPUs), neuromorphic processor units, quantum computers, machine learning circuits, or other specialized processors, controllers, devices, and/or circuits.

In some embodiments, the accelerator sled 1000 may also include an accelerator-to-accelerator interconnect 1042. Similar to the resource-to-resource interconnect 624 of the sled 600 discussed above, the accelerator-to-accelerator interconnect 1042 may be embodied as any type of communication interconnect capable of facilitating accelerator-to-accelerator communications. In the illustrative embodiment, the accelerator-to-accelerator interconnect 1042 is embodied as a high-speed point-to-point interconnect (e.g., faster than the I/O subsystem 622). For example, the accelerator-to-accelerator interconnect 1042 may be embodied as a QuickPath Interconnect (QPI), an UltraPath Interconnect (UPI), or other high-speed point-to-point interconnect dedicated to processor-to-processor communications. In some embodiments, the accelerator circuits 1020 may be daisy-chained with a primary accelerator circuit 1020 connected to the NIC 832 and memory 720 through the I/O subsystem 622 and a secondary accelerator circuit 1020 connected to the NIC 832 and memory 720 through a primary accelerator circuit 1020.

Referring now to FIG. 11, an illustrative embodiment of the accelerator sled 1000 is shown. As discussed above, the accelerator circuits 1020, communication circuit 830, and optical data connector 834 are mounted to the top side 650 of the chassis-less circuit board substrate 602. Again, the individual accelerator circuits 1020 and communication circuit 830 are mounted to the top side 650 of the chassis-less circuit board substrate 602 such that no two heat-producing, electrical components shadow each other as discussed above. The memory devices 720 of the accelerator sled 1000 are mounted to the bottom side 750 of the of the chassis-less circuit board substrate 602 as discussed above in regard to the sled 600. Although mounted to the bottom side 750, the memory devices 720 are communicatively coupled to the accelerator circuits 1020 located on the top side 650 via the I/O subsystem 622 (e.g., through vias). Further, each of the accelerator circuits 1020 may include a heatsink 1070 that is larger than a traditional heatsink used in a server. As discussed above with reference to the heatsinks 870, the heatsinks 1070 may be larger than traditional heatsinks because of the "free" area provided by the memory resources 720 being located on the bottom side 750 of the chassis-less circuit board substrate 602 rather than on the top side 650.

Figure 12:
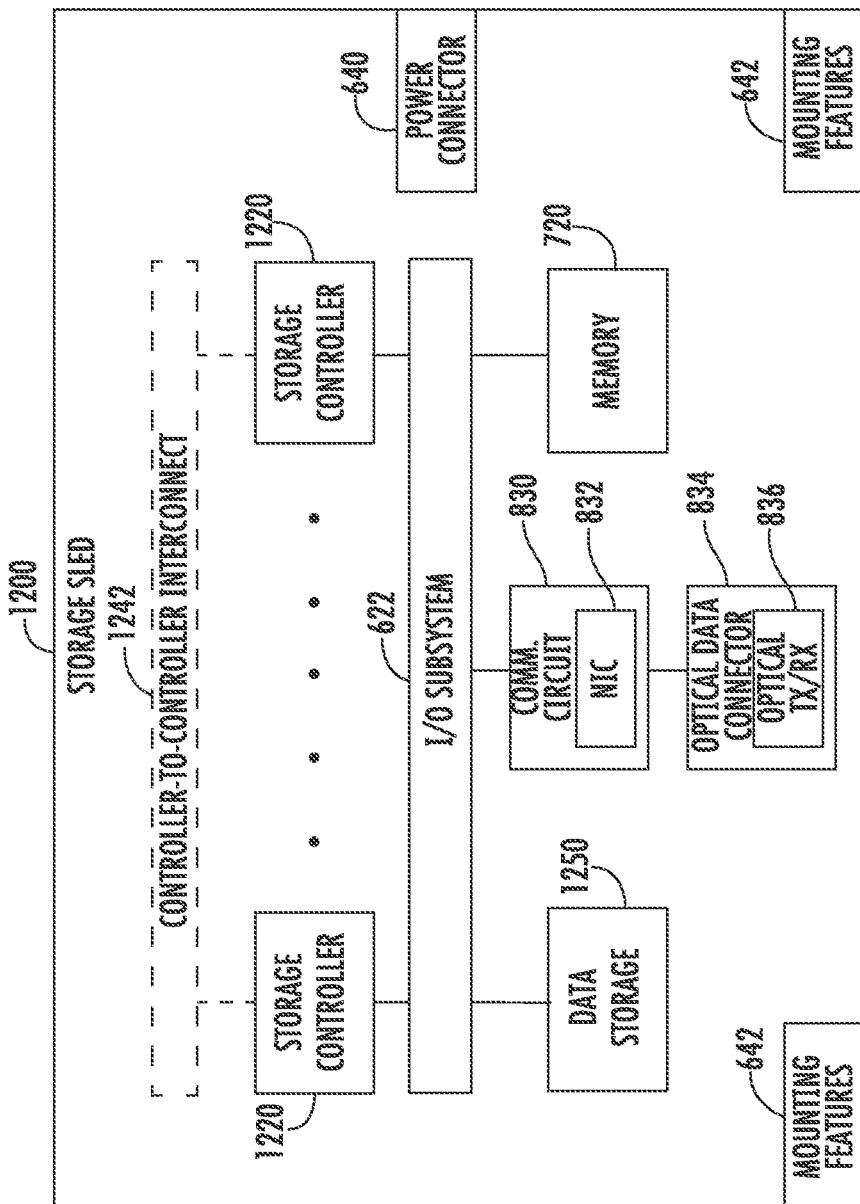

Referring now to FIG. 12, in some embodiments, the sled 400 may be embodied as a storage sled 1200. The storage sled 1200 is configured, to store data in a data storage 1250 local to the storage sled 1200. For example, during operation, a compute sled 800 or an accelerator sled 1000 may store and retrieve data from the data storage 1250 of the storage sled 1200. The storage sled 1200 includes various components similar to components of the sled 400 and/or the compute sled 800, which have been identified in FIG. 12 using the same reference numbers. The description of such components provided above with regard to FIGS. 6, 7, and 8 apply to the corresponding components of the storage sled 1200 and is not repeated herein for clarity of the description of the storage sled 1200.

In the illustrative storage sled 1200, the physical resources 620 are embodied as storage controllers 1220. Although only two storage controllers 1220 are shown in FIG. 12, it should be appreciated that the storage sled 1200 may include additional storage controllers 1220 in other embodiments. The storage controllers 1220 may be embodied as any type of processor, controller, or control circuit capable of controlling the storage and retrieval of data into the data storage 1250 based on requests received via the communication circuit 830. In the illustrative embodiment, the storage controllers 1220 are embodied as relatively low-power processors or controllers. For example, in some embodiments, the storage controllers 1220 may be configured to operate at a power rating of about 75 watts.

In some embodiments, the storage sled 1200 may also include a controller-to-controller interconnect 1242. Similar to the resource-to-resource interconnect 624 of the sled 400 discussed above, the controller-to-controller interconnect 1242 may be embodied as any type of communication interconnect capable of facilitating controller-to-controller communications. In the illustrative embodiment, the controller-to-controller interconnect 1242 is embodied as a high-speed point-to-point interconnect (e.g., faster than the I/O subsystem 622). For example, the controller-to-controller interconnect 1242 may be embodied as a QuickPath Interconnect (QPI), an UltraPath Interconnect (UPI), or other high-speed point-to-point interconnect dedicated to processor-to-processor communications.

Figure 13:
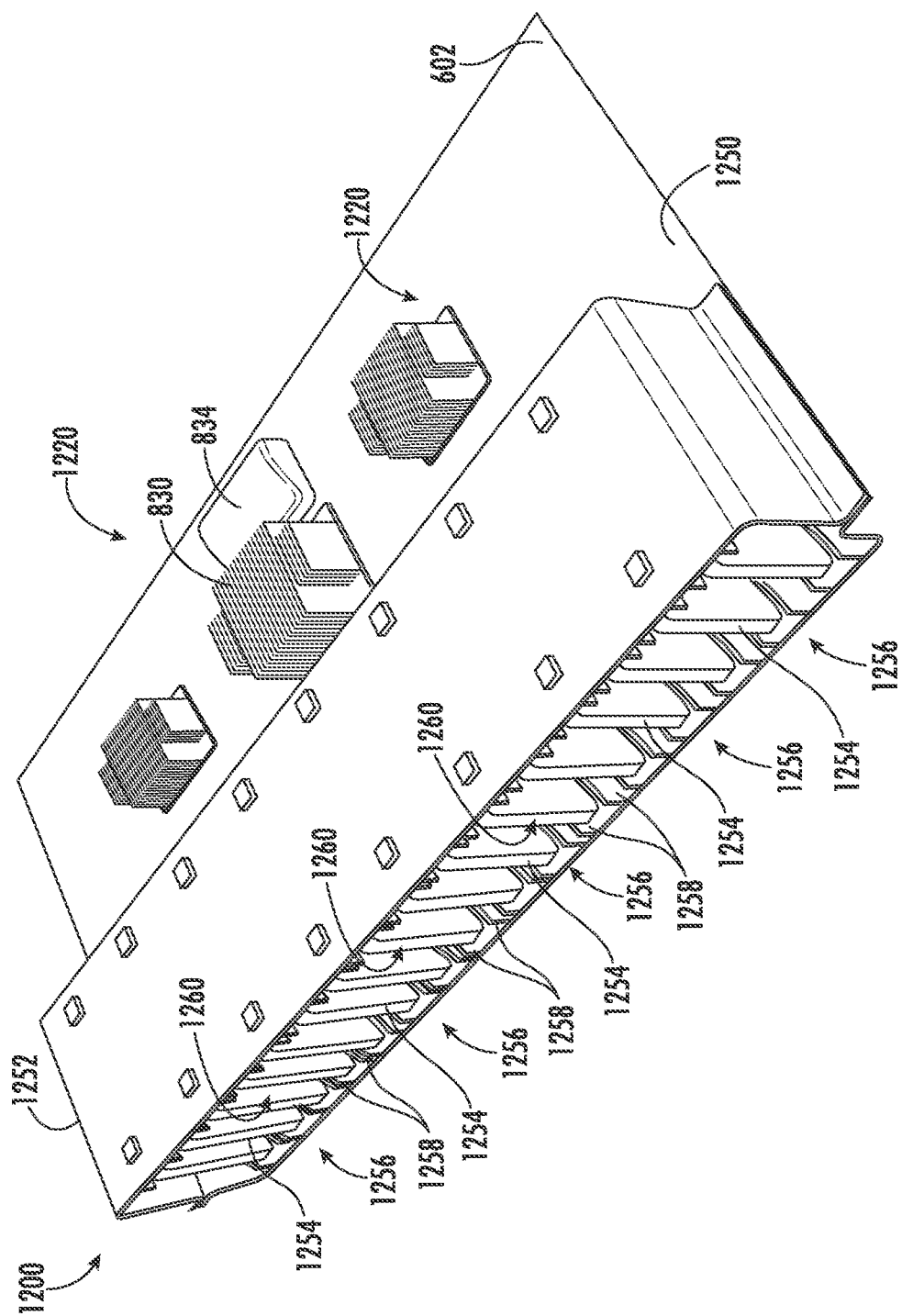

Referring now to FIG. 13, an illustrative embodiment of the storage sled 1200 is shown. In the illustrative embodiment, the data storage 1250 is embodied as, or otherwise includes, a storage cage 1252 configured to house one or more solid state drives (SSDs) 1254. To do so, the storage cage 1252 includes a number of mounting slots 1256, each of which is configured to receive a corresponding solid state drive 1254. Each of the mounting slots 1256 includes a number of drive guides 1258 that cooperate to define an access opening 1260 of the corresponding mounting slot 1256. The storage cage 1252 is secured to the chassis-less circuit board substrate 602 such that the access openings face away from (e.g., toward the front of) the chassis-less circuit board substrate 602. As such, solid state drives 1254 are accessible while the storage sled 1200 is mounted in a corresponding rack 204. For example, a solid state drive 1254 may be swapped out of a rack 240 (e.g., via a robot) while the storage sled 1200 remains mounted in the corresponding rack 240.

The storage cage 1252 illustratively includes sixteen mounting slots 1256 and is capable of mounting and storing sixteen solid state drives 1254. Of course, the storage cage 1252 may be configured to store additional or fewer solid state drives 1254 in other embodiments. Additionally, in the illustrative embodiment, the solid state drivers are mounted vertically in the storage cage 1252, but may be mounted in the storage cage 1252 in a different orientation in other embodiments. Each solid state drive 1254 may be embodied as any type of data storage device capable of storing long term data. To do so, the solid state drives 1254 may include volatile and non-volatile memory devices discussed above.

As shown in FIG. 13, the storage controllers 1220, the communication circuit 830, and the optical data connector 834 are illustratively mounted to the top side 650 of the chassis-less circuit board substrate 602. Again, as discussed above, any suitable attachment or mounting technology may be used to mount the electrical components of the storage sled 1200 to the chassis-less circuit board substrate 602 including, for example, sockets (e.g., a processor socket), holders, brackets, soldered connections, and/or other mounting or securing techniques.

As discussed above, the individual storage controllers 1220 and the communication circuit 830 are mounted to the top side 650 of the chassis-less circuit board substrate 602 such that no two heat-producing, electrical components shadow each other. For example, the storage controllers 1220 and the communication circuit 830 are mounted in corresponding locations on the top side 650 of the chassis-less circuit board substrate 602 such that no two of those electrical components are linearly in-line with each other along the direction of the airflow path 608.

The memory devices 720 of the storage sled 1200 are mounted to the bottom side 750 of the of the chassis-less circuit board substrate 602 as discussed above in regard to the sled 400. Although mounted to the bottom side 750, the memory devices 720 are communicatively coupled to the storage controllers 1220 located on the top side 650 via the I/O subsystem 622. Again, because the chassis-less circuit board substrate 602 is embodied as a double-sided circuit board, the memory devices 720 and the storage controllers 1220 may be communicatively coupled by one or more vias, connectors, or other mechanisms extending through the chassis-less circuit board substrate 602. Each of the storage controllers 1220 includes a heatsink 1270 secured thereto. As discussed above, due to the improved thermal cooling characteristics of the chassis-less circuit board substrate 602 of the storage sled 1200, none of the heatsinks 1270 include cooling fans attached thereto. That is, each of the heatsinks 1270 is embodied as a fan-less heatsink.

Figure 14:
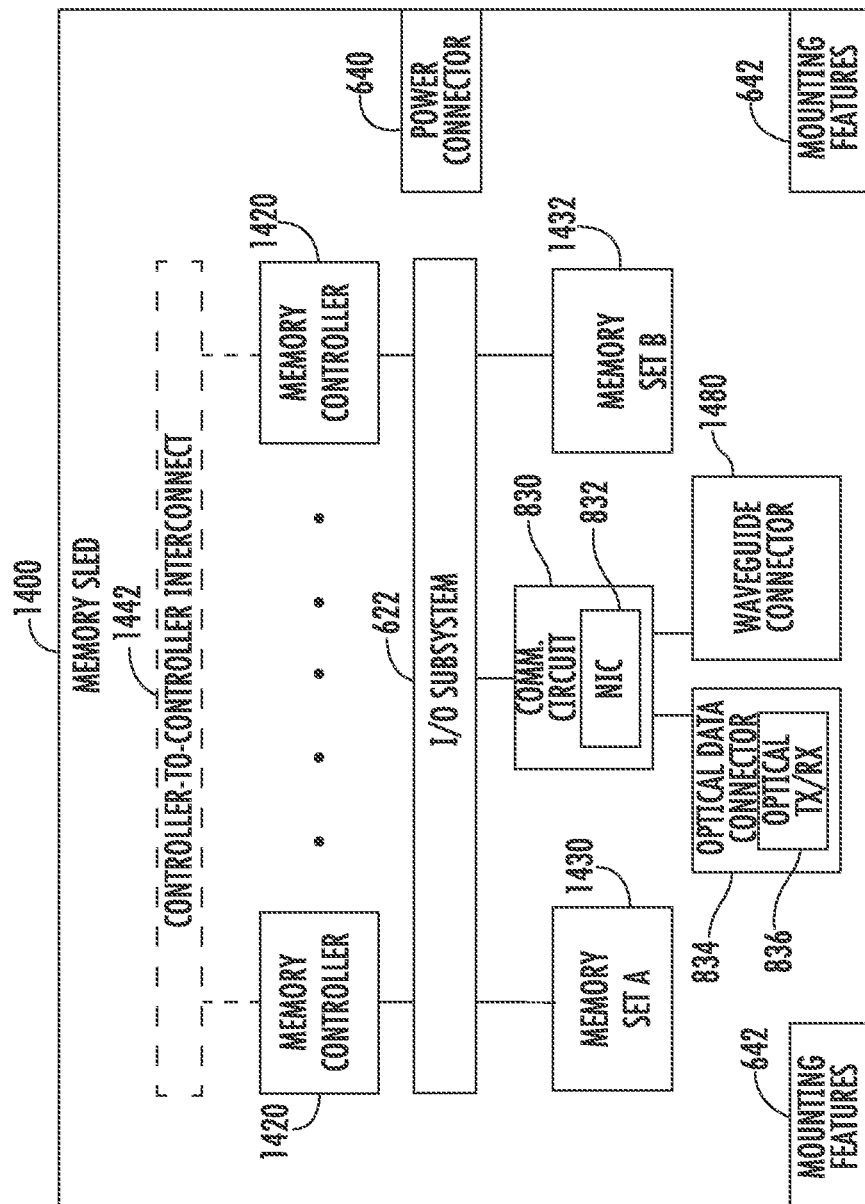

Referring now to FIG. 14, in some embodiments, the sled 400 may be embodied as a memory sled 1400. The storage sled 1400 is optimized, or otherwise configured, to provide other sleds 400 (e.g., compute sleds 800, accelerator sleds 1000, etc.) with access to a pool of memory (e.g., in two or more sets 1430, 1432 of memory devices 720) local to the memory sled 1200. For example, during operation, a compute sled 800 or an accelerator sled 1000 may remotely write to and/or read from one or more of the memory sets 1430, 1432 of the memory sled 1200 using a logical address space that maps to physical addresses in the memory sets 1430, 1432. The memory sled 1400 includes various components similar to components of the sled 400 and/or the compute sled 800, which have been identified in FIG. 14 using the same reference numbers. The description of such components provided above in regard to FIGS. 6, 7, and 8 apply to the corresponding components of the memory sled 1400 and is not repeated herein for clarity of the description of the memory sled 1400.

In the illustrative memory sled 1400, the physical resources 620 are embodied as memory controllers 1420. Although only two memory controllers 1420 are shown in FIG. 14, it should be appreciated that the memory sled 1400 may include additional memory controllers 1420 in other embodiments. The memory controllers 1420 may be embodied as any type of processor, controller, or control circuit capable of controlling the writing and reading of data into the memory sets 1430, 1432 based on requests received via the communication circuit 830. In the illustrative embodiment, each memory controller 1420 is connected to a corresponding memory set 1430, 1432 to write to and read from memory devices 720 within the corresponding memory set 1430, 1432 and enforce any permissions (e.g., read, write, etc.) associated with sled 400 that has sent a request to the memory sled 1400 to perform a memory access operation (e.g., read or write).

In some embodiments, the memory sled 1400 may also include a controller-to-controller interconnect 1442. Similar to the resource-to-resource interconnect 624 of the sled 400 discussed above, the controller-to-controller interconnect 1442 may be embodied as any type of communication interconnect capable of facilitating controller-to-controller communications. In the illustrative embodiment, the controller-to-controller interconnect 1442 is embodied as a high-speed point-to-point interconnect (e.g., faster than the I/O subsystem 622). For example, the controller-to-controller interconnect 1442 may be embodied as a QuickPath Interconnect (QPI), an UltraPath Interconnect (UPI), or other high-speed point-to-point interconnect dedicated to processor-to-processor communications. As such, in some embodiments, a memory controller 1420 may access, through the controller-to-controller interconnect 1442, memory that is within the memory set 1432 associated with another memory controller 1420. In some embodiments, a scalable memory controller is made of multiple smaller memory controllers, referred to herein as "chiplets", on a memory sled (e.g., the memory sled 1400). The chiplets may be interconnected (e.g., using EMIB (Embedded Multi-Die Interconnect Bridge)). The combined chiplet memory controller may scale up to a relatively large number of memory controllers and I/O ports, (e.g., up to 16 memory channels). In some embodiments, the memory controllers 1420 may implement a memory interleave (e.g., one memory address is mapped to the memory set 1430, the next memory address is mapped to the memory set 1432, and the third address is mapped to the memory set 1430, etc.). The interleaving may be managed within the memory controllers 1420, or from CPU sockets (e.g., of the compute sled 800) across network links to the memory sets 1430, 1432, and may improve the latency associated with performing memory access operations as compared to accessing contiguous memory addresses from the same memory device.

Further, in some embodiments, the memory sled 1400 may be connected to one or more other sleds 400 (e.g., in the same rack 240 or an adjacent rack 240) through a waveguide, using the waveguide connector 1480. In the illustrative embodiment, the waveguides are 64 millimeter waveguides that provide 16 Rx (e.g., receive) lanes and 16 Tx (e.g., transmit) lanes. Each lane, in the illustrative embodiment, is either 16 GHz or 32 GHz. In other embodiments, the frequencies may be different. Using a waveguide may provide high throughput access to the memory pool (e.g., the memory sets 1430, 1432) to another sled (e.g., a sled 400 in the same rack 240 or an adjacent rack 240 as the memory sled 1400) without adding to the load on the optical data connector 834.

Figure 15:
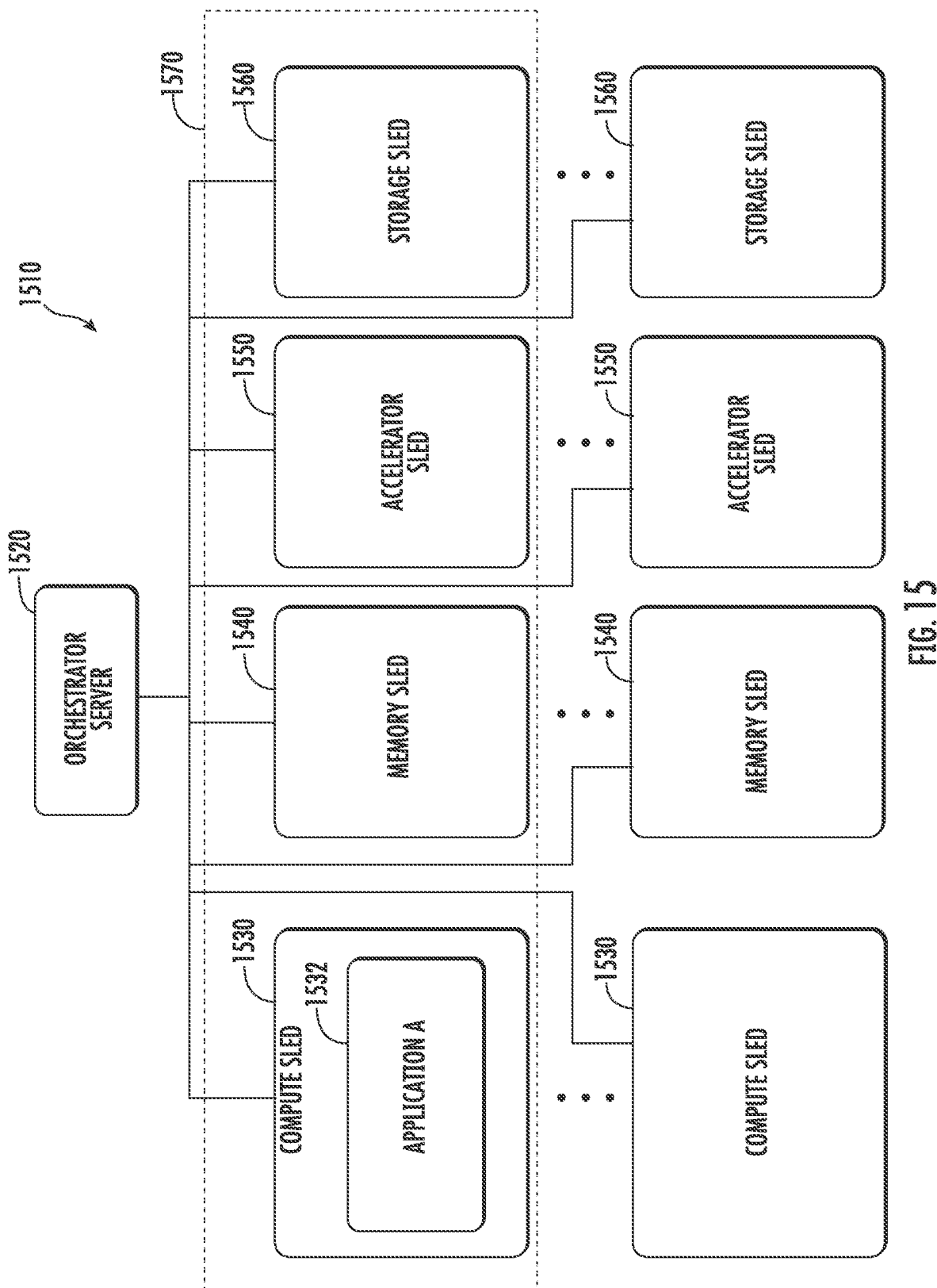

Referring now to FIG. 15, a system for executing one or more workloads (e.g., applications) may be implemented in accordance with the data center 100. In the illustrative embodiment, the system 1510 includes an orchestrator server 1520, which may be embodied as a managed node comprising a compute device (e.g., a processor 820 on a compute sled 800) executing management software (e.g., a cloud operating environment, such as OpenStack) that is communicatively coupled to multiple sleds 400 including a large number of compute sleds 1530 (e.g., each similar to the compute sled 800), memory sleds 1540 (e.g., each similar to the memory sled 1400), accelerator sleds 1550 (e.g., each similar to the memory sled 1000), and storage sleds 1560 (e.g., each similar to the storage sled 1200). One or more of the sleds 1530, 1540, 1550, 1560 may be grouped into a managed node 1570, such as by the orchestrator server 1520, to collectively perform a workload (e.g., an application 1532 executed in a virtual machine or in a container). The managed node 1570 may be embodied as an assembly of physical resources 620, such as processors 820, memory resources 720, accelerator circuits 1020, or data storage 1250, from the same or different sleds 400. Further, the managed node may be established, defined, or "spun up" by the orchestrator server 1520 at the time a workload is to be assigned to the managed node or at any other time, and may exist regardless of whether any workloads are presently assigned to the managed node. In the illustrative embodiment, the orchestrator server 1520 may selectively allocate and/or deallocate physical resources 620 from the sleds 400 and/or add or remove one or more sleds 400 from the managed node 1570 as a function of quality of service (QoS) targets (e.g., a target throughput, a target latency, a target number instructions per second, etc.) associated with a service level agreement for the workload (e.g., the application 1532). In doing so, the orchestrator server 1520 may receive telemetry data indicative of performance conditions (e.g., throughput, latency, instructions per second, etc.) in each sled 400 of the managed node 1570 and compare the telemetry data to the quality of service targets to determine whether the quality of service targets are being satisfied. The orchestrator server 1520 may additionally determine whether one or more physical resources may be deallocated from the managed node 1570 while still satisfying the QoS targets, thereby freeing up those physical resources for use in another managed node (e.g., to execute a different workload). Alternatively, if the QoS targets are not presently satisfied, the orchestrator server 1520 may determine to dynamically allocate additional physical resources to assist in the execution of the workload (e.g., the application 1532) while the workload is executing. Similarly, the orchestrator server 1520 may determine to dynamically deallocate physical resources from a managed node if the orchestrator server 1520 determines that deallocating the physical resource would result in QoS targets still being met.

Additionally, in some embodiments, the orchestrator server 1520 may identify trends in the resource utilization of the workload (e.g., the application 1532), such as by identifying phases of execution (e.g., time periods in which different operations, each having different resource utilizations characteristics, are performed) of the workload (e.g., the application 1532) and pre-emptively identifying available resources in the data center 100 and allocating them to the managed node 1570 (e.g., within a predefined time period of the associated phase beginning). In some embodiments, the orchestrator server 1520 may model performance based on various latencies and a distribution scheme to place workloads among compute sleds and other resources (e.g., accelerator sleds, memory sleds, storage sleds) in the data center 100. For example, the orchestrator server 1520 may utilize a model that accounts for the performance of resources on the sleds 400 (e.g., FPGA performance, memory access latency, etc.) and the performance (e.g., congestion, latency, bandwidth) of the path through the network to the resource (e.g., FPGA). As such, the orchestrator server 1520 may determine which resource(s) should be used with which workloads based on the total latency associated with each potential resource available in the data center 100 (e.g., the latency associated with the performance of the resource itself in addition to the latency associated with the path through the network between the compute sled executing the workload and the sled 400 on which the resource is located).

In some embodiments, the orchestrator server 1520 may generate a map of heat generation in the data center 100 using telemetry data (e.g., temperatures, fan speeds, etc.) reported from the sleds 400 and allocate resources to managed nodes as a function of the map of heat generation and predicted heat generation associated with different workloads, to maintain a target temperature and heat distribution in the data center 100. Additionally or alternatively, in some embodiments, the orchestrator server 1520 may organize received telemetry data into a hierarchical model that is indicative of a relationship between the managed nodes (e.g., a spatial relationship such as the physical locations of the resources of the managed nodes within the data center 100 and/or a functional relationship, such as groupings of the managed nodes by the customers the managed nodes provide services for, the types of functions typically performed by the managed nodes, managed nodes that typically share or exchange workloads among each other, etc.). Based on differences in the physical locations and resources in the managed nodes, a given workload may exhibit different resource utilizations (e.g., cause a different internal temperature, use a different percentage of processor or memory capacity) across the resources of different managed nodes. The orchestrator server 1520 may determine the differences based on the telemetry data stored in the hierarchical model and factor the differences into a prediction of future resource utilization of a workload if the workload is reassigned from one managed node to another managed node, to accurately balance resource utilization in the data center 100. In some embodiments, the orchestrator server 1520 may identify patterns in resource utilization phases of the workloads and use the patterns to predict future resource utilization of the workloads.

To reduce the computational load on the orchestrator server 1520 and the data transfer load on the network, in some embodiments, the orchestrator server 1520 may send self-test information to the sleds 400 to enable each sled 400 to locally (e.g., on the sled 400) determine whether telemetry data generated by the sled 400 satisfies one or more conditions (e.g., an available capacity that satisfies a predefined threshold, a temperature that satisfies a predefined threshold, etc.). Each sled 400 may then report back a simplified result (e.g., yes or no) to the orchestrator server 1520, which the orchestrator server 1520 may utilize in determining the allocation of resources to managed nodes.

Sled form factors described herein are non-limiting. For example, 19 inch racks can be used. Various architectures such as Rack Scale Design (RSD), Rack Scale Architecture (RSA), and others can be used.

Flexible Memory Access Translations

Figure 16:
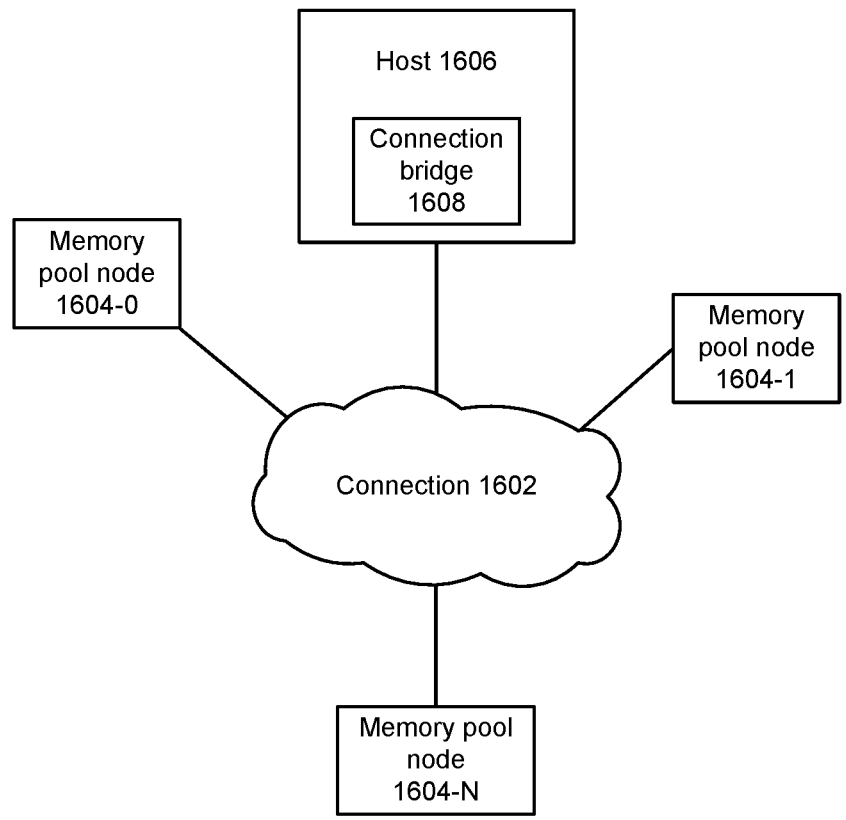

FIG. 16 depicts an example system. Multiple devices can be connected using connection 1602. Connection 1602 can be a fabric, network or interconnect. For example, connection 1602 can be compatible at least with Intel® QuickPath Interconnect (QPI), Intel Ultra Path Interconnect (UPI), Intel® On-Chip System Fabric (IOSF), Omnipath, Ethernet, Compute Express Link (CXL), HyperTransport, high-speed fabric, PCIe, NVLink, Advanced Microcontroller Bus Architecture (AMBA) interconnect, OpenCAPI, Gen-Z, CCIX, Advanced Micro Devices, Inc. (AMD) Infinity Fabric (IF), and so forth. Note that remote direct memory access (RDMA) over CXL or any interface specification can be used. In some examples, CXL can be used as an accelerator link or memory link. Data can be copied or stored to virtualized storage nodes or accessed using a protocol such as NVMe over Fabrics (NVMe-oF) or NVMe. In some examples, a remote memory pool or remote storage device can communicate with a computing node (e.g., host, server, or other remote memory pool or storage device) using at least one forwarding network device or a network cable. In some examples, a remote memory pool or remote storage device and an issuer of a memory access request are not located on a same system on chip (SoC).

Host system 1606 can use connection bridge 1608 to communicate over connection 1602 to access one or more local or remote storage or memory pool nodes (e.g., one or more of memory pool nodes 1604-0 to 1604-N, where N is an integer). For example, connection bridge 1608 can include a network interface controller (NIC). The NIC can use various embodiments to identify an address of a storage location to which a memory access request is to be transmitted.

A memory pool node (e.g., one or more of memory pool nodes 1604-0 to 1604-N, where N is an integer) can include one or more tiers of memory. For example, multiple tiers of memory or storage can include one or more of: a cache (e.g., L1, L2, L3, lower level cache (LLC)), memory (e.g., JEDEC DDR compatible memory or JEDEC HBM compatible memory), persistent memory (e.g., Intel® Optane® or Samsung Z-NAND), storage (e.g., NAND or 3D NAND), hard disk drives, or 2-level memory (2LM).

Various embodiments can use at least two levels of memory (alternatively referred to herein as "2LM") that includes cached subsets of system disk level storage (in addition to, for example, run-time data). Host 1606 can include a main memory that includes a first level (alternatively referred to herein as "near memory") including smaller faster memory made of, for example, DRAM or other volatile memory; and a second level (alternatively referred to herein as "far memory") which includes larger and slower (with respect to the near memory) volatile memory (e.g., DRAM) or nonvolatile memory storage (e.g., flash memory or byte addressable non-volatile memory (e.g., Intel® Optane® or Samsung Z-NAND)). The far memory can be presented as "main memory" to the host operating system (OS), while the near memory is a cache for the far memory that is transparent to the OS, thus rendering the embodiments described below to appear the same as prior art main memory solutions. The management of the two-level memory may be done by a combination of logic and modules executed via the host central processing unit (CPU). Near memory may be coupled to the host system CPU via high bandwidth, low latency means for efficient processing. Far memory may be coupled to the CPU via low bandwidth, high latency means (as compared to that of the near memory).

Figure 17:
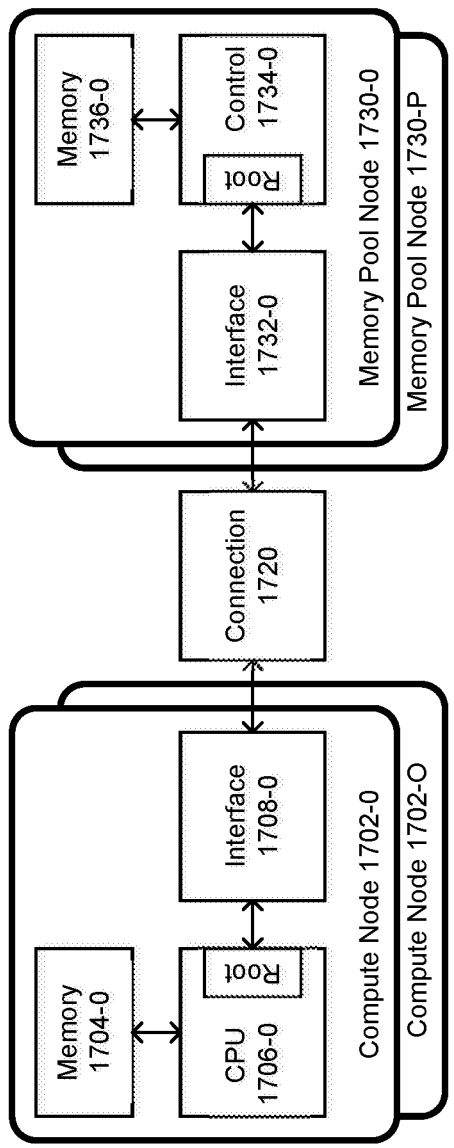

FIG. 17 depicts an example system. In some examples, the system topology includes compute nodes 1702-0 to 1702-O (where O is an integer), connected to any or all of memory nodes 1730-0 to 1730-P (where P is an integer) via connection 1720. Compute nodes 1702-0 to 1702-O can utilize locally-attached memory 1704-0 to 1704-O and also access memory nodes 1730-0 to 1730-P. System software executed by CPU 1706-0 to 1706-O can manage how the memory in memory nodes 1730-0 to 1730-P is partitioned between or assigned to compute nodes 1702-0 to 1702-O. Compute nodes 1702-0 to 1702-O (or memory pool nodes 1730-0 to 1730-P) can send memory access requests (e.g., read or write) to any compute node 1702-0 to 1702-O or other memory pool node 1730-0 to 1730-P.

Some multi-interface, multi-protocol storage systems support a single access scheme of a block of data or file and rely on software in the data path to achieve such modularity. Fixed-size block allocation, also called memory pool allocation, can use a free list of fixed-size blocks of memory (often all of the same size). However, single access schemes may not work with memory semantics due to the nature and speed of access required. In some cases, using software or firmware to perform translation may slow down response times from the memory.

Various embodiments provide a memory pool with a flexible interface that allows a memory pool design to be deployed in different system architectures or access semantics. Various embodiments avoid requiring different memory pool node designs for different system architectures. Various embodiments provide for a single memory pool design to be deployed in different architectures or to be repurposed without being replaced as the system architecture evolves. Various embodiments provide for a single pool design to support multiple fabric or network interface protocols or multiple accesses semantics (e.g., page-granular or cache line granular).

Figure 18:
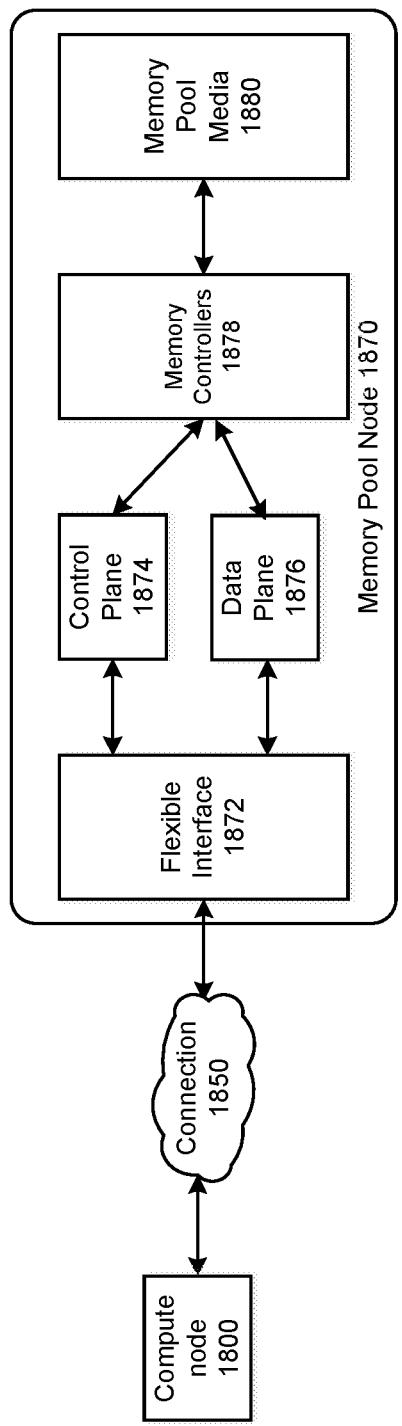

FIG. 18 depicts a memory pool node system. Compute node 1800 (or other memory pool nodes) can send memory access requests (e.g., read or write) to memory pool node 1870 over connection 1850. Memory access requests sent over connection 1850 can include a load or store (e.g., read or write) of a X-byte payload (where X is an integer) from or to memory pool 1870 as well as the accompanying data payload. Connection 1850 can carry the memory access request to memory pool node 1870. Memory pool node 1870 can include flexible interface 1872, control plane 1874, data plane 1876, memory controller(s) 1878, and memory pool media 1880. Memory pool media 1880 could be a combination of various volatile and non-volatile memory or storage technologies described herein as well as variations thereof.

Various embodiments provide for address translation to be performed in a flexible interface and/or memory controller. A communication (e.g., packet) transmitted from a compute node (e.g., compute node 1800) through connection 1850 to memory pool node 1870 can include a write request and associated payload to write into memory pool node 1870 or a read request and associated address to read from memory pool node 1870. Fabric interface 1872 can receive memory access requests in communications compatible with any communications protocol used by connection 1850, such as, but not limited to, Ethernet, CXL, CXL.mem, PCIe, NVMe, NVMe-oF, Serial AT Attachment (SATA), and so forth.

For example, flexible interface 1872 can translate the memory access request from a compute node representation of an addressable region to a fabric-agnostic representation suitable for utilization by memory controller 1878 to access a specific media to complete the memory access request (e.g., read or write). In some examples, flexible interface 1872 can perform conversion of memory access requests in one or multiple packets to semantics recognized by memory controller 1878. For example, a connection-specific memory access request could include a write or read command that references data according to block or byte-based addressing. For example, flexible interface 1872 can translate a fabric specific memory access request to a byte-based instruction in semantics recognized and processable by memory controller 1878. For example, flexible interface 1872 can translate a fabric specific memory access request to a media-independent write or read request that includes a starting byte address and length or block level addressing. In the block storage model, data is saved to a storage media in fixed-sized blocks, where a block is associated with a unique address.

In some embodiments, fabric interface 1872 can perform translation of a memory access request received in the packet to convert the request to a fabric-agnostic representation that can be interpreted and performed by memory controller 1878. In some examples, no format conversion is performed if the format of the memory request is recognized by the memory controller for the target media. In some examples, regardless of the fabric type, the elements of a memory access request can include: read type/write type, address (e.g., virtual address), read-modify-write, and data for a write request. For example, fabric interface 1872 can apply one or more translation templates to translate requests of a particular format to a request of a different format. For example, values in certain fields can be copied to fields in a request of a different format whereas values in certain fields can be dropped or translated to other values for insertion into fields in the request of the different format. For example, where connection 1850 provides communications compatible with CXL.mem, a received memory access request can refer to cache-line granular load or store accesses and such cache-line granular load or store accesses are converted semantics recognized by memory controller 1878. For example, where connection 1850 provides communications compatible with PCIe, a received memory access request can refer to reads or writes of messages of various sizes and such reads or writes can be converted to semantics recognized by memory controller 1878. Flexible interface 1872 can output a memory access request compatible with a vendor-specific protocol to command memory controller 1878 using applicable address bus line communication semantics, data command line communication semantics, and buffer access semantics.

For example, flexible interface 1872 could provide at least one or more of the features described below.

Flexible interface 1872 can communicate with memory controllers 1878 using any type of connection (e.g., UPI, PCIe, CXL, DDR, and so forth). In some examples, the connection between flexible interface 1872 and memory controllers 1878 can support byte-level read or write instructions. Memory controllers 1878 can convert read or write instructions from flexible interface 1872 to media specific commands for performance using memory pool media 1880. For example, flexible interface 1872 can output a request in a form read or write N bytes at address X and memory controllers 1878 could map the read or write into a format appropriate for the media.

For example, memory controllers 1878 can issue memory access requests (e.g., read/write commands) in accordance with relevant specifications such as JEDEC DDRx (where x is any integer of an available JEDEC specification), DDR-T, CXL, PCIe, Optane, 3D XPoint, NVMe, NVMe-oF, SATA, etc. Memory controllers 1878 can issue media-dependent

| Feature | Example description |
|---|---|
| Ethernet interface conversion | Flexible interface 1872 can convert a memory access request in an Ethernet format message to input signal and buffer semantics accepted and executable by memory controllers 1878. For example, an Ethernet packet can include a transport header (e.g., for packet validation), memory command header (e.g., a memory access request) and data. |
| Native CXL.mem conversion | Flexible interface 1872 can convert a cache-line granular memory access request in a CXL.mem format message to input signal and buffer semantics accepted and executable by memory controllers 1878. For example, an CXL.mem transaction can include a header with memory command embedded into the transaction and requester ID (e.g., for packet validation). For examples, of CXL.mem transactions, see Chapter 3.3 of Compute Express Link Specification revision 2.0, version 0.9 (2020). |
| Native PCIe conversion | Flexible interface 1872 can convert a memory access request in a PCIe format messages of various sizes to input signal and buffer semantics accepted and executable by memory controllers 1878. For example, a PCIe transaction can include a header with memory command embedded into the transaction and requester ID (e.g., for packet validation). For examples of PCIe transactions, see Chapter 2 of PCI Express 4.0 (2017). |
| Proprietary "data movement" conversion commands | Flexible interface 1872 can convert a page-granular memory access request to input signal and buffer semantics accepted and executable by memory controllers 1878. |
| Native interface tunneled over a different fabric (e.g., CXL.mem over Ethernet) | Flexible interface 1872 can convert a memory access request in a CXL.mem message in an Ethernet packet to input signal and buffer semantics accepted and executable by memory controllers 1878. For example, a CXL.mem transaction can be encapsulated in Ethernet and the memory access request is provided in the CXL.mem transaction. |

Flexible interface 1872 can provide flexibility that the translation of the fabric interface can vary along a spectrum of options. In some examples, flexible interface 1872 could be configured for inter-operation with a specific fabric protocol. In such examples, where flexible interface 1872 is implemented in a PCIe card, the PCIe card can be removed and a flexible interface 1872 implemented in another PCIe card that supports a desired fabric specification can be plugged into a PCIe interface for use.

In some examples, flexible interface 1872 could support a number of different interfaces that could be selected, for example, on a per-compute-node basis. For example, compute node A may use native CXL.mem whereas compute node B supports a page move interface carried over Ethernet. In such examples, flexible interface 1872 could apply an address conversion based on a format of a memory access request and a format of a destination media in media 1880.

Note that depending on the fabric, flexible interface 1872 might operate as a non-transparent bridge that presents endpoints to both connection 1850 as well as control plane 1874.

outputs to media 1880 of a request to read or write. In some examples, a memory pool and compute node (e.g., server) could share an address space or have independent address spaces. In some examples, memory controllers 1878 can perform virtual-to-physical address translation for addresses received in a memory access request. In some examples, an intermediary between the requester and the flexible interface 1872 or flexible interface 1872 can perform virtual-to-physical address translation. Media 1880 could include volatile memory, non-volatile memory, persistent memory, 2LM, DDR, NVRAM, storage (e.g., solid state drive (SSD)), spinning disk, etc. Media 1880 might be made up of different memory technologies and different memory technologies may require particular semantics to read or write from such memory technologies. Memory controllers 1878 can convert communications from flexible interface 1872 into an appropriate format for the target media to perform the memory access request (e.g., DDRx, DDR-T, PCIe, 3D XPoint, Optane, etc.). For example, if a memory access request is to be made on a DRAM that uses a DDR4 semantics, memory controllers 1878 can convert a memory access request from flexible interface 1872 into DDR4 semantics so that the memory access request can be performed on the DRAM. For example, if a memory access request is to be made on a 3D XPoint that uses 3D XPoint semantics, memory controllers 1878 can convert a memory access request from flexible interface 1872 into 3D XPoint semantics so that the memory access request can be performed on 3D XPoint.

Control plane 1874 may manage the overall operation of memory pool node 1870, including command semantics and address translation, such as services to translate addresses in memory access requests arriving from connection 1850 into corresponding addresses in memory pool media 1880. Control plane 1874 may be implemented as a combination of hardware and general-purpose CPU cores. In some examples, one or more processors (not depicted) of memory pool node 1870 or another node or device can execute memory pool management software to set-up fabric-to-memory controller translations and memory controller translation operations using control plane 1874 to specify a manner of conversion of a received memory access request to a connection independent format.

Data plane 1876 can transfer read/write operations, after translation, from flexible interface 1872 to memory controllers 1878 or transfer responses to memory access requests from memory controllers 1878 to flexible interface 1872. Data plane 1876 can be utilized after command and address translations are setup in flexible interface 1872 and/or memory controllers 1878. Memory controllers 1878 can perform address translation as configured by control plane 1874 and provide responses of memory access completions such as data in response to a read or acknowledgement in response to a successful write. Responses can be provided through data plane 1876 to flexible interface 1872 for transmission to a request of a memory access operation.

Figure 19:
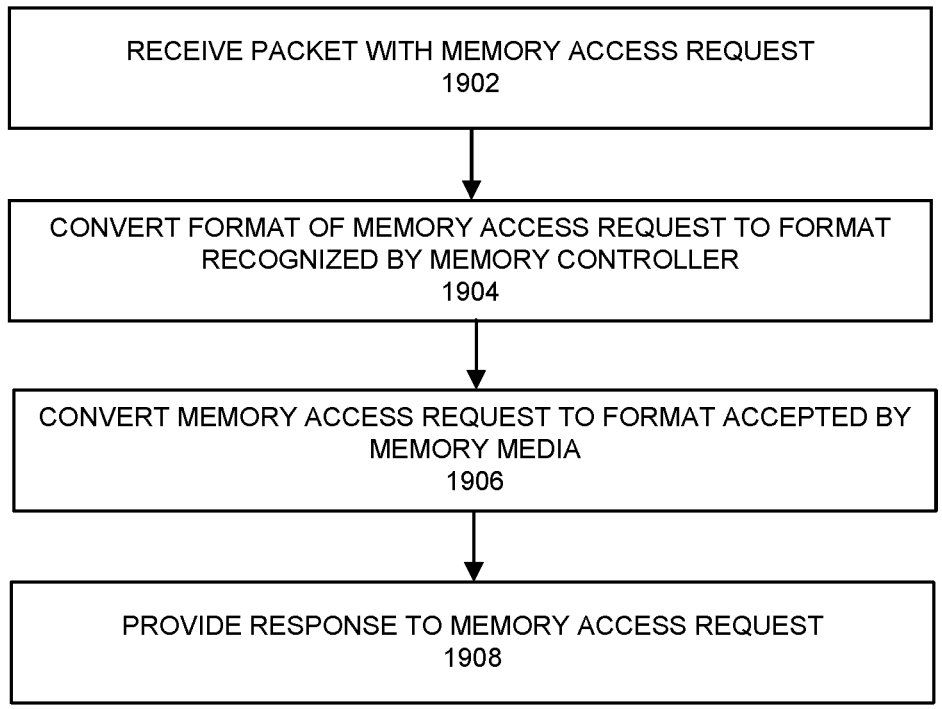

FIG. 19 depicts an example process that can be used by a memory pool to respond to memory access requests (e.g., read or write) received from a network, fabric, or interconnect of any format and convert the memory access request to a format accepted by any media that is to be read-from or written-to. At 1902, an interface of a memory pool receives a packet or other communication from a network, fabric, or interconnect (or other wired or wireless medium). The packet can include a memory access request. Various non-limiting examples of packet formats are described herein.

At 1904, an interface of the memory pool can convert a format of the received memory access request to a format that is accepted by a memory controller. In some examples, no format conversion is performed if the format of the memory request is recognized by the memory controller for the target media. Memory access requests can include a write instruction for an X-byte payload (where X is an integer) starting at an address in an address space of the memory pool or a read instruction to read data starting from an address in an address space of the memory pool, where the read request has a certain size. For example, the interface can convert the received memory access request into a format accepted by a memory controller for a target memory media in the memory pool, where the target memory media has an address associated with the memory access request. There may be the need to terminate aspects of the protocol upstream where conversion might include sending information back to the host (e.g., credits, for example).

At 1906, the memory controller can translate a format of the memory access request from the interface to a format accepted by the media on which a write or read are to take place. In some examples, a memory controller can be used for a particular type of media. For example, a first memory controller can be used to access a volatile memory device (e.g., DRAM) and the first memory controller can translate the memory access request from the interface to a format that can be performed by the volatile memory device. A second memory controller can be used to access a non-volatile memory device (e.g., SSD) and the second memory controller can translate the memory access request from the interface to a format that can be performed by the non-volatile memory device. In some examples, a memory controller can perform virtual-to-physical address translation where the memory pool and compute node (requester) have independent address spaces. However, where the pool and compute node share an address space, address translation may not be performed.

At 1908, the memory node provides a response to the memory access request. The response can be sent to the requester that sent the memory access request in a packet via a connection. The response sent to the requester can include data in response to a read request or an indication of success or failure of a write request.

Predictive Migration of Data to Lower Latency Media

In some embodiments, memory pools can have large capacities and memory pools include media with longer latency or time to retrieve stored data and also include media with lower latency or time to retrieve stored data. For example, lower latency media can include cache (e.g., L1, L2, L3, LLC), volatile memory (e.g., DRAM, SRAM, DDR compatible memory or HBM compatible memory). Medium latency memory can include persistent memory (e.g., Intel® Optane® or Samsung Z-NAND), or 2-level memory (2LM). Higher latency memory can include storage (e.g., NAND or 3D NAND) or hard disk drives. In order to reduce average latency to respond to a memory access request (e.g., read operation), various embodiments can utilize machine learning (ML) or artificial intelligence can be used to select data for migration from higher latency media to lower latency media by placing the data in low-latency buffers for remote access (e.g., access by a compute node). Conversely, data that is less likely to be accessed can be moved from lower latency media to higher latency media to make space in lower latency media.

For example, a machine learning or other prediction system can attempt to fill lower latency media with data from the high-capacity storage in advance of requests for the data from a compute node. This allows the system to hide the latency of the primary storage from being experienced by the compute nodes in the system. Various embodiments can improve average data access latency while allowing for use of memory pools with large capacities.

A discussed earlier, a system topology can include N compute nodes connected to M memory nodes, where N and M are integers and can be the same or different numbers. A compute node can utilize locally-attached memory and also utilize memory nodes for memory. System software (e.g., operating system or hypervisor) can manage how the memory in the memory nodes are partitioned between or assigned to the N compute nodes.

Figure 20A:
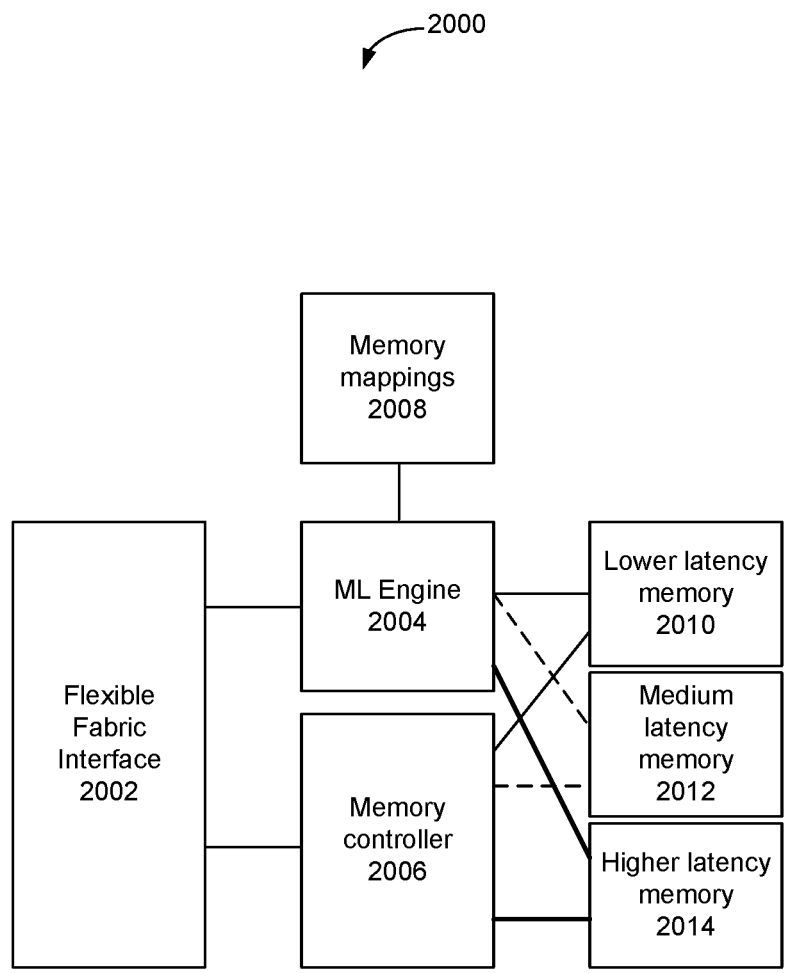

FIG. 20A depicts an example memory node system. Memory node 2000 can use a fabric interface 2002, ML engine 2004 (or inference engine), memory controller (MCU) 2006, lower latency memory 2010, medium latency memory 2012, and higher latency memory 2014 (e.g., high-capacity media (HCM)). Various examples of operations of flexible fabric interface 2002 and memory controller 2006 are described herein. Media in memory pool can be a heterogenous mix of memory and storage (e.g., DRAM, 3D XPoint, 2LM, SSD, hard disk drive, and so forth) where each memory media has different latency characteristics among lower latency (e.g., DRAM), medium latency (e.g., 3D XPoint or 2LM), and higher latency (e.g., SSD or hard disk drive).

The memory pool can receive a request to read data (e.g., get request) under any applicable protocol or specification. At least in manners described herein, the read request can cause the relevant memory media to provide data to memory controller 2006. Memory controller 2006 can perform a memory access request (e.g., read or write) by accessing some combination of lower latency memory 2010, medium latency memory 2012, and higher latency memory 2014 in order to service the request. ML engine 2004 can interpret read requests to guide pre-fetching of data to move or copy data that could be requested next or subsequently from higher latency memory 2014 to medium latency memory 2012 or lower latency memory 2010 or from medium latency memory 2012 to lower latency memory 2010. If data that could be requested next or subsequently is already stored in lower latency memory 2010, then the data is marked to not be evicted or less likely to be evicted.

Under the direction of ML engine 2004, memory node system 2000 can copy data from higher latency memory 2014 (e.g., HCM) to lower latency memory 2010 (e.g., DRAM) to allow a future request to be able to be serviced out of lower-latency memory 2010. In some examples, ML engine 2004 can be used to detect patterns in the access stream that can be marshalled ahead of time to lower latency memory.

In some examples, ML engine 2004 can detect patterns of memory read requests from a particular node or client application or entity (e.g., virtual machine or container) such that if there is a first request A to read from memory address A, and subsequent requests B and C to different memory addresses were detected to follow, ML engine 2004 can respond to receipt of request A to read from memory address A by moving data for requests B and C from higher latency memory 2014 to medium latency memory 2012 or lower latency memory 2010. ML engine 2004 can detect accesses to make tiering or caching decisions. For example, ML engine 2004 can detect addresses that are grouped together for reads. If requests for address A and B are grouped or received together or performed sequentially, if a request for address A is received, a request for address B will follow and ML engine 2004 can cause data for address B to be copied to lower latency memory 2010 if the data is not present in lower latency memory 2010.

Based on current and past memory accesses for a particular requester tenant, device, or application, ML engine 2004 can predict data that will be accessed or later using any type of machine learning, artificial intelligence, Deep Learning (e.g., convolutional neural network (CNN)), recurrent neural network (RNN)), Non-Deep learning inference, or other types of inference. Von Neumann or non-Von Neumann architectures can be used. Deep neural networks (DNNs), artificial neural networks, neural networks, space invariant artificial neural networks (SIANN), deep Q-network (DQN), and variations thereof can be used.

ML engine 2004 could be trained at run time or loaded with neural engine weight coefficients or values from off-line training or weights used by another ML engine trained to identify access patterns by a requester tenant, application or device. For example, in a setting where the memory pool and compute nodes run a known workload, ML engine 2004 could be set up with a previously-generated training that is refined or modified based on run time memory access behaviors.

Moving or copying data associated with predicted next or subsequent memory accesses from higher latency memory 2014 to lower or medium latency memory can reduce an amount of time needed to complete a memory access request as time to access the data can be reduced if the data is accessed from lower or medium latency memory compared to that of higher latency memory. ML engine 2004 can store access patterns of accessed memory addresses and lengths of accessed data in a memory mappings table 2008. Memory mappings table 2008 can also include identification of what media data is stored in (e.g., lower latency memory 2010, medium latency memory 2012, or higher latency memory 2014).

In some examples, a requester can include a hint with a memory access request where the hint identifies next memory address access requests to be made after a current request so that ML engine 2004 can cause the data to be available in lower or medium latency memory.

ML engine 2004 can make decisions on a per-node basis. In other words, where multiple independent compute nodes access a single memory pool, while there may be no structure in the overall reference stream arriving at the pool, there may be structure in the reference stream associated with a particular requester node.

In some examples, a sender of a memory access request (e.g., requester) can include a hint or metadata with the memory access request where the hint or metadata is an identifier that identifies a compute node X and application Y as a requester. ML engine 2004 can be configured to dedicate more low latency memory to nodes or requesters that are higher priority. In order to reduce data access latency, ML engine 2004 can be configured to dedicate more low latency memory to one or more requesters whose latency time from accessing memory from the memory node is higher on average or if the requester is close to not meeting its applicable service level agreement (SLA).

Figure 20B:
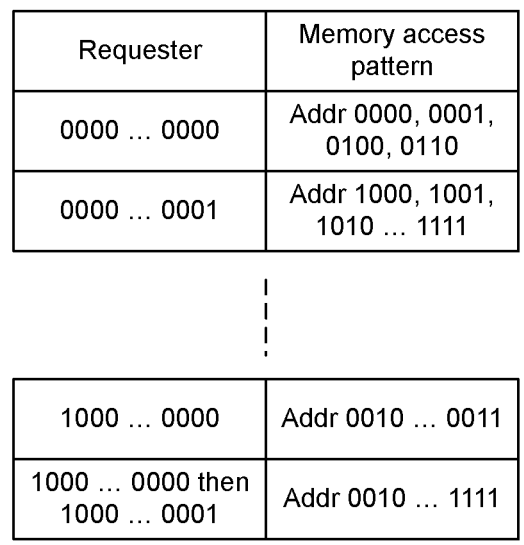

FIG. 20B depicts an example format of memory mappings used to predict data accesses. For example, a memory address access pattern for a requester with a particular identifier (e.g., Process Address Space ID (PASID) or other identifier) can be stored. Various factors can be applied to determine a memory access pattern such as a requester sequence. For example, requester identifier of 1000 . . . 0000 followed by requester identifier of 1000 . . . 0001 can access addresses 0010 to 1111. For example, a particular sequence of requesters in a service function chaining (SFC) can be used to predict memory access patterns. Memory access patterns can refer to contiguous memory addresses or non-contiguous memory addresses. A requester can be a service, microservice, cloud native microservice, workload, device, or software. A time of day at which a request is received from a particular requester or requesters can also influence an expected memory access pattern.

Figure 21:
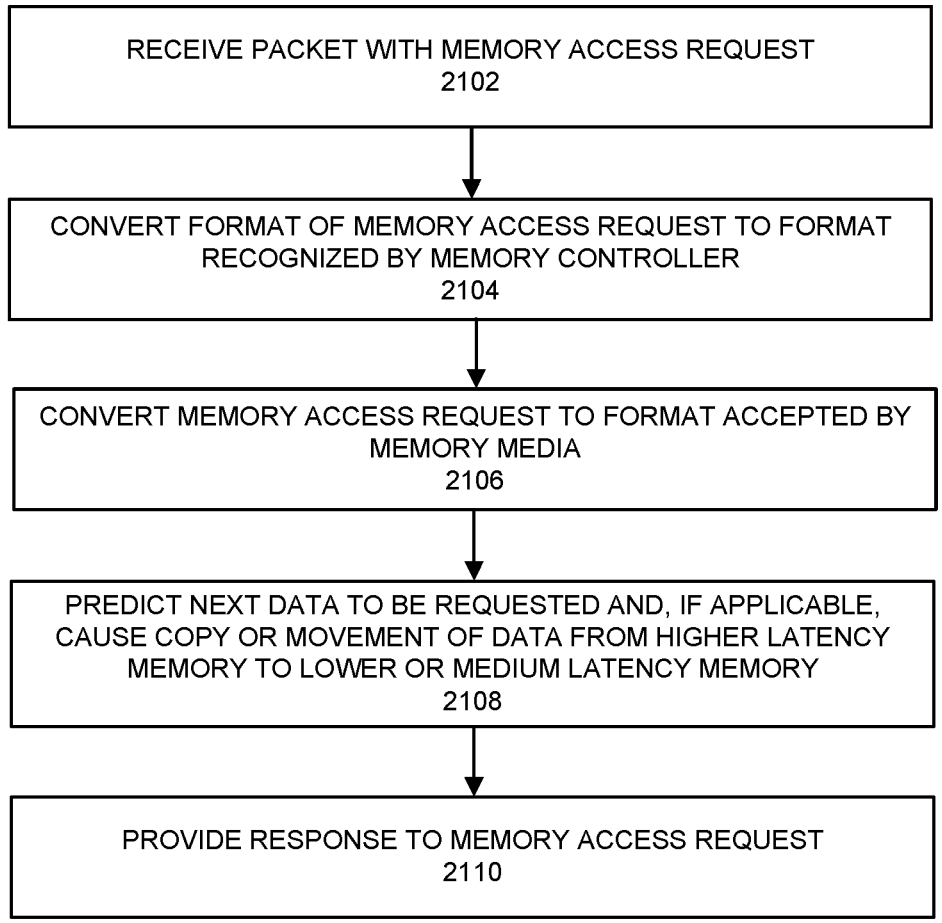

FIG. 21 depicts an example process. Actions 2102 to 2106 can be similar to respective actions 1902 to 1906 described with respect to FIG. 19. At 2108, a memory node can use an inference engine to predict data that will be accessed next. The inference engine can interpret an order of received read requests to guide pre-fetching of data to move or copy data that could be requested next or subsequently from higher latency memory to medium or lower latency memory or from medium latency memory to lower latency memory. If data that could be requested next or subsequently is already stored in lower latency memory, then the data can be marked to not be evicted or less likely to be evicted. Action 2110 can be similar to action 1908 described with respect to FIG. 19.

Configuring Data Storage Among Multiple Memory Tiers

Multiple tiers of memory can be attached to a computing platform or memory pool. In some cases, lower latency memory space can be constrained more than CPU resources in that lack of availability of lower latency memory space can constrain performance more than available CPU resources. Various embodiments provide for memory architectures using finer-grained metadata on the access temperature of regions of memory. A temperature can be a measure of level of accesses (e.g., reads) of a region of memory and a "hot" region can be accessed more used than a "cold" region. Temperature can allow software to efficiently differentiate regions of memory that are actively in-use versus regions that are not actively accessed or less actively accessed. Such temperature information can be used to identify "hot" regions corresponding to data that can be moved to even lower latency memory devices or maintained in the lower or lowest latency memory devices. Such temperature information can be used to identify "cold" data that can be moved further-from the CPU out of local memory or lower latency memory to higher latency memory to free local or lower latency memory.

Various embodiments can be applied to determine a temperature of memory regions and associated data in any or a combination of remote pooled memory, disaggregated memory (e.g., addressable regions of memory that are connected to a requester by one or more fabrics, interconnects, or networks) or locally attached memory. Based on a hotter relative temperature, data or any content (e.g., neural network weights, meta-data, configuration information, executable code, translation lookaside buffers, and so forth) can be copied to a region of memory that has an associated lower latency to access than its current storage location. Conversely, based on a colder relative temperature, data or other content can be copied to a region of memory that has an associated higher latency to access than its current storage location.

Some virtual memory systems include some metadata, such as an "Accessed" bit in a page table entry (PT), that can be used to gauge temperature of data access to a memory region. Some solutions allow software or hardware to access page access information at a coarse granularity but without a sense of time or frequency of access. Various embodiments provide a temperature measurement on regions of memory (e.g., a page) that provides some information on how frequently a page has been used over some time interval. A table can aggregate a subset of this information (e.g., "cold pages") for rapid access by software or hardware. Availability of temperature information can enable rapid decisions on memory usage, allowing systems relying on disaggregating memory to manage their address space and migrate data to or from lower latency memory or storage. Hardware support for this information can reduce latency for system software that manage memory uses and data storage locations.

Figure 22:
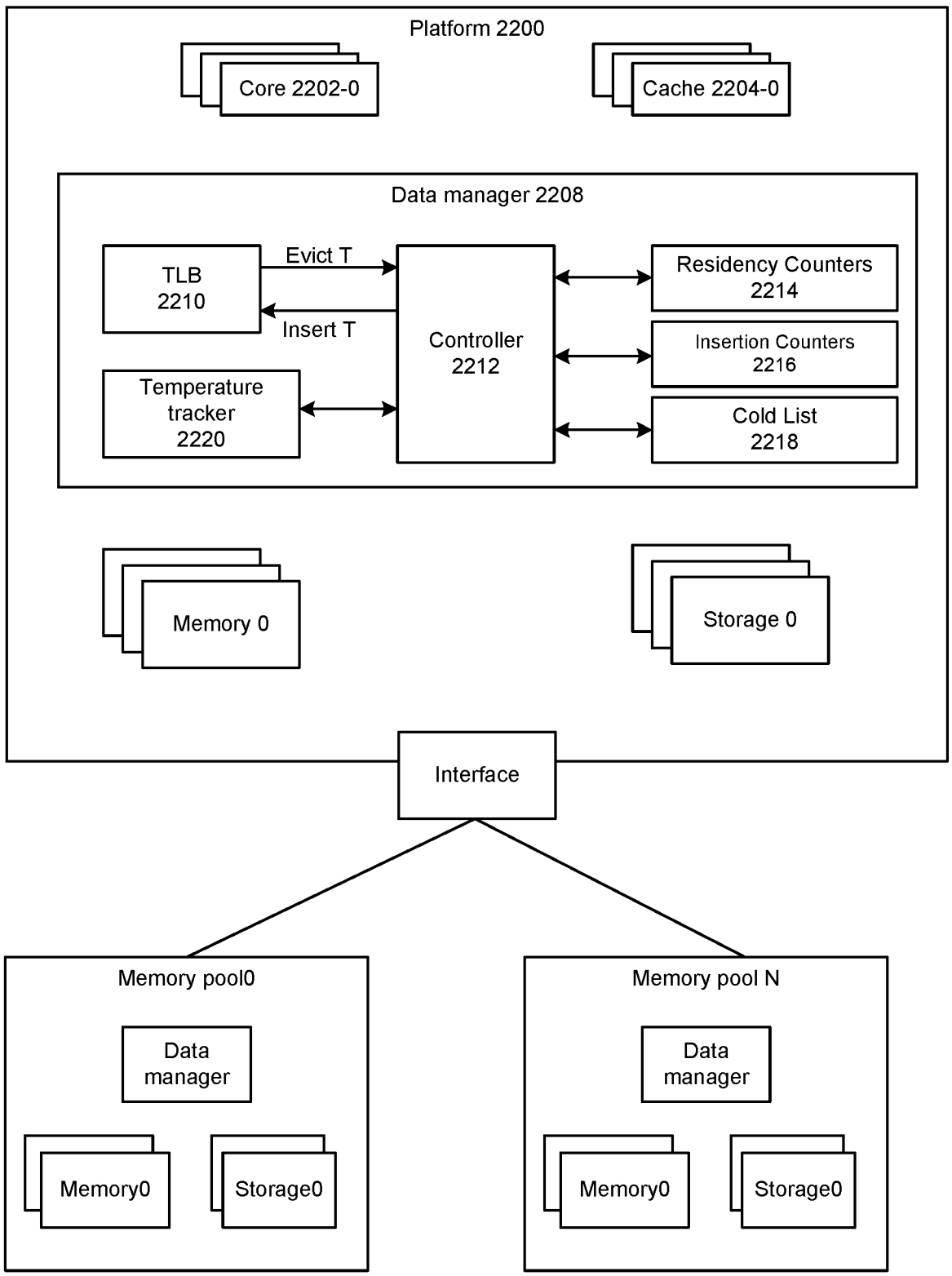

FIG. 22 shows a system that can be used to manage data or content copying or movement between different tiers of memory or storage based on temperature of data or content. Platform 2200 can access locally attached memory and storage, disaggregated memory and storage, and/or remote memory and storage. In some examples, platform 2200 can represent a pool of memory. Various embodiments can use data manager 2208 to track a working set of data or content moving in and out of a TLB using per-TLB-entry residency and per-region insertion counters to determine level of hotness of data. For example, TLB 2210 (or address translation cache) can provide a stream of eviction and insertion messages to controller 2212 and controller 2212 can manage residency counters 2214 (e.g., in on-chip memory), insertion counters 2216 (e.g., in off-chip memory), and cold list 2218 (e.g., in on or off-chip memory). In some embodiments, one or more memory pools of memory or storage devices can be by managed by a system similar to data manager 2208. In some examples, instances of data manager 2208 can be local to the memory tiers and/or manage local, remote, and disaggregated memory tiers.

A page table entry (PTE) can hold a mapping between a virtual address of a page and a physical address. In some examples, presence of a translation for an address (e.g., page table entry (PTE)) in translation lookaside buffer (TLB) 2210 can indicate at least one access to the addressable region of memory has occurred. Likewise, lack of residency of a PTE for an address indicates there have been no accesses to the addressable region of memory. Where W is a working set size (e.g., in number of TLB translations) and TLB is a number of translation entries in TLB, if W>>TLB, there can be a constant storage of translations into TLB and eviction of entries from the TLB. Further, an assumption is made that a translation in the TLB corresponds to exactly one region.

A TLB can be a memory cache that is used to reduce the time taken to access a user memory location. A TLB can be accessed by a memory management unit (MMU). The TLB can store recent translations of virtual memory to physical memory and can be referred-to as an address-translation cache. A TLB may reside between the CPU and the CPU cache, between CPU cache and the main memory or between the different levels of the multi-level cache. One or more TLBs can be available for use by memory management hardware and the one or more TLBs can be used by a processor that utilizes paged or segmented virtual memory.

An example pseudocode or operation of controller 2212 for managing temperatures corresponding to addressable regions can be as follows:

/Start/
  Upon insertion of translation T into TLB 2210 (shown as "Insert T" in FIG. 22):
    Saturate increment insertion counter for region R corresponding to address in translation T.
    Optionally, remove region R corresponding to T from cold region list 2218.
  Upon eviction of translation T from TLB 2210 (shown as "Evict T" in FIG. 22):
    Reset or reduce residency counter 2214 corresponding to region R corresponding to translation T.
  Each TLB sweep period:
    For each translation T, performing saturating-increment operation on residency counter 2214 corresponding to region R corresponding to T.
  Each temperature sweep period:
    For each region R:
      Adjust temperature for region R based on residency counters 2214 and insertion counters 2216 for R.
      Reset or reduce insertion counter for region R to refresh insertion counter for a temperature sweep period.
      If temperature is below threshold, add R to list of cold regions in cold list 2218.
/End/

Residency counters 2214 for a region R can indicate how long a translation T for an addressable memory region has been stored in TLB 2210. For example, at the beginning of a TLB sweep period and during the TLB sweep period, for an address translation present in TLB, a residency counter can be incremented or increased and stored in residency counter 2214. Upon an eviction of a translation T for region R, residency counter 2214 can be reset to indicate the translation T for region R is not stored in TLB 2210. The use of residency counters 2214 is optional but can provide a mechanism to differentiate between regions whose translations are moving into and out of TLB 2210 versus regions whose translations remain in TLB 2210.

Insertion counters 2216 can track a number of insertions of a translation T for a region R. Controller 2212 can update insertion counter 2216 when an address translation T for an addressable memory region is inserted into TLB 2210 ("Insert T"). In response to insertion of the address translation T into TLB 2210, controller 2212 can remove an entry corresponding to the address translation T from cold region list 2218.

Counters 2214 and 2216 can be reset or adjusted periodically. For example, if a counter saturates (e.g., reaches a threshold level), the counter can be reset to zero or reduced. In some examples, periodically, if a counter does not saturate, the counter can be reduced towards a middle value. For example, for an 8 bit counter, a value of 255 could reset to 0, which indicates the region is not resident. Various embodiments can avoid resetting of counter values from maximum value to minimum value that occurs from incrementing.

For a saturated counter value, the counter value can be clamped to the maximum representable value (on increments) or minimum representable value (on decrements). For example, controller 2212 can saturate a counter by performance of the following pseudocode:

```
Increment_by_N(Counter):
    If (Counter + N) > MAXIMUM_VALUE
        Counter = MAXIMUM_VALUE
    Else
        Counter = Counter + N
Decrement_by_N(Counter)
    If (Counter − N) < MINIMUM_VALUE
        Counter = MINIMUM_VALUE
    Else
        Counter = Counter − N,
``` where MAXIMUM_VALUE or MINIMUM_VALUE is determined by the number of bits in counter (for an unsigned 4-bit counter, MAXIMUM_VALUE would be 15, MINIMUM_VALUE would be 0).

Cold list 2218 could include a list or first in first out (FIFO) ordering of regions with a temperature below a threshold. For example, a region R of memory can be considered cold and identified in cold list 2218 if a corresponding translation for the region R in TLB 2210 has a relatively low duration of staying time in TLB 2210 prior to eviction or was not added to TLB 2210 during a particular duration of time. As stated earlier, for an insertion of an address translation T into TLB 2210, optionally, controller 2212 can remove an entry corresponding to the address translation T from cold region list 2218.

Temperature tracker 2220 can indicate a relative temperature of a region R based at least on one or more of: values in residency counters 2214 and values in insertion counters 2216. In some examples, a temperature of region R identified in cold list 2218 may not be tracked using temperature tracker 2220, although it can be tracked. For example, for a region R, a temperature value can be a signed value and initialized to 0. For example, if a value insertion counter 2216 for a region is 0, temperature for the region can be reduced by an amount or reduced to zero. For example, if a value residency counter 2214 for a region is greater than or equal to a threshold value, then a temperature of the region can be increased. In some examples, over-estimating a regions "hotness" is acceptable, assuming there are always some cold pages. In some examples, a range of temperature values can be limited such as to a multi-level temperature between hot and cold; hot, medium, or cold; or hot and cold. In some examples, 1 bit can be used to represent a temperature or multiple bits can be used to indicate a temperature of a region R. A temperature value can be a signed or unsigned value. Because temperature values have limited dynamic range and saturate, their values may be periodically reset or adjusted as described herein.

In some examples, temperature values can saturate at maximum or minimum value and not roll over. A saturating increment of an N-bit temperature value V can be defined as:

$$V=(V==2^N-1)?2^N-1:V+1.$$

Temperature values can be a general measurements of aggregate behavior over some time interval. Given two temperatures, T0 and T1, corresponding to respective regions R0 and R1, where T0<T1, a qualitative interpretation can be that R0 has been accessed relatively less than R1. A quantitative interpretation can be a difference of one between T0 and T1 indicates R0 has been accessed X "units" (e.g., bundles of N accesses) less than R1. A qualitative interpretation of temperatures can be used to keep N (the number of bits in a temperature) much smaller than would be needed for a raw count of number of accesses to a memory region.

Temperatures in temperature tracker 2220 can be indicated by an N-bit value and mapped to contiguous, non-overlapping, regions of address space. These regions can be integer multiples of the smallest page size that the virtual memory system uses. A mapping software or circuitry can associate a temperature with a region of address space. For example, a scheme could be mapped to a 4 KB memory page to a temperature value. Some schemes could map an integer number of contiguous or non-contiguous 4 KB memory pages to a temperature value. To reduce the number of temperatures to track, larger-than-page-sized address regions can be used where multiple page table entries are checked if page table accessed bits are used.

In some examples, to manage temperatures of a region tracked using temperature tracker 2220, controller 2212 can perform the following operations

```
/Start/
For every time period,
    For each region,
        If the region has been accessed during a time period,
            Increase the corresponding temperature of the region
            managed by temperature tracker 2220
        Else
            Decrease the corresponding temperature of the region
            managed by temperature tracker 2220
    Sort the temperatures and regions into a list by relative coldness.
/End/
```

A PTE can include an Accessed indicator that indicates whether software has accessed a page referenced by this entry and the Accessed indicator can be used to determine whether the region has been accessed. A sweep of the page tables entries can be performed periodically and the temperature can be an aggregate access indicator for a region. In some examples, controller 2212 can apply sweep operations periodically that are set based on desired resolution of temperature data as well as the number of bits in various counters.

In some examples, controller 2212 can perform temperature adjustments based on heuristics. For example, for a region, insertion counter 2216 having a value 0 (e.g., not inserted in a last temperature sweep) could cause reduction of a temperature indicator for the region by an amount. For example, residency counter 2214 for a region being a maximum value (e.g., translation was always present in TLB 2210) could cause an increase of temperature for the region by an amount.

Accordingly, controller 2212 can maintain a list of addressable regions by relative temperature (hottest to coldest). Controller 2212 can maintain a list of memory regions determined to be relatively less accessed or used than other memory regions and store the list in cold list 2218. System software (e.g., OS) can determine which addressable memory regions are not active (e.g., in cold list 2218) and could, for example, migrate content of such addressable memory regions to remote memory or storage or to a higher latency memory or storage. An addressable region identified in cold list 2218 need not be among the absolute least used or accessed regions by cores 2202-0 to 2202-X (where X is an integer) and the addressable region in cold list 2218 can be less used or accessed than a majority of regions not in cold list 2218.

In some embodiments, controller 2212 can measure a number of addressable regions that are considered cold (e.g., tracked by cold list 2218) and software (e.g., hypervisor or system software (e.g., OS)) can select which addressable regions to evict from lower or medium latency memory or storage devices and move to higher latency memory or storage devices. For example, if a memory region identified in cold list 2218 is in a local lowest latency memory, the content associated with the memory region can be evicted or moved to a remote memory device with relatively higher latency (e.g., cold storage). For example, if a memory region identified in cold list 2218 is stored in a relatively low latency remote memory device, content of the memory region may remain and content of another memory region can be selected for eviction based on cold list 2218. Controller 2212 can manage generation and updating of cold list 2218 for content stored in local or remote or disaggregated memory whether stored in on-chip memory or storage or off-chip memory or storage.

As an example, for a 256-entry TLB 2210, residency counters 2214 can be 8B (8 bytes), so that total storage used for residency counters 2214 and TLB 2210 is approximately 2 KB. For a 128 GB address space divided into 4 MB regions and 8b temperature entries and 8b insertion counter entries, storage for temperature tracker 2220 and insertion counters 2216 can be approximately 512 KB.

Figure 23:
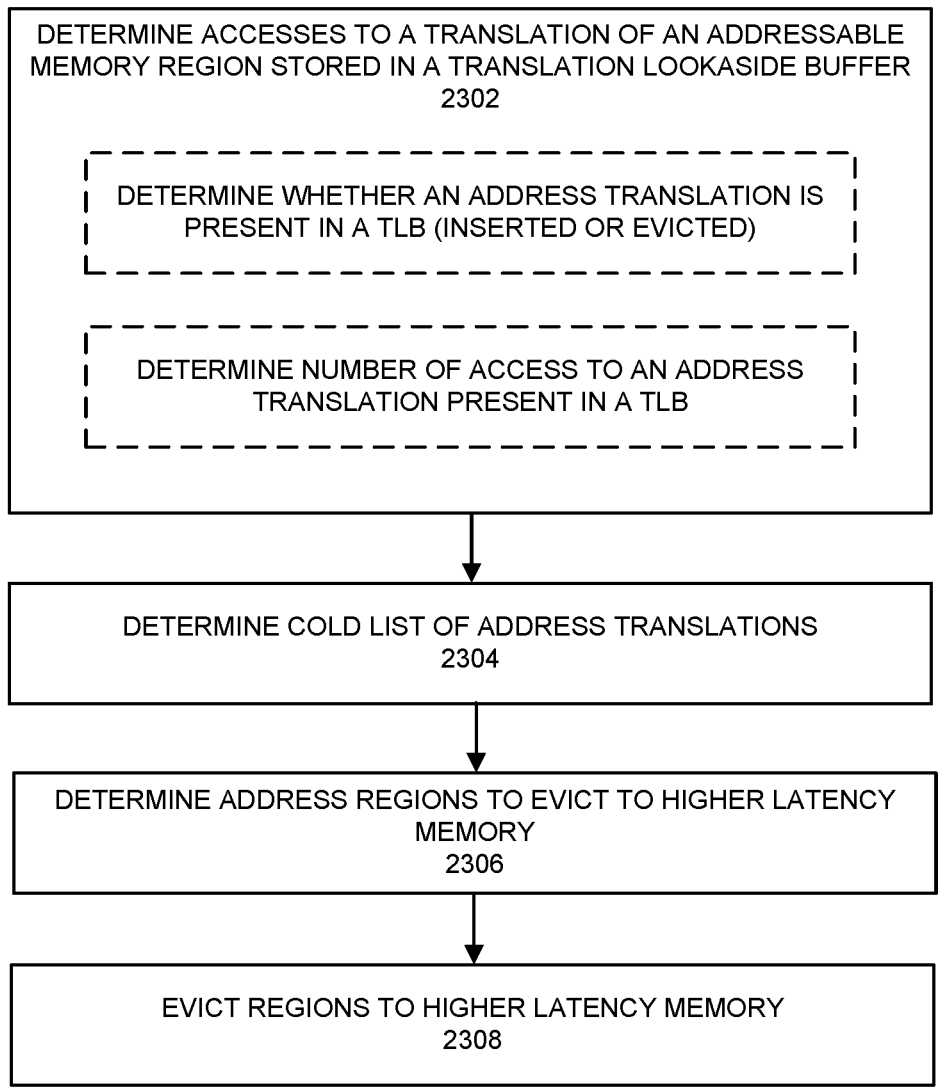

FIG. 23 depicts an example process. The process of FIG. 23 can be performed at a time interval to attempt to free resources in lower latency memory if resource store relatively unused data. At 2302, accesses to an address translation for an addressable memory region stored in a translation lookaside buffer (TLB) can be determined. For example, for a time period, an address that has an address translation inserted into or evicted from a TLB can be identified. In addition, or alternatively, a number of times that the address translation is accessed from the TLB can be determined. Based on the insertion or eviction of an address translation and a number of accesses to the address translation, the relative uses of an address translation are determined.

At 2304, a list of address regions that are part of a cold list are determined. The list of address regions that are cold can be selected based on non-presence in the TLB and/or lowest amount of time in the TLB (e.g., zero) over a time window. In some examples, the cold list can be identified as addressable regions for which temperature is measured and where the temperature is at or below a threshold level.

At 2306, address regions to evict to higher latency memory can be determined from the address regions on the cold list. In some cases, a limited number of address regions can be selected for eviction. A hierarchy of decision making agents can be employed. For example, a controller could produce temperatures and a cold list that system software (e.g., OS, hypervisor, etc.) could use along with other information it has to drive decisions on eviction, data movement, and so forth.

At 2308, addressable regions can be evicted or moved to higher latency memory or storage devices based on the regions in the cold list. For example, if a memory region on the cold list is in local lowest latency memory, the content of the memory region can be evicted or moved to a remote memory device with relatively higher latency (e.g., cold storage). For example, if a memory region in the cold list is in a relatively higher latency remote memory device, the memory region may remain there and content of another memory region can be selected for eviction.

Sub-Page Validity and Access Tracking for Memory Pooling

Emerging networking technology enable data transfer across nodes at small (e.g., a few KBs) granularity and with latency that is less than an order of magnitude larger than data access within the node (e.g., from DRAM main memory). This combination allows architectures with memory that is pooled in some node and accessed over the network by some group of compute nodes. Such system memory architecture is often referred to as disaggregated memory or pooled memory.

In page-based memory based solutions, a granularity of memory access is at page level. For example, a page can be 4096 bytes, or other sizes. Some approaches to memory pooling involve detecting that an entire page resides remotely (e.g., through a page-fault) and then copying the entire page (e.g., 4 KB) to the compute node (e.g., using direct memory access (DMA) or some other data transfer mechanism such as RDMA). With these approaches, the entire page data is to be transferred and reside in local physical memory before the requested cache line can be placed in the CPU cache and the CPU pipeline can use the requested data. Often the application only uses the requested cache line plus a sub-set of the cache lines in the page. Waiting for all cache lines in the page to be fetched introduces additional delays while the CPU pipeline stalls to resume computation on the requested cache line.

Waiting for an entire remote page to be stored in local physical memory before providing the CPU with the requested cache line may be applied because a virtual memory sub-systems can identify whether all or none of the page is available in local physical memory (e.g., the page has a valid mapping in the page table entry (PTE)). Thus, if only a subset of the cache lines in the page are valid and the application running on the CPU accesses one of the non-valid cache lines, the memory sub-system cannot resolve whether the access can be served or not.

Sector cache designs provide for individual words (or some other sub-cacheline granularity) that are individually identified for validity and access. CPU cache sub-systems provide the requested word (or double-word, or some subword) to the CPU pipeline before loading the rest of the cache line into the L1 cache from lower-level caches. In a sub-page write protection (SPP) system, sub-page write (W) and execute (X) bits are maintained for each sub-page with the goal of providing access protection at finer granularity than a page.

Sub-page access tracking can be performed in software using a memory allocator as follows. Memory is allocated in chunks with the size of the desired sub-page so that each chunk maps to a different virtual full-size page. In this way, page tracking metadata is associated with an individual sub-page. To save physical memory, the allocator can map the various virtual pages (each containing a single sub-page) to the same physical page.

For some workloads, finer granularity of access than page level may be desired as transfer of an entire page of data may use too high an amount of network resources and may introduce additional latency prior to desired data being available for access. Various embodiments provide for indicators at cache line granularity that indicate whether content of cache lines are valid or invalid. If a processor requests data from a local memory that is invalid or not present, then data can be accessed at sub-page granularity (e.g., cache line) from remote memory. Various embodiments track validity (e.g., presence and validity of the data) and access of sub-pages (e.g., one or some number of cache lines) in local physical memory. Various embodiments can reduce fabric or network bandwidth used for data fetches from pooled or remote memory and lower latency to access of data.

Various embodiments can be applied in use cases such as one or more of: (i) fetching the requested cache line first; (ii) fetching only a subset of the cache lines from a remote page; (iii) fetching cache lines in some arbitrary order determined by some prefetch scheme; (iv) learning the sub-page access pattern of an application and using this learned pattern to drive the use-cases (ii) and (iii) above; or (v) identifying pages that are "densely" accessed (e.g., most sub-pages are accessed) and using this information to help classify pages as "hot" or frequently accessed and deeming preferential treatment (e.g., by pinning these pages in local memory and reducing likelihood of eviction from local memory or cache).

In some embodiments, data validity and evictability for a page can be managed using valid (V) and accessed (A) bit(s) for each page in page metadata. In addition or alternatively, sub-page metadata of data validity and evictability for a sub-page can be managed using valid (V) and accessed (A) bit(s). The sub-page metadata can be included in page-level metadata (e.g., in the page table entries (PTE) in both page table and TLB). Some embodiments can store sub-page metadata separately from the page-level metadata. In some examples, instead of an A bit, an idle bit (I) could be used where the invariant I=A. The idle bit can indicate whether an address of data is not accessed and can be cleared after any access to the data.

Page faults that trigger allocation, mapping and permissions checking of a local physical page for a remote pooled page can occur when the page is first accessed and subsequent accesses to invalid sub-pages do not require a page fault. Rather, invalid sub-pages can be accessed from remote memory and copied to local memory. Identifying valid and invalid sub-pages can allow a page-based memory pooling system to store in local memory only a subset of the sub-pages of a remotely pooled page. Various embodiments can access sub-page level data from remote memory without page-faults or operating system (OS) intervention.

Figure 24:
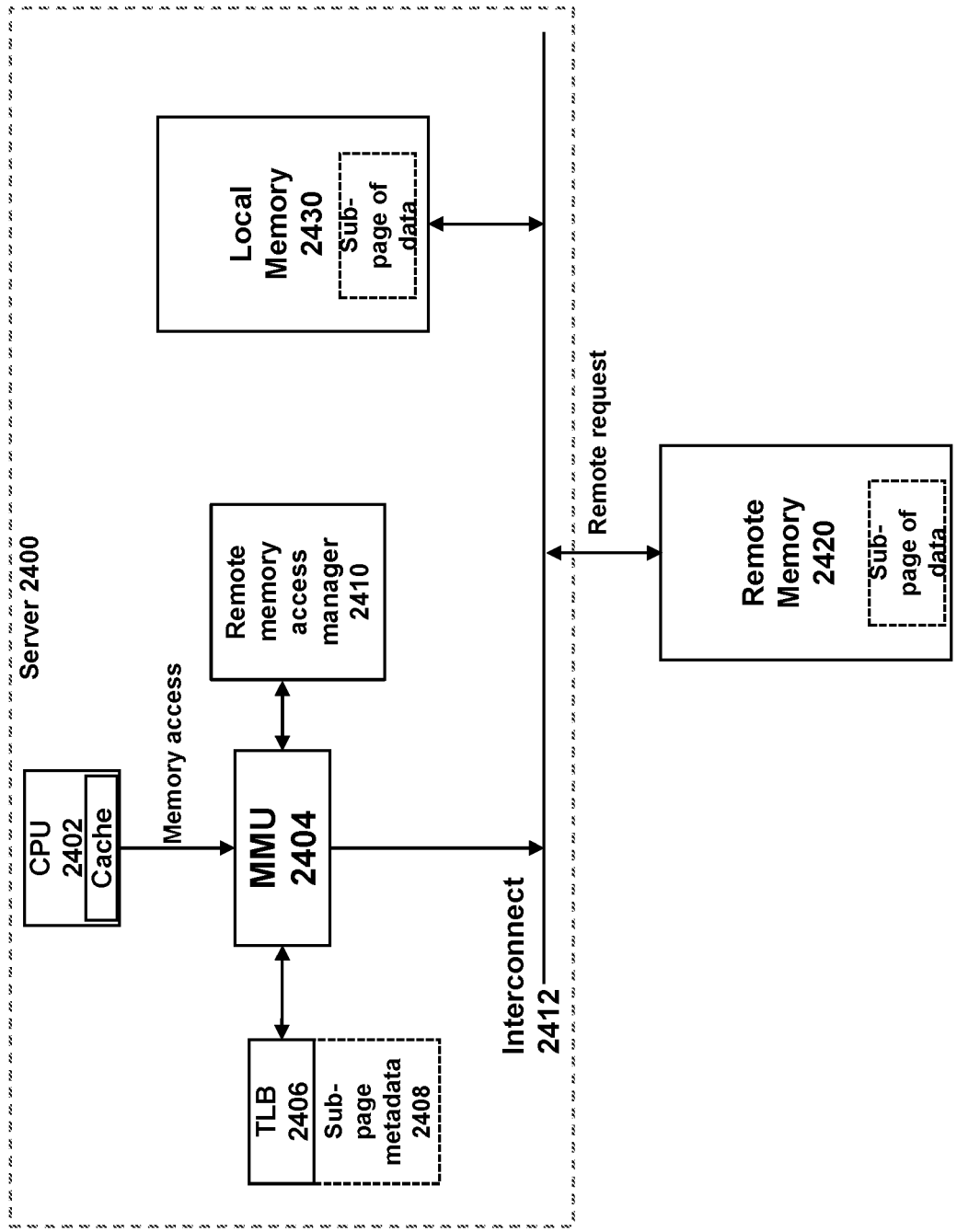

FIG. 24 depicts an example system. Server 2400 (or any computing platform) can include or utilize CPU 2402, MMU 2404, TLB 2406, remote memory access manager 2410, and local memory 2430. Server 2400 can be embodied as disaggregated resources composed as a composite node. Other devices and systems can be included in or utilized by server 2400, including any devices or systems described herein. Remote memory 2420 can store data that is accessible to server 2400. Server 2400 can access remote memory 2420 using a fabric or network. Any fabric or network can be supported such as, but not limited to, those described herein. In some examples, remote memory 2420 can store data that is accessible to CPU 2402 and server 2400 can use remote memory 2420 as a so-called far memory to store data that is not stored in local memory 2430 or a cache (e.g., L1, L2, L3, lower level cache (LLC)) accessible to CPU 2402. In some examples, the cache can be provided in a system agent or uncore of CPU 2402.

CPU 2402 or any of its cores can execute a virtualized execution environment. A virtualized execution environment (VEE) can include at least a virtual machine or a container. VEEs can execute in bare metal (e.g., single tenant) or hosted (e.g., multiple tenants) environments. A virtual machine (VM) can be software that runs an operating system and one or more applications. A VM can be defined by specification, configuration files, virtual disk file, non-volatile random access memory (NVRAM) setting file, and the log file and is backed by the physical resources of a host computing platform. A VM can be an OS or application environment that is installed on software, which imitates dedicated hardware. The end user has the same experience on a virtual machine as they would have on dedicated hardware. Specialized software, called a hypervisor, emulates the PC client or server's CPU, memory, hard disk, network and other hardware resources completely, enabling virtual machines to share the resources. The hypervisor can emulate multiple virtual hardware platforms that are isolated from each other, allowing virtual machines to run Linux®, FreeBSD, VMWare, or Windows® Server operating systems on the same underlying physical host.

A container can be a software package of applications, configurations and dependencies so the applications run reliably on one computing environment to another. Containers can share an operating system installed on the server platform and run as isolated processes. A container can be a software package that contains everything the software needs to run such as system tools, libraries, and settings. Containers are not installed like traditional software programs, which allows them to be isolated from the other software and the operating system itself. Isolation can include permitted access of a region of addressable memory or storage by a particular container but not another container. The isolated nature of containers provides several benefits. First, the software in a container will run the same in different environments. For example, a container that includes PHP and MySQL can run identically on both a Linux computer and a Windows® machine. Second, containers provide added security since the software will not affect the host operating system. While an installed application may alter system settings and modify resources, such as the Windows® registry, a container can only modify settings within the container.

An application or VEE executed by CPU 2402 can issue a memory access request to cause a read or write of data from local memory 2430 to a cache for processing. In some examples, a virtual memory address can be provided with the memory access request and memory management unit (MMU) 2404 attempts to translate the virtual memory address to a physical memory address in local memory 2430. For example, MMU 2404 can access TLB 2406 to determine a virtual-to-physical memory address translation. In some embodiments, sub-page metadata is stored in TLB 2406, or another memory device, that can be accessed for use in an event of a TLB miss as described herein. For example, in some embodiments, access and temperature tracking could be performed in a smart NIC (e.g., to initiate data prefetch).

Sub-page meta data can include access trackers that indicate whether data associated with the sub-page stored in local memory 2430 is valid (V) and whether the data has been accessed (A). However, additional information may be kept, such as an identifier (ID) of the core or process that issued the last access to the sub-page or a counter of the number of accesses to the sub-page. In some embodiments, the sub-page access trackers of a given page could be stored in a page table entry (PTE) itself while in other embodiments they might be stored separately.

Remote memory access manager 2410 can interpret and manipulate the access trackers in sub-page metadata. Remote memory access manager 2410 can be integrated with MMU 2404 or separate from MMU 2404. Remote memory access manager 2410 can be implemented in hardware, processor-executed microcode, processor-executed software or in some combination of these. For instance, any access to a sub-page may set the access indicator A to positive (or a value that identifies the sub-page as accessed) or may instead increase or increment a counter of accesses, if available. Remote memory access manager 2410 can fetch the sub-page from remote pooled memory 2420 if the sub-page is not stored in local memory 2430 or the sub-page metadata indicates that the sub-page is invalid. Various embodiments are able to fetch only the requested sub-page or pages corresponding to the memory access request. Remote memory access manager 2410 can retrieve sub-pages from remote memory 2420, without page-faults or other operating system (OS) intervention, thereby freeing the OS and processor to perform other tasks and potentially avoid fetching entire pages of data. In some examples, sub-page access tracking and validity indicators can be maintained by a processor executed OS and saved upon context switches.

Figure 25A:
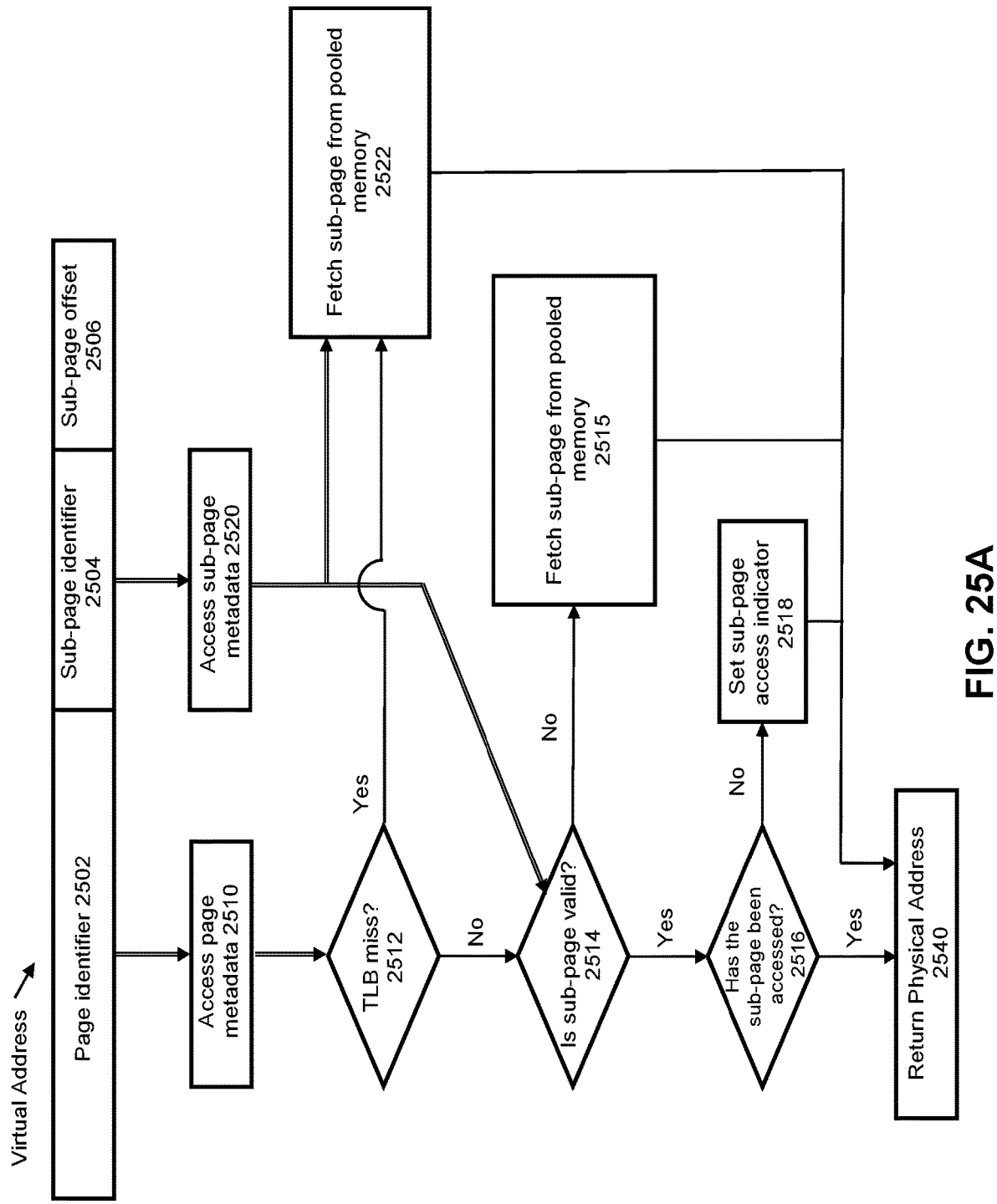

FIG. 25A depicts an example process. The process can be performed by a memory management unit in connection with a memory access request. A memory access request can request a read or write operation involving local memory and/or remote memory. The memory access request can be issued by a CPU or other device (e.g., accelerator or network interface card). A virtual address can be associated with the memory access request. The virtual address can include a page identifier (ID) 2502, a sub-page identifier 2504, and a sub-page offset 2506. In parallel or at overlapping times, page metadata and sub-page metadata can be accessed to determine if the data is valid and accessible.

Permissions check can occur of whether a requester is permitted to access to the page and/or write to the page can be applied for TLB misses. Permissions checks for accesses to not yet valid sub-pages may not be performed. For example, a permissions check may not be performed for an entire page on a first access to the page. Nevertheless, some embodiments can utilize page and/or sub-page access control schemes such that access permissions for page and/or sub-page regions can be maintained in a table. For example, with a 128B granularity for sub-pages, no-write and no-execute permissions may be expressed in a 64 bit value (e.g., with 2 bits allocated to each sub-page, one indicating no-write and one indicating no-execute).

For example, at 2510, page metadata can be accessed in a translation lookaside buffer (TLB) using a page identifier (ID) field of a virtual address. A page ID field can be used to access page metadata from a TLB. A TLB can include a cache of some virtual-to-physical address mappings. A TLB can be accessed to determine if the TLB includes an address translation corresponding to a page ID of the virtual address. A TLB miss can occur if the TLB does not store a virtual-to-physical address mapping for the page ID of the virtual address. At 2512, a determination is made whether a TLB miss has occurred. In a case of a TLB miss, the process can proceed to 2522.

At 2520, sub-page metadata can be accessed based on sub-page identifier 2504 in the virtual address associated with a memory access request. In some examples, sub-page identifier 2504 can be used to access valid and access indicators associated with a sub-page. In some examples, sub-page metadata can include a valid indicator and access indicator per sub-page. At 2522, content associated with a sub-page corresponding to a sub-page identifier 2504 can be accessed from remote memory. For example, accessing the sub-page can include performing a page walk to determine a physical address. A page walk can involve reading contents of multiple memory locations to determine the physical address. The determined virtual-to-physical address mapping can be entered into the TLB for future translation. A page walk can also be used to retrieve both page and sub-page metadata for a PTE for the virtual-to-physical address translation in an event of a TLB miss.

Figure 25B:
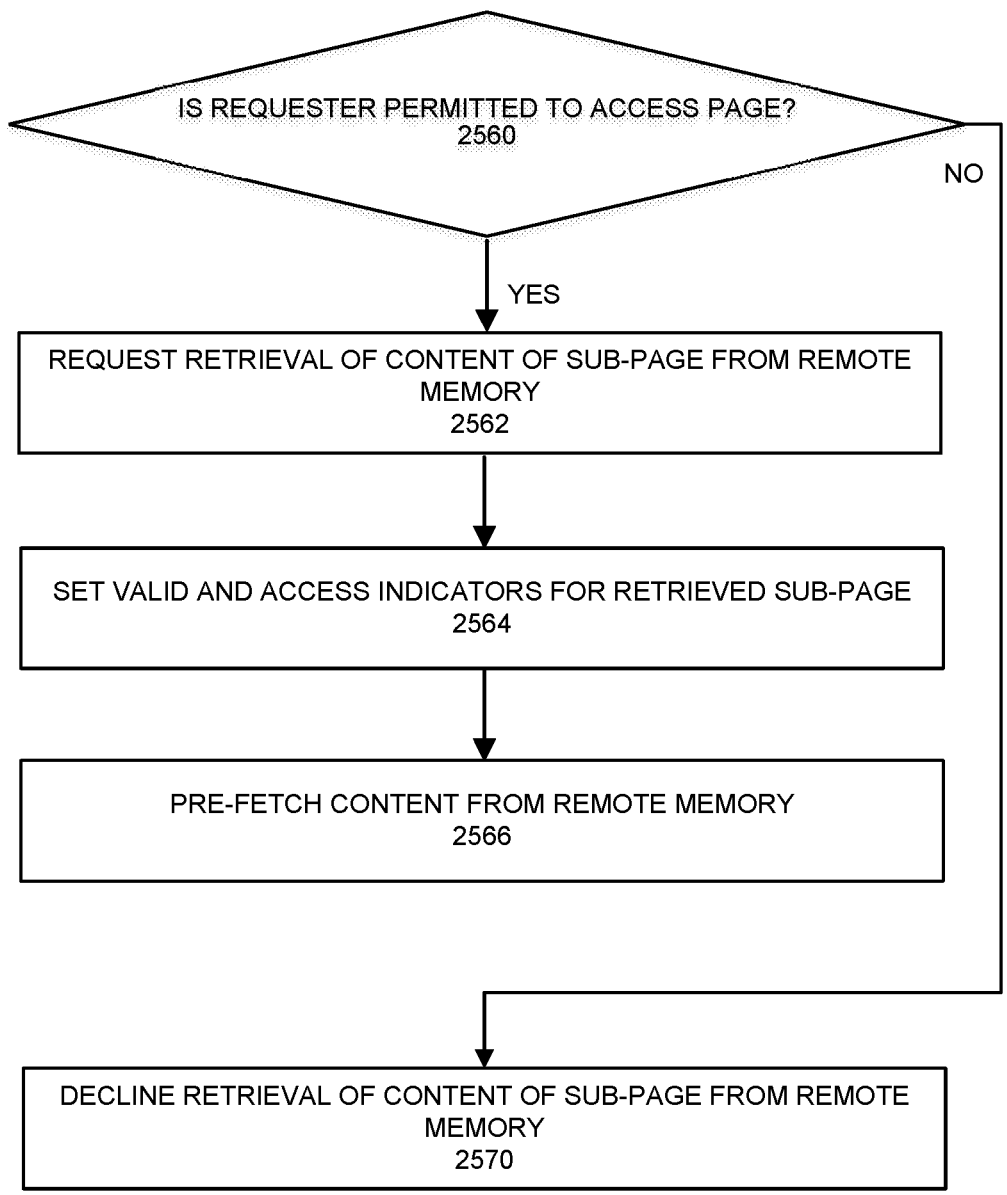

FIG. 25B depicts an example of actions that can be performed in 2522. At 2560, access permission for the page can be checked to determine if a requester is permitted to access to the page and/or check of write permissions to the page can be applied for TLB misses. In some examples, sub-page permissions for access (e.g., read) or write can be performed. At 2560, if the page is permitted to be accessed, at 2562, content in the target sub-page can be fetched, requested, copied or retrieved from a remote pooled memory and stored to local memory or cache. At 2564, both valid and access indicators for the particular retrieved sub-page can be set to indicate the address associated with the sub-page is valid and has been accessed. The process can proceed to 2540 of FIG. 25A. At 2560, if the page is not permitted to be accessed, then, at 2570, retrieval of content of the sub-page from remote memory can be declined.

Some embodiments of the process of FIG. 25B may learn access patterns of sub-pages within a page. Some embodiments may predict subsequent accesses based on prior sub-page accesses that include a currently accessed sub-page and, according to a correlation pattern, additionally pre-fetch other sub-pages of a same page (or different page). At 2566, some embodiments may fetch multiple sub-pages out-of-order and non-contiguous sub-pages. Prediction of subsequent accesses based on prior sub-page accesses and pre-fetching of one or more sub-pages can be triggered by a request to access a page of memory, a TLB miss, a TLB hit, or other factors.

At 2512, in a case of a TLB hit, the process proceeds to 2514. At 2514, the sub-page metadata is analyzed to determine if the sub-page corresponding to the sub-page identifier is valid. For example, sub-page metadata can include a valid indicator (e.g., V bit). The valid indicator can indicate that data corresponding to the sub-page identifier is present in local memory or cache and permitted to be accessed. The valid indicator can indicate whether a sub-page has not been evicted and is properly accessible. In some examples, a processor (e.g., device, CPU or core) can access data that is identified as valid. If the valid indicator for the sub-page indicates the data is not valid, the process proceed to 2515. At 2514, if the valid indicator for the sub-page indicates the data is valid, the process proceed to 2516.

At 2515, content associated with a sub-page corresponding to a sub-page identifier 2504 can be accessed from remote memory. Both valid and access indicators for the particular retrieved sub-page can be set to indicate the address associated with the sub-page is valid and has been accessed. The process can proceed to 2540.

At 2516, a determination can be made if content corresponding to the sub-page has been identified as accessed. If the content corresponding to the sub-page has been identified as accessed, the process can proceed to 2540. If the content corresponding to the sub-page has not been identified as accessed, the process can proceed to 2518, where a sub-page access indicator for the accessed sub-page can be set to accessed. An access indicator can measure accesses of data over time where a time can be configurable. In some examples, an access indicator can be a binary indicator which indicates that data associated with a sub-page has been accessed any time. In some examples, an access indicator can indicate a temperature of data and can be a multi-level value that increases at each access to the sub-page but decays to zero over an amount of time if the sub-page has not been accessed. In some examples, an access indicator can be reset if a page is unmapped from the local memory. Some embodiments may use a portion of the bits of the access indicator of a sub-page to classify a page as dense if a sufficient number of sub-pages are stored in local memory and give such page preferential treatment when performing page swaps between local and remote memory so as to maintain pages in local memory if the page is identified as dense.

At 2540, a physical address translation of the virtual address can be provided for use to access content from local memory. The content (e.g., data) can be retrieved from local memory or cache. In some examples, the physical address translation can be provided to the MMU to access the data from memory to store into a cache.

Figure 26:
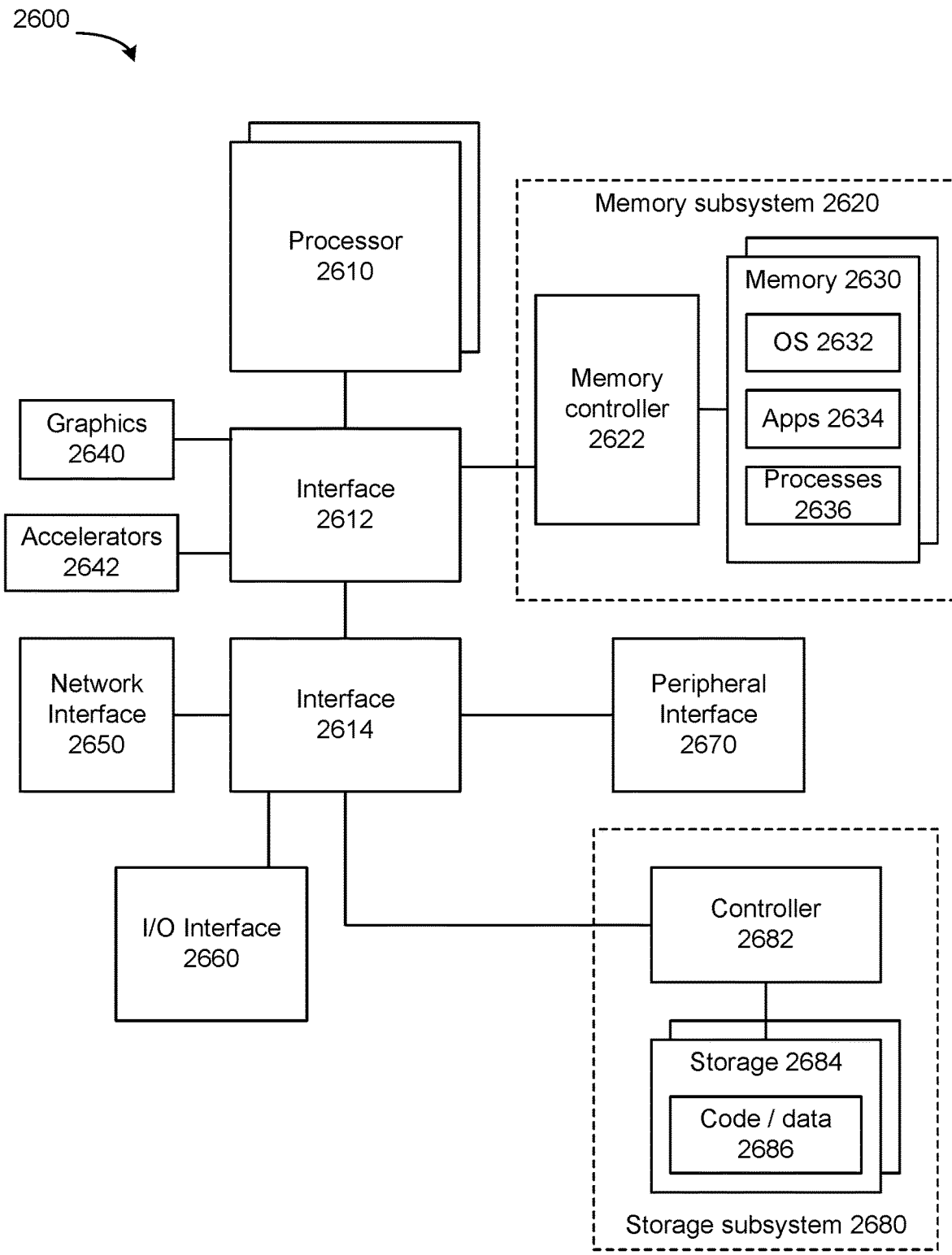

FIG. 26 depicts a system. The system can use any embodiments described herein to manage content in cache, memory, or storage. System 2600 includes processor 2610, which provides processing, operation management, and execution of instructions for system 2600. Processor 2610 can include any type of microprocessor, central processing unit (CPU), graphics processing unit (GPU), processing core, or other processing hardware to provide processing for system 2600, or a combination of processors. Processor 2610 controls the overall operation of system 2600, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 2600 includes interface 2612 coupled to processor 2610, which can represent a higher speed interface or a high throughput interface for system components that needs higher bandwidth connections, such as memory subsystem 2620, graphics interface components 2640, or accelerators 2642. Interface 2612 represents an interface circuit, which can be a standalone component or integrated onto a processor die. Where present, graphics interface 2640 interfaces to graphics components for providing a visual display to a user of system 2600. In one example, graphics interface 2640 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 2640 generates a display based on data stored in memory 2630 or based on operations executed by processor 2610 or both. In one example, graphics interface 2640 generates a display based on data stored in memory 2630 or based on operations executed by processor 2610 or both.

Accelerators 2642 can be a programmable or fixed function offload engine that can be accessed or used by a processor 2610. For example, an accelerator among accelerators 2642 can provide compression (DC) capability, cryptography services such as public key encryption (PKE), cipher, hash/authentication capabilities, decryption, or other capabilities or services. In some embodiments, in addition or alternatively, an accelerator among accelerators 2642 provides field select controller capabilities as described herein. In some cases, accelerators 2642 can be integrated into a CPU socket (e.g., a connector to a motherboard or circuit board that includes a CPU and provides an electrical interface with the CPU). For example, accelerators 2642 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 2642 can provide multiple neural networks, processor cores, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 2620 represents the main memory of system 2600 and provides storage for code to be executed by processor 2610, or data values to be used in executing a routine. Memory subsystem 2620 can include one or more memory devices 2630 such as read-only memory (ROM), flash memory, one or more varieties of random access memory (RAM) such as DRAM, or other memory devices, or a combination of such devices. Memory 2630 stores and hosts, among other things, operating system (OS) 2632 to provide a software platform for execution of instructions in system 2600. Additionally, applications 2634 can execute on the software platform of OS 2632 from memory 2630. Applications 2634 represent programs that have their own operational logic to perform execution of one or more functions. Processes 2636 represent agents or routines that provide auxiliary functions to OS 2632 or one or more applications 2634 or a combination. OS 2632, applications 2634, and processes 2636 provide software logic to provide functions for system 2600. In one example, memory subsystem 2620 includes memory controller 2622, which is a memory controller to generate and issue commands to memory 2630. It will be understood that memory controller 2622 could be a physical part of processor 2610 or a physical part of interface 2612. For example, memory controller 2622 can be an integrated memory controller, integrated onto a circuit with processor 2610.

In some examples, OS 2632 can determine a capability of a device associated with a device driver (not depicted). For example, a memory management unit can be configured by a device driver. OS 2632 can request the driver to enable or disable any device to perform any of the capabilities described herein. In some examples, OS 2632, itself, can enable or disable any device to perform any of the capabilities described herein. For example, any of applications 2634 can request use or non-use of any of capabilities described herein by any device.

While not specifically illustrated, it will be understood that system 2600 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus.

In one example, system 2600 includes interface 2614, which can be coupled to interface 2612. In one example, interface 2614 represents an interface circuit, which can include standalone components and integrated circuitry. In one example, multiple user interface components or peripheral components, or both, couple to interface 2614. Network interface 2650 provides system 2600 the ability to communicate with remote devices (e.g., servers or other computing devices) over one or more networks. Network interface 2650 can include an Ethernet adapter, wireless interconnection components, cellular network interconnection components, USB (universal serial bus), or other wired or wireless standards-based or proprietary interfaces. Network interface 2650 can transmit data to a remote device, which can include sending data stored in memory. Network interface 2650 can receive data from a remote device, which can include storing received data into memory. Various embodiments can be used in connection with network interface 2650, processor 2610, and memory subsystem 2620.

In one example, system 2600 includes one or more input/output (I/O) interface(s) 2660. I/O interface 2660 can include one or more interface components through which a user interacts with system 2600 (e.g., audio, alphanumeric, tactile/touch, or other interfacing). Peripheral interface 2670 can include any hardware interface not specifically mentioned above. Peripherals refer generally to devices that connect dependently to system 2600. A dependent connection is one where system 2600 provides the software platform or hardware platform or both on which operation executes, and with which a user interacts.

In one example, system 2600 includes storage subsystem 2680 to store data in a nonvolatile manner. In one example, in certain system implementations, at least certain components of storage 2680 can overlap with components of memory subsystem 2620. Storage subsystem 2680 includes storage device(s) 2684, which can be or include any conventional medium for storing large amounts of data in a nonvolatile manner, such as one or more magnetic, solid state, or optical based disks, or a combination. Storage 2684 holds code or instructions and data 2686 in a persistent state (e.g., the value is retained despite interruption of power to system 2600). Storage 2684 can be generically considered to be a "memory," although memory 2630 is typically the executing or operating memory to provide instructions to processor 2610. Whereas storage 2684 is nonvolatile, memory 2630 can include volatile memory (e.g., the value or state of the data is indeterminate if power is interrupted to system 2600). In one example, storage subsystem 2680 includes controller 2682 to interface with storage 2684. In one example controller 2682 is a physical part of interface 2614 or processor 2610 or can include circuits or logic in both processor 2610 and interface 2614.

A volatile memory is memory whose state (and therefore the data stored in it) is indeterminate if power is interrupted to the device. Dynamic volatile memory requires refreshing the data stored in the device to maintain state. One example of dynamic volatile memory incudes DRAM (Dynamic Random Access Memory), or some variant such as Synchronous DRAM (SDRAM). Another example of volatile memory includes cache or static random access memory (SRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WI02 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications. The JEDEC standards are available at www.jedec.org.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), Intel® Optane™ memory, NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 2600. More specifically, power source typically interfaces to one or multiple power supplies in system 2600 to provide power to the components of system 2600. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 2600 can be implemented using interconnected compute sleds of processors, memories, storages, network interfaces, and other components. High speed connections can be used such as: Ethernet (IEEE 802.3), remote direct memory access (RDMA), InfiniBand, Internet Wide Area RDMA Protocol (iWARP), Transmission Control Protocol (TCP), User Datagram Protocol (UDP), quick UDP Internet Connections (QUIC), RDMA over Converged Ethernet (RoCE), Peripheral Component Interconnect express (PCIe), Intel® QuickPath Interconnect (QPI), Intel Ultra Path Interconnect (UPI), Intel® On-Chip System Fabric (IOSF), Omnipath, Compute Express Link (CXL), Hyper-Transport, high-speed fabric, NVLink, Advanced Microcontroller Bus Architecture (AMBA) interconnect, OpenCAPI, Gen-Z, Cache Coherent Interconnect for Accelerators (CCIX), 3GPP Long Term Evolution (LTE) (4G), 3GPP 5G, DisplayPort, embedded DisplayPort, MIPI, HDMI, and successors or variations thereof.

Figure 27:
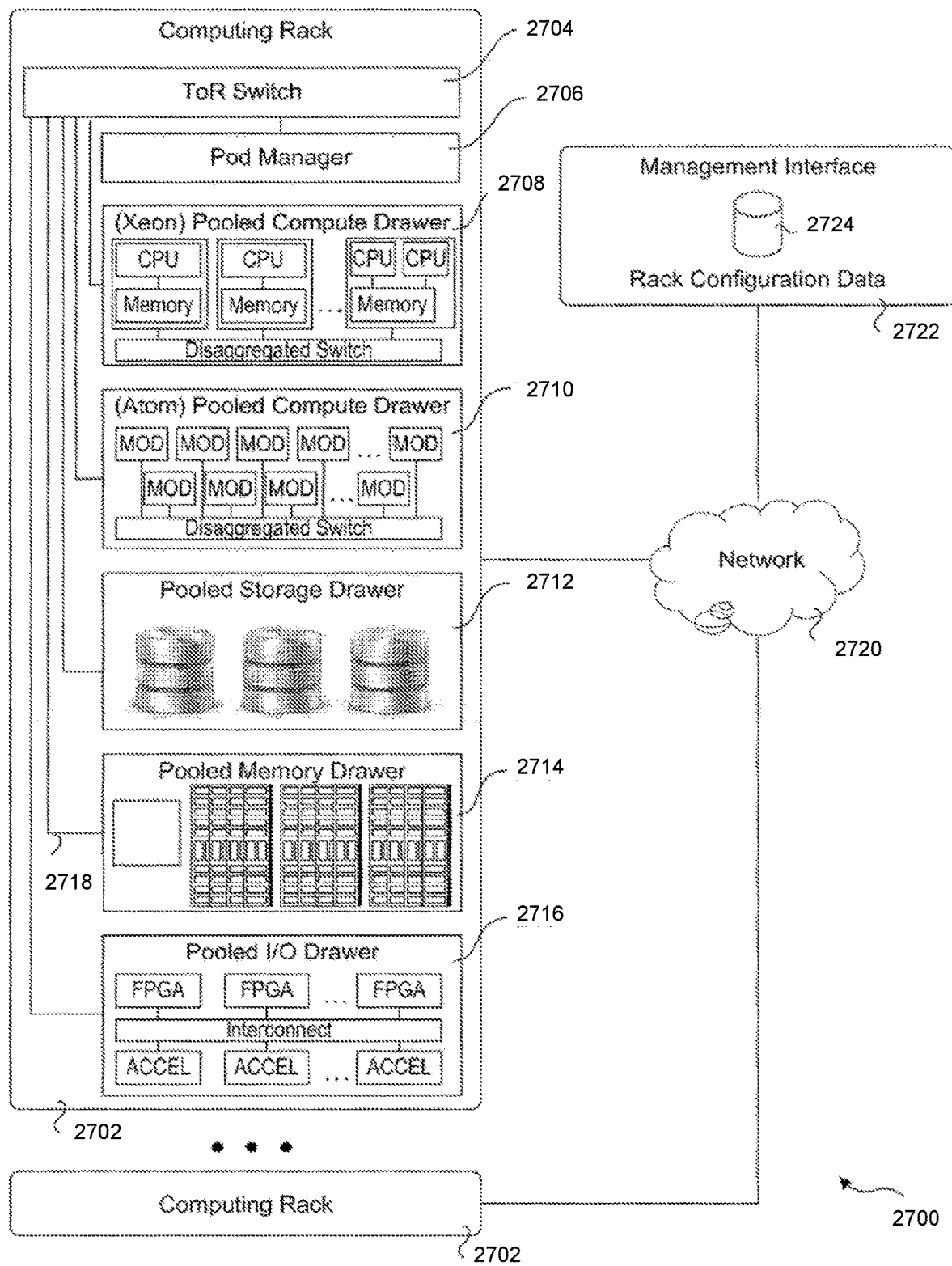

FIG. 27 depicts an example environment. Environment 2700 includes multiple computing racks 2702, each including a Top of Rack (ToR) switch 2704, a pod manager 2706, and a plurality of pooled system drawers. The environment can manage content in cache, memory, or storage in accordance with embodiments described herein. Generally, the pooled system drawers may include pooled compute drawers and pooled storage drawers. Optionally, the pooled system drawers may also include pooled memory drawers and pooled Input/Output (I/O) drawers. In the illustrated embodiment the pooled system drawers include an Intel® Xeon® processor pooled computer drawer 2708, and Intel® ATOM™ processor pooled compute drawer 2710, a pooled storage drawer 2712, a pooled memory drawer 2714, and a pooled I/O drawer 2716. Each of the pooled system drawers is connected to ToR switch 2704 via a high-speed link 2718, such as a 40 Gigabit/second (Gb/s) or 100 Gb/s Ethernet link or a 100+Gb/s Silicon Photonics (SiPh) optical link. In one embodiment high-speed link 2718 comprises an 800 Gb/s SiPh optical link.

Multiple of the computing racks 2702 may be interconnected via their ToR switches 2704 (e.g., to a pod-level switch or data center switch), as illustrated by connections to a network 2720. In some embodiments, groups of computing racks 2702 are managed as separate pods via pod manager(s) 2706. In one embodiment, a single pod manager is used to manage all of the racks in the pod. Alternatively, distributed pod managers may be used for pod management operations.

Environment 2700 further includes a management interface 2722 that is used to manage various aspects of the environment. This includes managing rack configuration, with corresponding parameters stored as rack configuration data 2724. In an example, environment 2700 can be implemented using interconnected compute sleds of processors, memories, storages, network interfaces, and other components.

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications), on-premises data centers, off-premises data centers, edge network elements, fog network elements, and/or hybrid data centers (e.g., data center that use virtualization, cloud and software-defined networking to deliver application workloads across physical data centers and distributed multi-cloud environments).

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications), on-premises data centers, off-premises data centers, edge network elements, fog network elements, and/or hybrid data centers (e.g., data center that use virtualization, cloud and software-defined networking to deliver application workloads across physical data centers and distributed multi-cloud environments).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative embodiments. Furthermore, additional operations may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

Illustrative examples of the devices, systems, and methods disclosed herein are provided below. An embodiment of the devices, systems, and methods may include any one or more, and any combination of, the examples described below.

An example includes a method comprising: measuring a number of addressable regions that are least accessed and cause at least one of the least accessed regions to be evicted or moved to a local or remote memory device with relatively higher latency.

An example includes a method includes determining whether an address translation is present in a translation lookaside buffer (TLB) and determining a number of access to an address translation present in the TLB.

An example includes an apparatus comprising: a remote access manager to: determine if a region of addressable memory associated with a memory address is stored in memory; based on the region of addressable memory associated with the memory address being stored in memory, determine if a sub-region of addressable memory associated with the memory address is available for access, wherein the sub-region comprises less than an entirety of the region; and based on the sub-region of addressable memory being available for access, provide a physical address for use to access data from the sub-region in the memory and copy the data to a cache.

Another example includes any example, wherein to determine if a region of addressable memory associated with a memory address is stored in memory, the memory management unit is to: determine whether the region associated with the memory address is stored in memory by determination of whether a memory address translation for the memory is present in a translation lookaside buffer.

Another example includes any example, wherein the remote access manager is to: access metadata associated with the sub-region, wherein the metadata comprises an indicator of whether the sub-region of addressable memory associated with the memory address is valid and include an access indicator and wherein the indicator of whether the sub-region of addressable memory associated with the memory address is valid is to indicate whether the sub-region of addressable memory associated with the memory address is available for access.

Another example includes any example, wherein the remote access manager is to: based on the access indicator indicating the sub-page region has not been accessed, selectively update the access indicator to indicate the sub-page region has been accessed.

Another example includes any example, wherein the access indicator is to indicate one or more of: whether the sub-page region has been accessed, a number of times that the sub-page region has been accessed, or frequency of access to the sub-page region.

Another example includes any example, wherein the remote access manager is to: based on the region of addressable memory associated with the memory address not being stored in memory, request content of the sub-region of addressable memory associated with the memory address from a remote memory pool and copy content of the sub-region of addressable memory associated with the memory address from the remote memory pool into a local memory.

Another example includes any example, wherein the remote access manager is to: set the indicator that the sub-region of addressable memory associated with the memory address is valid; and update the access indicator to indicate the sub-region of addressable memory associated with the memory address has been accessed.

Another example includes any example, wherein the region comprises a page of addressable memory and the sub-region comprises a cache line.

Another example includes any example, wherein the remote access manager is to: based on the region of addressable memory associated with the memory address not being stored in memory, predict a next sub-page that will be accessed and request content of the next sub-region of addressable memory associated with the memory address from a remote memory pool and copy content of the next sub-region of addressable memory associated with the memory address from the remote memory pool into the local memory.

Another example includes any example, wherein the remote access manager is part of a memory management unit.

Example 1 includes a system capable of coupling to a remote memory pool, the system comprising: a memory controller and an interface to a connection, the interface coupled to the memory controller, wherein: the interface is to translate a format of a memory access request to a format accepted by the memory controller and the memory controller is to provide the translated memory access request in a format accepted by a media.

Example 2 includes any example, wherein the memory controller is to convert a response from the media to the memory access request to a format accepted by the interface.

Example 3 includes any example, wherein to translate a format of a memory access request to a format accepted by the memory controller, the interface is to provide the memory access request as address bus line communication semantics accepted by the memory controller and data command line communication semantics accepted by the memory controller.

Example 4 includes any example, and including the media coupled to the memory controller, the media comprising one or more tiers of memory or storage and includes one or more of: a cache, volatile memory, persistent memory, or storage.

Example 5 includes any example, and includes an inference engine coupled to the memory controller, the inference engine to interpret read requests to guide pre-fetching of data to copy data expected to be requested subsequently from higher latency memory to medium or lower latency memory.

Example 6 includes any example, and includes a controller to measure a number of addressable regions that are least accessed and cause at least one of the least accessed regions to be evicted to a local or remote memory device with relatively higher latency.

Example 7 includes any example, wherein to measure a number of addressable regions that are least accessed, the controller is to: determine whether an address translation for an addressable region is present in a translation lookaside buffer (TLB) and determine a number of accesses to the address translation in the TLB.

Example 8 includes any example, wherein the controller is to cause at least one of the least accessed regions to be evicted based at least in part on a cold list.

Example 9 includes any example, and includes a server comprising a cache, a memory, and a remote access manager, wherein the remote access manager is to: determine if a region of addressable memory associated with a memory address for an access request is stored in the memory; based on the region of addressable memory associated with the memory address being stored in the memory, determine if a sub-region of addressable memory associated with the memory address is available for access from the memory, wherein the sub-region comprises less than an entirety of the region; and based on the sub-region of addressable memory being available for access from the memory, provide a physical address for use to access data from the sub-region in the memory and copy the data to the cache.

Example 10 includes any example, wherein the remote access manager is to: access metadata associated with the sub-region, wherein the metadata comprises an indicator of whether the sub-region of addressable memory associated with the memory address is valid and comprises an access indicator and wherein the indicator of whether the sub-region of addressable memory associated with the memory address is valid is to indicate whether the sub-region of addressable memory associated with the memory address is available for access.

Example 11 includes any example, wherein the remote access manager is to: based on the access indicator indicating the sub-region has not been accessed, selectively update the access indicator to indicate the sub-region has been accessed.

Example 12 includes any example, wherein the access indicator is to indicate one or more of: whether the sub-region has been accessed, a number of times that the sub-region has been accessed, or frequency of access to the sub-region.

Example 13 includes any example, wherein the remote access manager is to: based on the region of addressable memory associated with the memory address not being stored in the memory, request content of the sub-region of addressable memory associated with the memory address in the memory access request from the media and copy content of the sub-region of addressable memory associated with the memory address from the media into a local memory.

Example 14 includes any example, wherein the remote access manager is to: set the indicator that the sub-region of addressable memory associated with the memory address is valid; and update the access indicator to indicate the sub-region of addressable memory associated with the memory address has been accessed.

Example 15 includes any example, wherein the region comprises a page of addressable memory and the sub-region comprises one or more cache lines.

Example 16 includes any example, wherein the remote access manager is part of a memory management unit.

Example 17 includes any example, and includes a data center, rack, blade, or server, wherein the data center, rack, blade, or server is coupled to the memory controller and the interface and the data center, rack, blade, or server comprises a processor that is to issue the memory access request through the interface.

Example 18 includes any example, and includes a method comprising: translating an input format message for a memory access request, received through a connection from a remote device, to a format accepted by a memory controller for a media of a memory pool and providing, at the memory controller, the translated memory access request in a format accepted by the media.

Example 19 includes any example, and includes measuring a number of addressable regions that are least accessed and causing at least one of the least accessed regions to be evicted or moved to a local or remote memory device with relatively higher latency.

Example 20 includes any example, and includes determining if a region of addressable memory associated with a memory address for an access request is stored in the memory; based on the region of addressable memory associated with the memory address being stored in the memory, determining if a sub-region of addressable memory associated with the memory address is available for access from the memory, wherein the sub-region comprises less than an entirety of the region; and based on the sub-region of addressable memory being available for access from the memory, providing a physical address for use to access data from the sub-region in the memory and copy the data to a cache.

What is claimed is:

1. A method comprising:
   translating, at an interface, a first input format message for a first memory access request to a format accepted by a memory controller for a media of a disaggregated memory pool, wherein the interface comprises a network interface and the first memory access request is associated with one or more Ethernet packets received by the network interface and the disaggregated memory pool comprises a plurality of volatile memory devices accessible through a network;
   providing the translated first input format message to the memory controller;
   providing, at the memory controller, the translated first memory access request in the format accepted by the media of the disaggregated memory pool;
   translating, at the interface, a second input format message for a second memory access request to the format accepted by the memory controller, wherein the second memory access request is in a Compute Express Link (CXL) format;
   providing the translated second input format message to the memory controller; and
   providing, at the memory controller, the translated second memory access request in the format accepted by the media of the disaggregated memory pool.

2. The method of claim 1, comprising:
   measuring a number of addressable regions that are least accessed and causing at least one of the least accessed regions to be evicted to a memory device.

3. The method of claim 1, comprising:
   determining if a region of addressable memory associated with a memory address for the memory access request is stored in the disaggregated memory pool;
   based on the region of addressable memory associated with the memory address being stored in the disaggregated memory pool, determining if a sub-region of addressable memory associated with the memory address is available for access from the disaggregated memory pool, wherein the sub-region comprises less than an entirety of the region; and
   based on the sub-region of addressable memory being available for access from the disaggregated memory pool, providing a physical address for use to access data from the sub-region in the disaggregated memory pool and copy the data to a cache.

4. A system comprising:
   a memory controller to a media of a disaggregated memory pool; and
   an interface to receive a memory access request and a second memory access request, the interface coupled to the memory controller and the interface comprising a processor, wherein:
   the memory access request comprises a read or write request,
   the interface is to translate a format of a memory access request to a format accepted by the memory controller,
   the memory access request comprises a memory access request received in an Ethernet packet by the interface,
   the memory controller is to provide the translated memory access request in a format accepted by the media of the disaggregated memory pool,
   the second memory access request comprises a read or write request in a Compute Express Link (CXL) format,
   the interface is to translate a format of the second memory access request to the format accepted by the memory controller,
   the memory controller is to provide the translated second memory access request in the format accepted by the media of the disaggregated memory pool,
   the disaggregated memory pool comprises a plurality of volatile memory devices accessible through a network, and
   the interface comprises a network interface, wherein the network interface is to receive the memory access request in at least one Ethernet packet.

5. The system of claim 4, wherein the memory controller is to convert a response from the media to the memory access request to a format accepted by the interface and wherein based on the memory access request comprising the read request, the response from the media comprises data and wherein based on the memory access request comprising the write request, the response from the media comprises an indication of success or failure.

6. The system of claim 4, wherein to translate the format of a memory access request to the format accepted by the memory controller, the interface is to provide the memory access request as address bus line communication semantics accepted by the memory controller and data command line communication semantics accepted by the memory controller.

7. The system of claim 4, wherein the media comprises one or more tiers of memory and includes one or more of: a cache or volatile memory.

8. The system of claim 4, comprising circuitry coupled to the memory controller, the circuitry to interpret read requests to cause pre-fetching of data to copy data predicted to be requested subsequently to lower latency memory.

9. The system of claim 4, comprising a circuitry to measure a number of accesses to addressable regions and cause data of the at least one of the addressable regions to be evicted to a local or remote memory device.

10. The system of claim 9, wherein to measure the number of accesses to addressable regions, the circuitry is to:
determine whether an address translation for an addressable region is present in a translation lookaside buffer (TLB) and
determine a number of accesses to the address translation in the TLB.

11. The system of claim 9, wherein the circuitry is to cause data of the at least one of the addressable regions to be evicted based at least in part on a cold list of accessed regions.

12. The system of claim 4, comprising:
a server comprising a cache, a memory, and circuitry, wherein the media comprises the memory and wherein the circuitry is to:
determine if a region of addressable memory associated with a memory address for the memory access request is stored in the memory;
based on the region of addressable memory associated with the memory address being stored in the memory, determine if a sub-region of addressable memory associated with the memory address is available for access from the memory, wherein the sub-region comprises less than an entirety of the region; and
based on the sub-region of addressable memory being available for access from the memory, provide a physical address for use to access data from the sub-region in the memory and copy the data to the cache.

13. The system of claim 12, wherein the circuitry is to:
access metadata associated with the sub-region, wherein the metadata comprises an indicator of whether the sub-region of addressable memory associated with the memory address is valid and comprises an access indicator and wherein the indicator of whether the sub-region of addressable memory associated with the memory address is valid is to indicate whether the sub-region of addressable memory associated with the memory address is available for access.

14. The system of claim 13, wherein the circuitry is to:
based on the access indicator indicating the sub-region has not been accessed, selectively update the access indicator to indicate the sub-region has been accessed.

15. The system of claim 13, wherein the access indicator is to indicate one or more of: whether the sub-region has been accessed, a number of times that the sub-region has been accessed, or frequency of access to the sub-region.

16. The system of claim 13, wherein the circuitry is to:
based on the region of addressable memory associated with the memory address not being stored in the memory, request content of the sub-region of addressable memory associated with the memory address in the memory access request from the media and copy content of the sub-region of addressable memory associated with the memory address from the media into a local memory.

17. The system of claim 16, wherein the circuitry is to:
set the indicator that the sub-region of addressable memory associated with the memory address as valid; and
update the access indicator to indicate the sub-region of addressable memory associated with the memory address has been accessed.

18. The system of claim 12, wherein the region of addressable memory comprises a page of addressable memory and the sub-region of addressable memory comprises one or more cache lines.

19. The system of claim 12, wherein the circuitry is part of a memory management unit (MMU).

20. The system of claim 4, comprising a data center, rack, blade, or server, wherein the data center, rack, blade, or server is coupled to the memory controller and the interface and the data center, rack, blade, or server comprises a host system that is to issue the memory access request through the interface.

21. The system of claim 4, wherein the interface is to receive a third memory access request, wherein:
the third memory access request comprises a read or write request in a Compute Express Link (CXL) CXL.mem format,
the interface is to translate a format of the third memory access request to the format accepted by the memory controller,
the memory controller is to provide the translated third memory access request in the format accepted by the media of the disaggregated memory pool.

* * * * *